Jan. 5, 1971     T. B. BULLOCK     3,553,647
APPARATUS FOR NUMERICAL SIGNALING OF POSITIONS, INCLUDING
DIGITAL-TO-ANALOG CONVERTER
Filed April 21, 1967     13 Sheets-Sheet 1

INVENTOR.
THOMAS B. BULLOCK,
BY
Wolfe, Hubbard, Voit + Osann
ATTORNEYS.

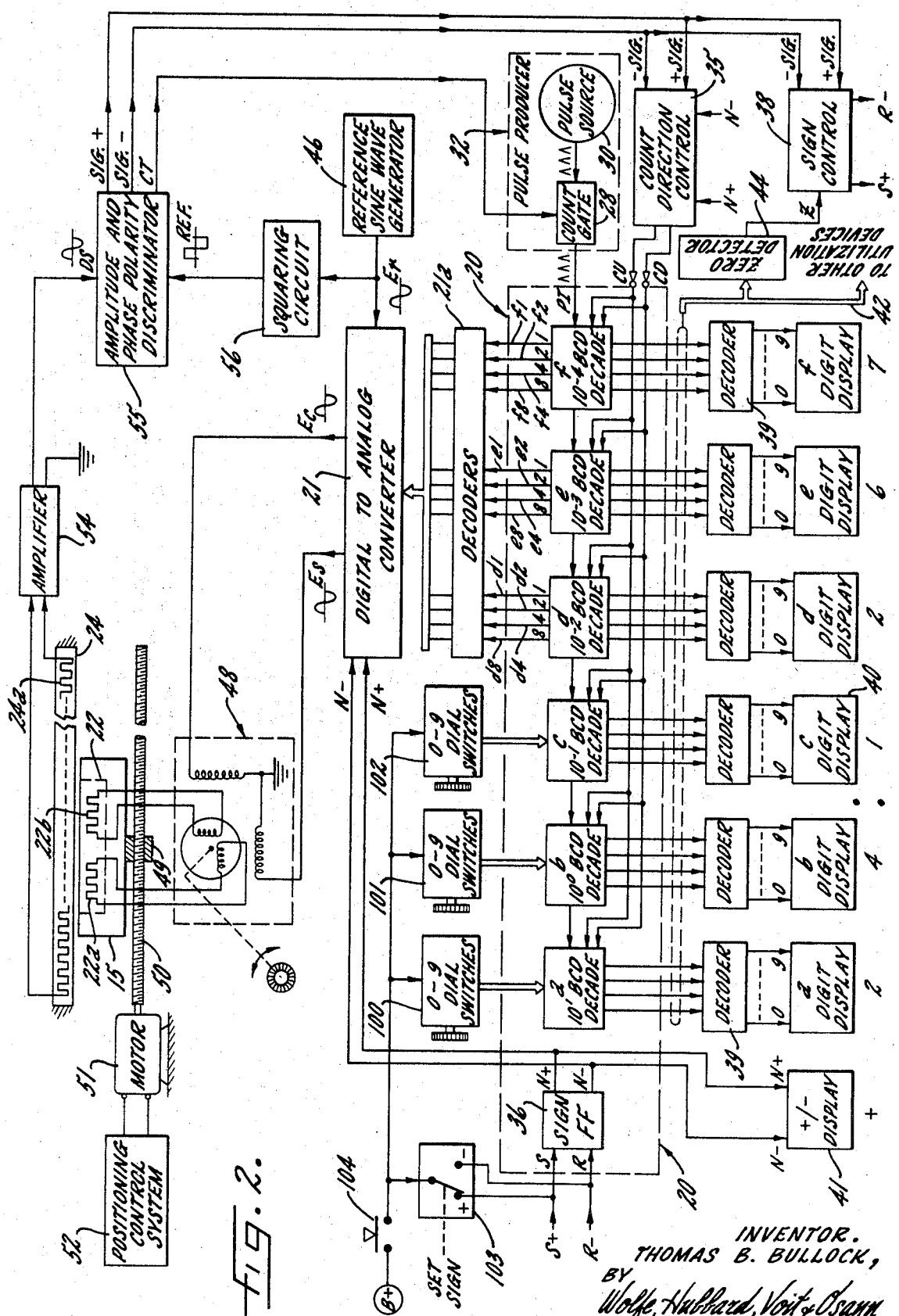

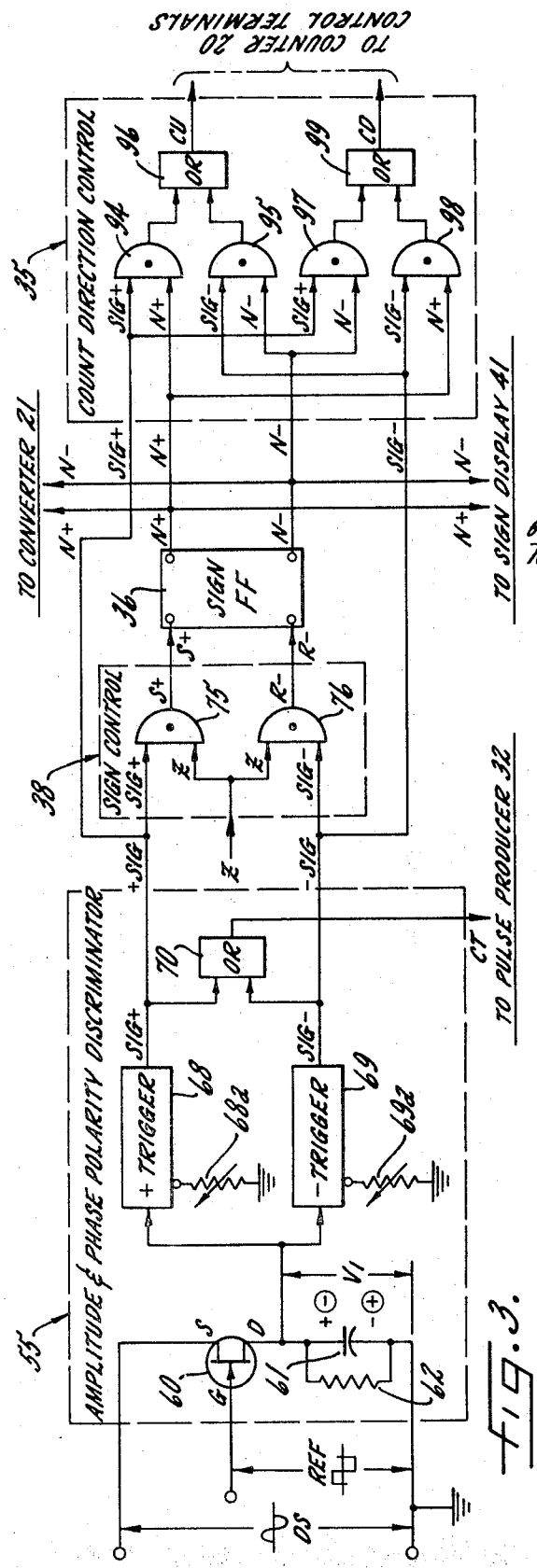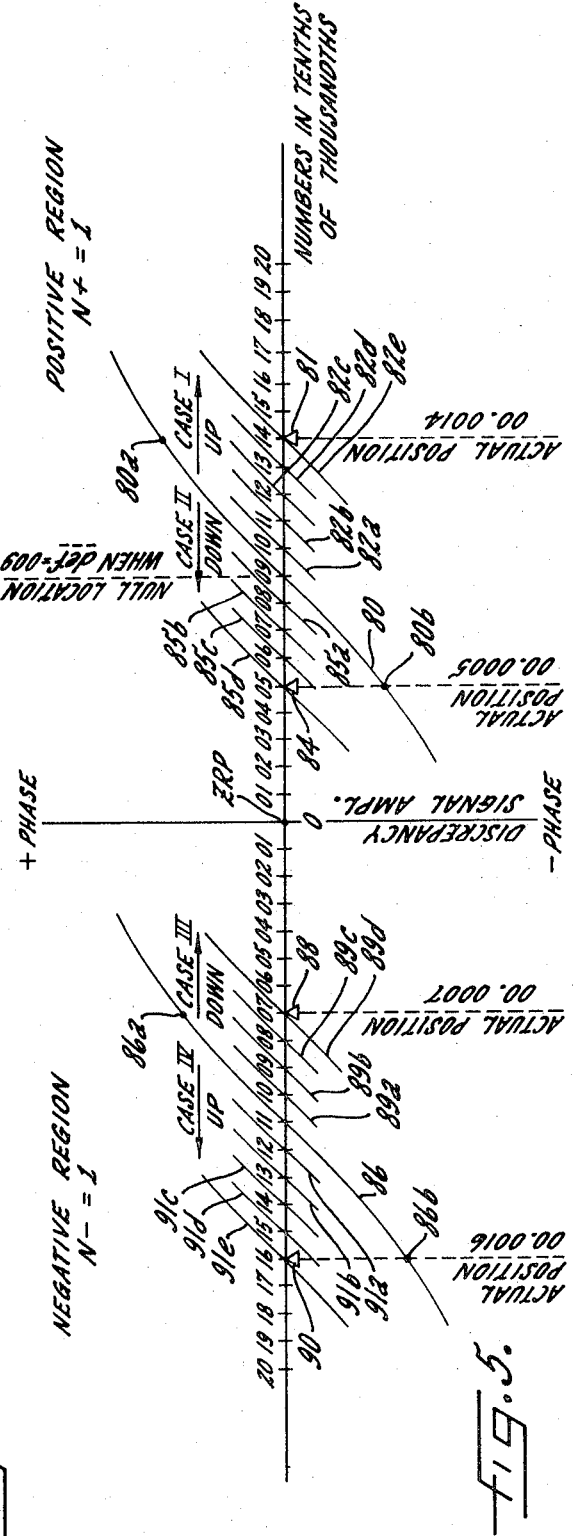

fig. 7.

$\theta_1 = m\alpha = 11 \times 3.6° = 39.6°$
$n=7; \theta_2 = n\beta = 7 \times .36° = 2.52°$
$\theta = \theta_1 + \theta_2 = 38.52°$ WHEN $mn=107$
$\cos\theta = \cos(\theta_1 + \theta_2)$
$\theta_1 = m\alpha = 10 \times 3.6° = 36°; \theta_2 = 0°$
$\cos\theta_1$
$\sin\theta = \sin(\theta_1+\theta_2)$
$\sin\theta_1$ fig. 8.

Jan. 5, 1971           T. B. BULLOCK           3,553,647
APPARATUS FOR NUMERICAL SIGNALING OF POSITIONS, INCLUDING
DIGITAL-TO-ANALOG CONVERTER
Filed April 21, 1967           13 Sheets-Sheet 6
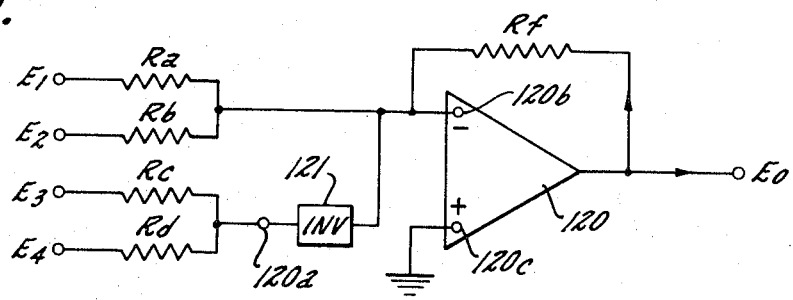
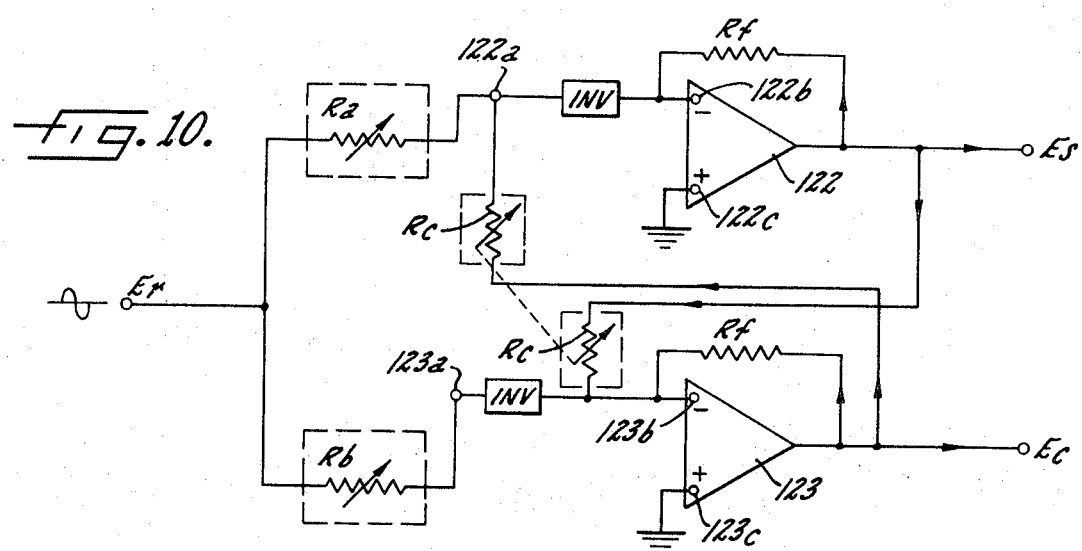
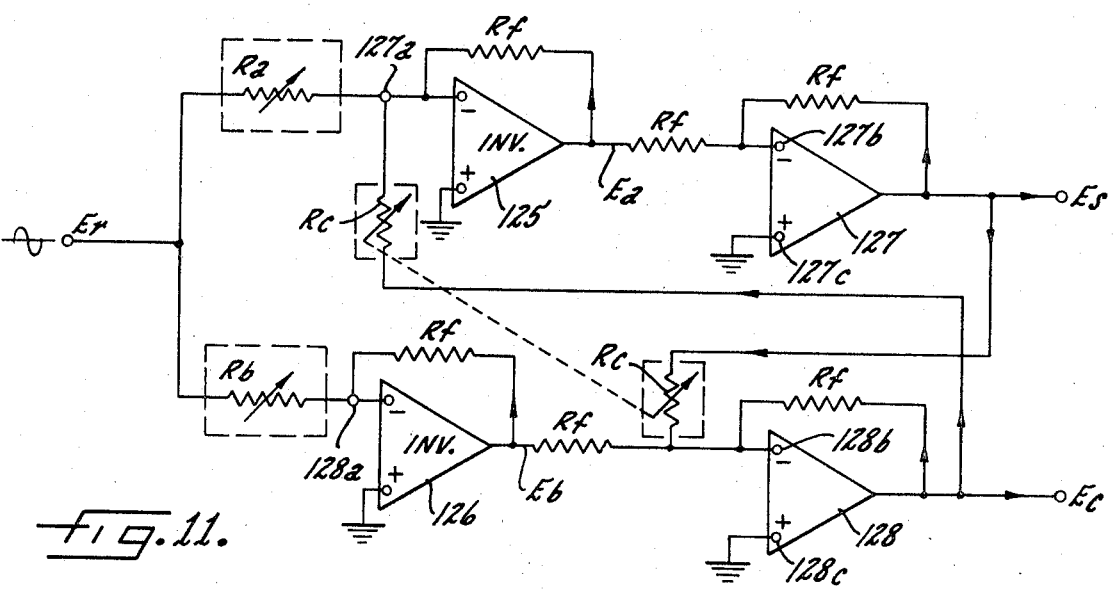
INVENTOR.
THOMAS B. BULLOCK,
BY
*Wolfe, Hubbard, Voit & Osann*
ATTORNEYS.

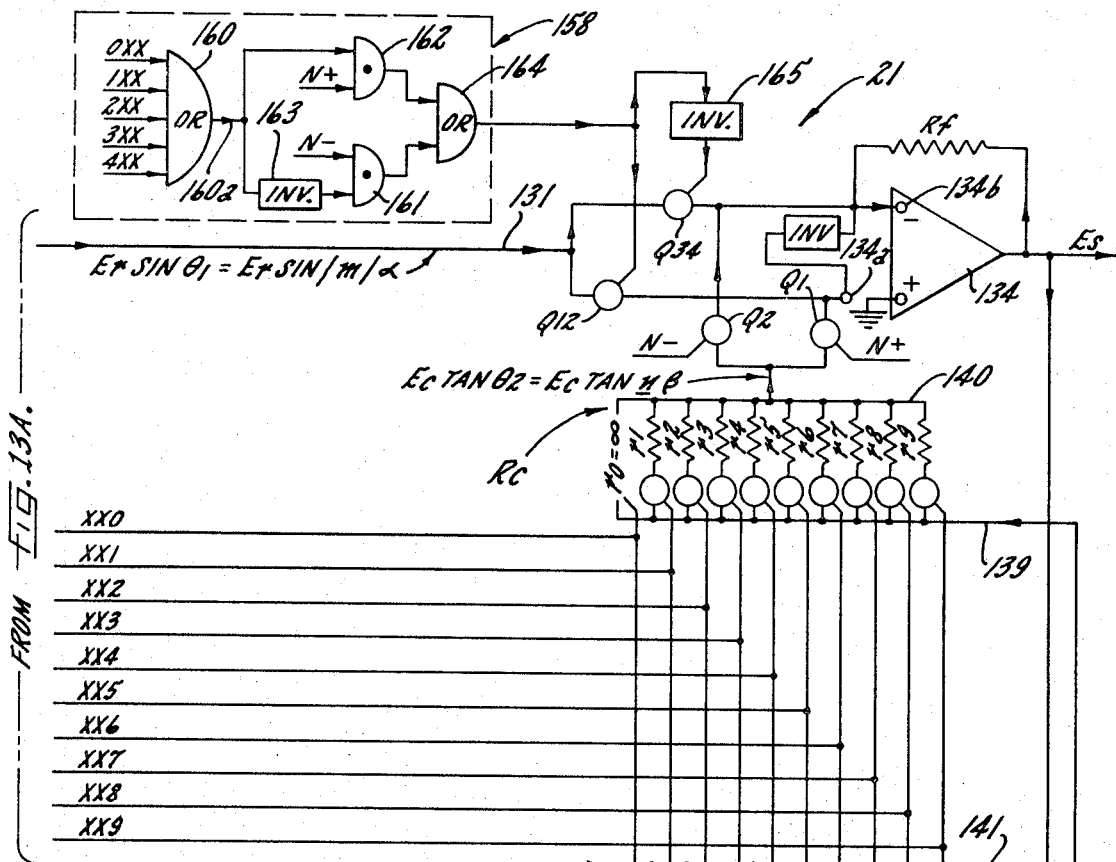
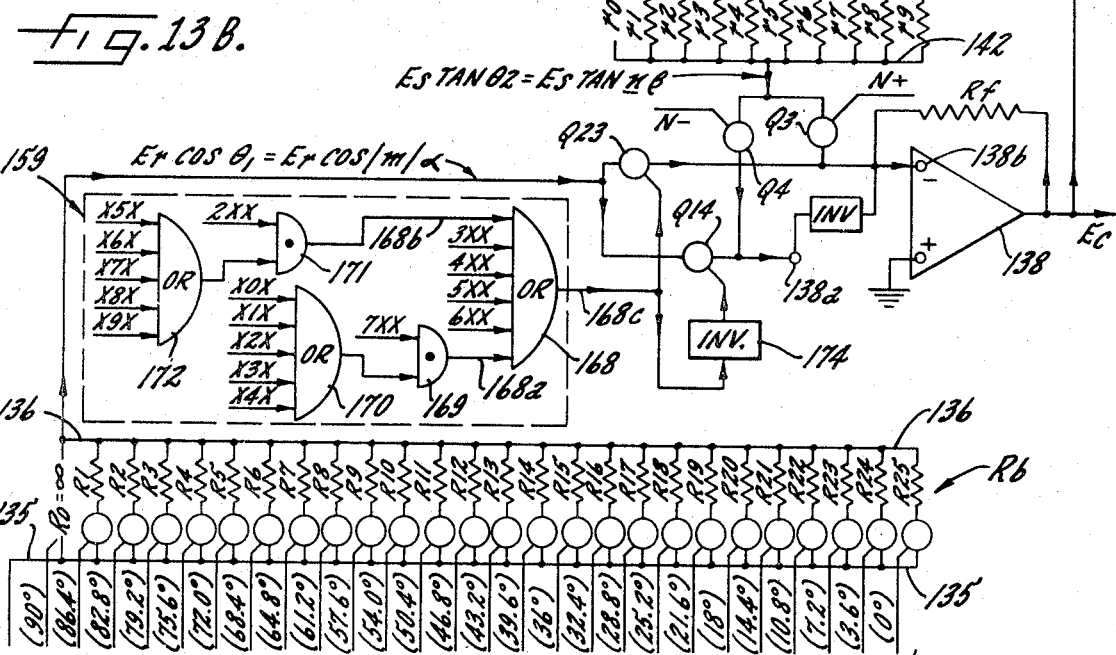
Fig. 13B.

Jan. 5, 1971     T. B. BULLOCK     3,553,647
APPARATUS FOR NUMERICAL SIGNALING OF POSITIONS, INCLUDING
DIGITAL-TO-ANALOG CONVERTER
Filed April 21, 1967     13 Sheets-Sheet 10

INVENTOR.
THOMAS B. BULLOCK,
BY Wolfe, Hubbard, Voit & Osann
ATTORNEYS.

United States Patent Office 3,553,647
Patented Jan. 5, 1971

3,553,647
APPARATUS FOR NUMERICAL SIGNALING OF POSITIONS, INCLUDING DIGITAL-TO-ANALOG CONVERTER
Thomas B. Bullock, Fond du Lac, Wis., assignor to Giddings & Lewis Inc., a corporation of Wisconsin
Filed Apr. 21, 1967, Ser. No. 632,591
Int. Cl. G08c 9/04; H03k 13/00
U.S. Cl. 340—147                                    24 Claims

ABSTRACT OF THE DISCLOSURE

Apparatus for producing digital signals which numerically represent at all times the position of a movable element as it moves to different positions along its path of travel. The digital signals in the form of bi-level voltages are produced in a multidecade reversible counter to represent the position numerically in binary coded decimal notation. These signals are supplied to a digital-to-analog converter whose analog output, corresponding to the represented position, is supplied to a resolver type transducer mechanically coupled to the element. The transducer produces a discrepancy signal representing the sense and extent of any difference between the numerically represented position and the actual position of the element. So long as the discrepancy signal exists, pulse producing means are enabled to supply pulses to the counter so as to correctively change the number signaled by the counter until the difference and the discrepancy signal are reduced substantially to zero. The closed loop correction is very rapid, so for practical purposes the number digitally signaled by the counter always represents the actual position of the movable element.

The digital-to-analog converter here disclosed is the type which produces sine and cosine function signals for excitation of a resolver type transducer. This converter is characterized by cross-coupling of the outputs and inputs of two algebraic combining devices such as operational amplifiers, by static switching means responsive to input signals digitally representing a changeable number, and by simple resistors selectively rendered effective to produce AC signals proportional to sine and cosine functions of the sums of angles corresponding to higher and lower order portions of the changeable number.

TABLE OF CONTENTS

| | Column |
|---|---|
| ABSTRACT OF DISCLOSURE | 1 |
| THE NUMERICAL POSITION SIGNALING SYSTEM, IN GENERAL | 4 |
| AN EXEMPLARY EMBODIMENT OF THE SYSTEM, IN DETAIL | 7 |
| DETAILS OF THE AMPLITUDE AND PHASE POLARITY DISCRIMINATOR | 10 |
| DETAILS OF THE SIGN CONTROL | 11 |
| DETAILS OF THE COUNT DIRECTION CONTROL | 12 |
| PRESETTING TO SELECT THE ZERO REFERENCE POINT | 15 |
| THE DIGITAL-TO-ANALOG CONVERTER | 17 |
| (A) Review of the Relationships Between Numbers and Signals for Exciting Resolver Type Devices | 17 |
| (B) General Organization for Producing Sine and Cosine Functions of Sums of Two Angles | 19 |
| (C) An Operational Amplifier Viewed as an Algebraic Signal-Combining Device | 20 |
| (D) The Digital-to-Analog Decoder in General Form | 22 |
| (E) A Preferred Version of FIG. 10 | 23 |
| (F) Changing the Resistance Values | 24 |
| (G) A Detailed Embodiment of the Present Decoder and Converter | 29 |
| (1) Control of effective signal polarities according to quadrants | 31 |
| (2) Changes in effective signal polarities depending upon sign of counter number N | 33 |
| RESUME OF SYSTEM OPERATION | 36 |
| A PREFERRED PULSE PRODUCER CONTROLLED IN FREQUENCY | 37 |
| A SIMPLIFIED AND PREFERRED EMBODIMENT OF THE DIGITAL-TO-ANALOG CONVERTER | 39 |
| AN EMBODIMENT OF THE DIGITAL-TO-ANALOG CONVERTER FOR COMBINING MORE THAN TWO CHANGEABLE ANGLES | 46 |

The present invention relates in general to apparatus for numerically signaling the position of a movable element as the latter resides in or moves to different positions along its path of travel. In another aspect, the invention relates to digital-to-analog converters of the type which produce signals proportional to sine and cosine functions of a numerically signaled, changeable plural digit number, such signals being usable to excite a resolver type transducer. The uses for the invention are many and varied, but it will find especially advantageous application in the control of the movable elements of machine tools, and in providing a visual display of numbers representing the positions of such machine tool elements.

It is the general aim of the invention to produce digital signals numerically representing the position of a movable element with a high degree of precision and very little dynamic error, and yet to accomplish this with relatively simple, reliable apparatus. This is accomplished by continuously determining any error or discrepancy between the signaled position and the actual position of the movable element, and correcting the signaled position rapidly, even as the element is moving, in a manner which does not require a pulse generator mechanically driven from the movable element and which avoids errors due to loss or spurious insertion of pulses from such a generator.

More particularly, an important object of the invention is to provide a digital position-signaling system wherein only one reversible, multistage counter is required to signal the digit values of a multiorder position representing number, and only the signals from lower order stages of that same counter are employed to effect automatic corrections in the signaled number so as to make the latter represent the actual position of a movable element. The single counter in this fashion serves two important functions, i.e., it numerically signals the complete position-representing number and it provides the input signals to automatically correct that number.

Another object of the invention is to provide a digital position-signaling system in which the zero reference point, from which element positions are measured and numerically signaled, may be quickly and precisely set to any desired location along the element's path of travel, and in a fashion which does not require that the element be moved physically to the desired zero reference point.

It is still another object to provide such a system wherein the position of the movable element is signaled by a signed number, i.e., as positive or negative displacement from a reference position, this being accomplished by employing a single counter and automatically signaling the sign of the number held therein as the element resides in positive or negative displacement regions on opposite sides of a zero reference point.

A related object of the invention is to provide such a digital position-signaling system in which the signaled position is always kept in agreement with the element's actual position by correcting the former until a resolver type transducer, e.g., a rotational resolver or a linear Inductosyn device, is conditioned to produce a null response.

It is a further object of the invention to provide such a system in which the signaled position-representing number is correctively increased or decreased as the displacement of an element from the zero reference point is increased or decreased—in either positive or negative regions—by controlling the sense of counting (upward or downward) in a counter in response to pulses admitted to the counter.

It is also an object to make the rate at which the signaled position-representing number changes generally proportional to the discrepancy between that number and the actual position of the movable element, so that fast correction is obtained when the discrepancy is large but overcorrection and hunting are avoided and dynamic lags kept small.

In another aspect, it is an important object of the invention to provide a digital-to-analog converter for changing a signaled multiorder number into sine and cosine function analog signals, such converter being characterized in its ability to respond very quickly to changes in the signaled number and in its relatively simple structural organization.

An especially important feature of such converter is its ability to produce sine and cosine function signals based upon the sum of variable larger and smaller angles which correspond to higher and lower order portions of a composite number, by virtue of a single structural organization which includes cross-coupling of algebraic combining devices.

Another object of the invention is to provide a converter which may be constructed without moving parts, physical switch contacts or inductive components, thereby to achieve rapid and precise operation as the number-representing input signals change at a high rate.

In this connection, it is an object to provide such a converter in which the number of resistors or related elements is kept small by providing those necessary to produce sine and cosine function signals over one quadrant of possible angles corresponding to one quarter of the range of signaled input numbers, and utilizing the same resistors with proper changes in effective signal polarities as a signaled input number takes on values corresponding to angles in the other three quadrants.

Still another object is to provide such a digital-to-analog converter which is responsive to the sign of the signaled input number, so that the sine and cosine function signals may properly excite a transducer to locate null positions in the positive or negative regions on opposite sides of a zero reference point.

These and other objects and advantages will become apparent as the following description proceeds with reference to the accompanying drawings, wherein:

FIG. 2 is a diagrammatic illustration in block-and-line form showing the system of FIG. 1 in more complete detail;

FIG. 3 is a block diagram drawn with conventional logic circuit symbols to show the detailed organization of certain components which appear in FIG. 2 only as simple blocks;

FIG. 5 is a graphical representation of the relationships between the signaled number, null location, and actual positions under different circumstances, and depicts the operation of the system in controlling the direction in which a counter counts;

FIG. 7 is a diagram showing a portion of the diagram of FIG. 6 drawn to an enlarged but purposely distorted scale to illustrate how any angle $\theta$ is constituted by the sum of two angles $\theta_1$ and $\theta_2$ which are respectively equal to $m\alpha$ and $n\beta$ as $m$ and $n$ have different values;

FIG. 8 is a block diagram showing cross-coupled algebraic combining devices as employed in the digital-to-analog converter;

FIG. 9 shows a typical algebraic combining device in the form of an operational amplifier;

FIG. 10 is a generalized illustration of a digital-to-analog converter which forms a part of the system shown in FIG. 2 and which embodies certain features of the present invention;

FIG. 11 is similar to FIG. 10 but shows in generalized form a preferred embodiment of the digital-to-analog converter;

Figure 6:
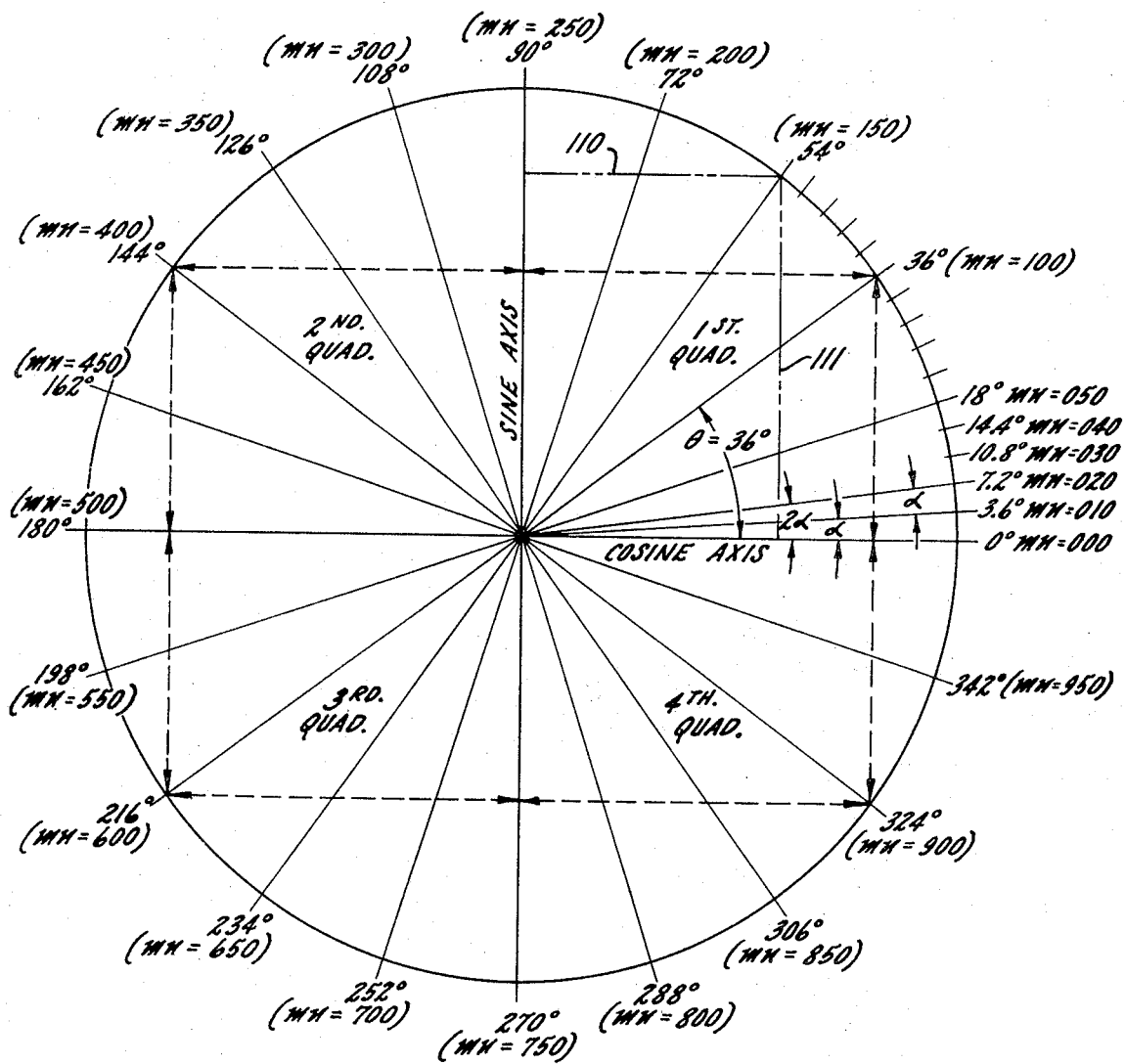
FIG. 6 is a chart which illustrates the relationships between the signaled input number, the corresponding angle, and the magnitude and polarities of sine and cosine functions of the angle.
Figure 13A:
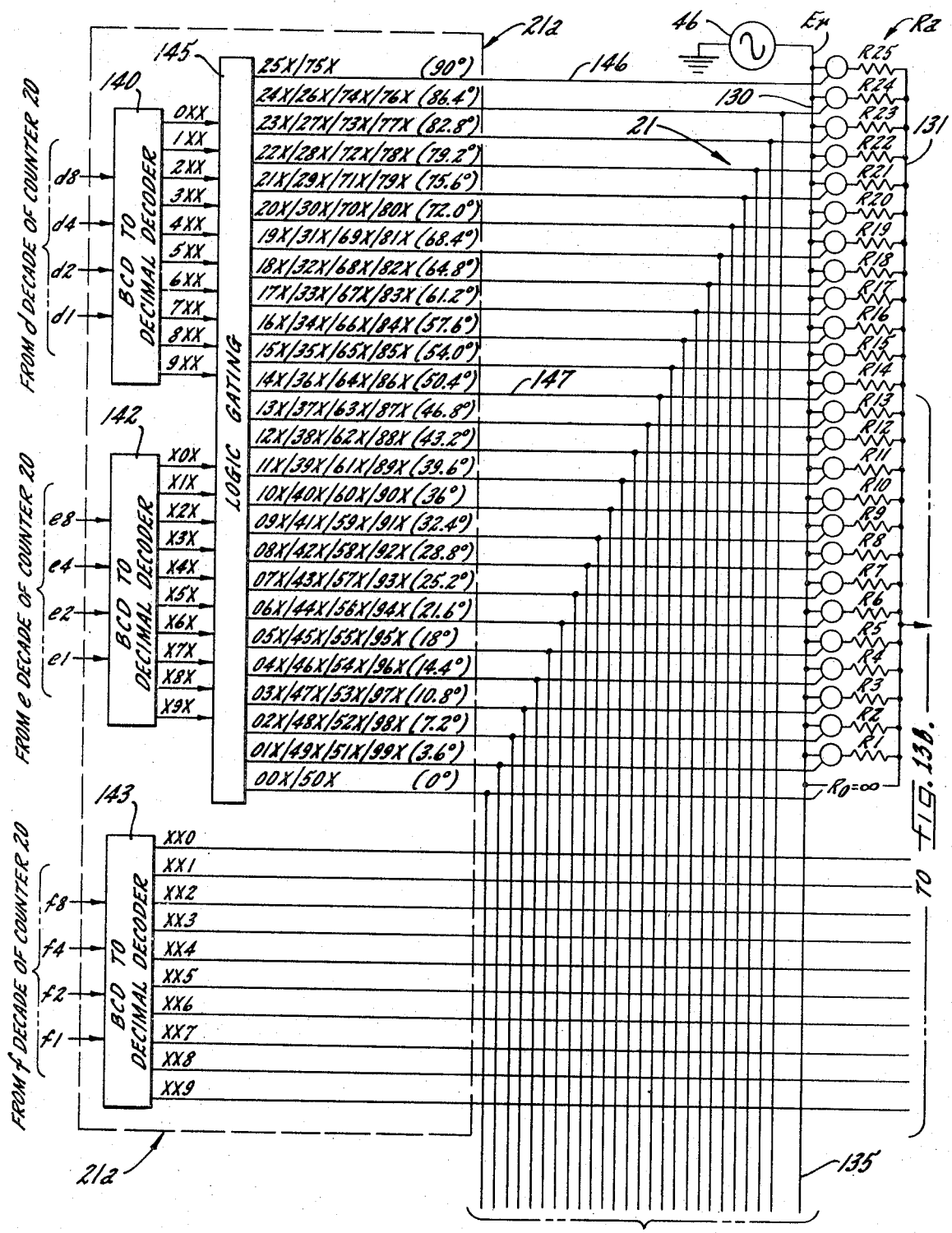
Figure 14:
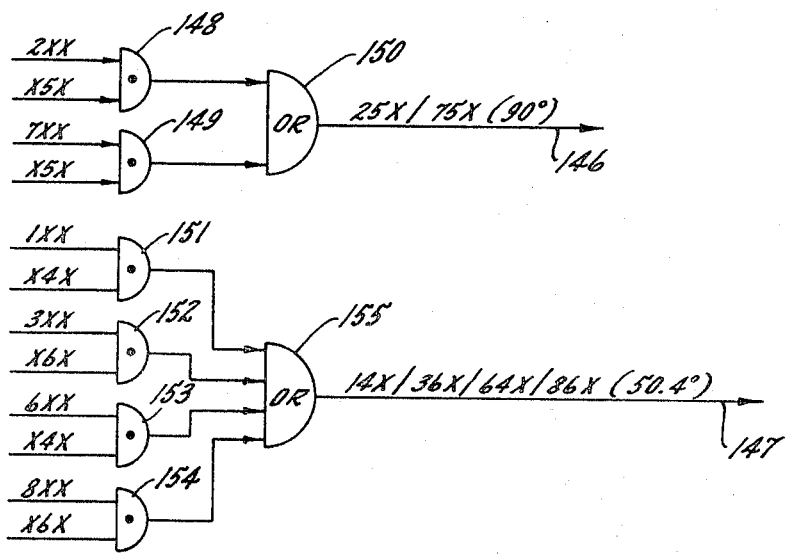
Figure 15:
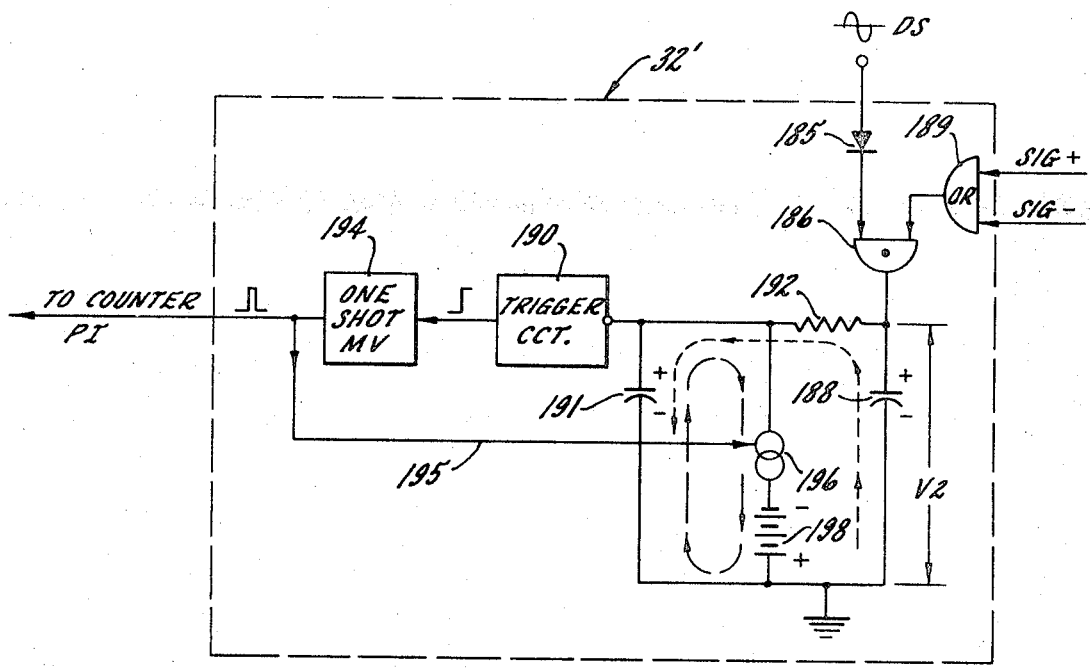
Figure 16:
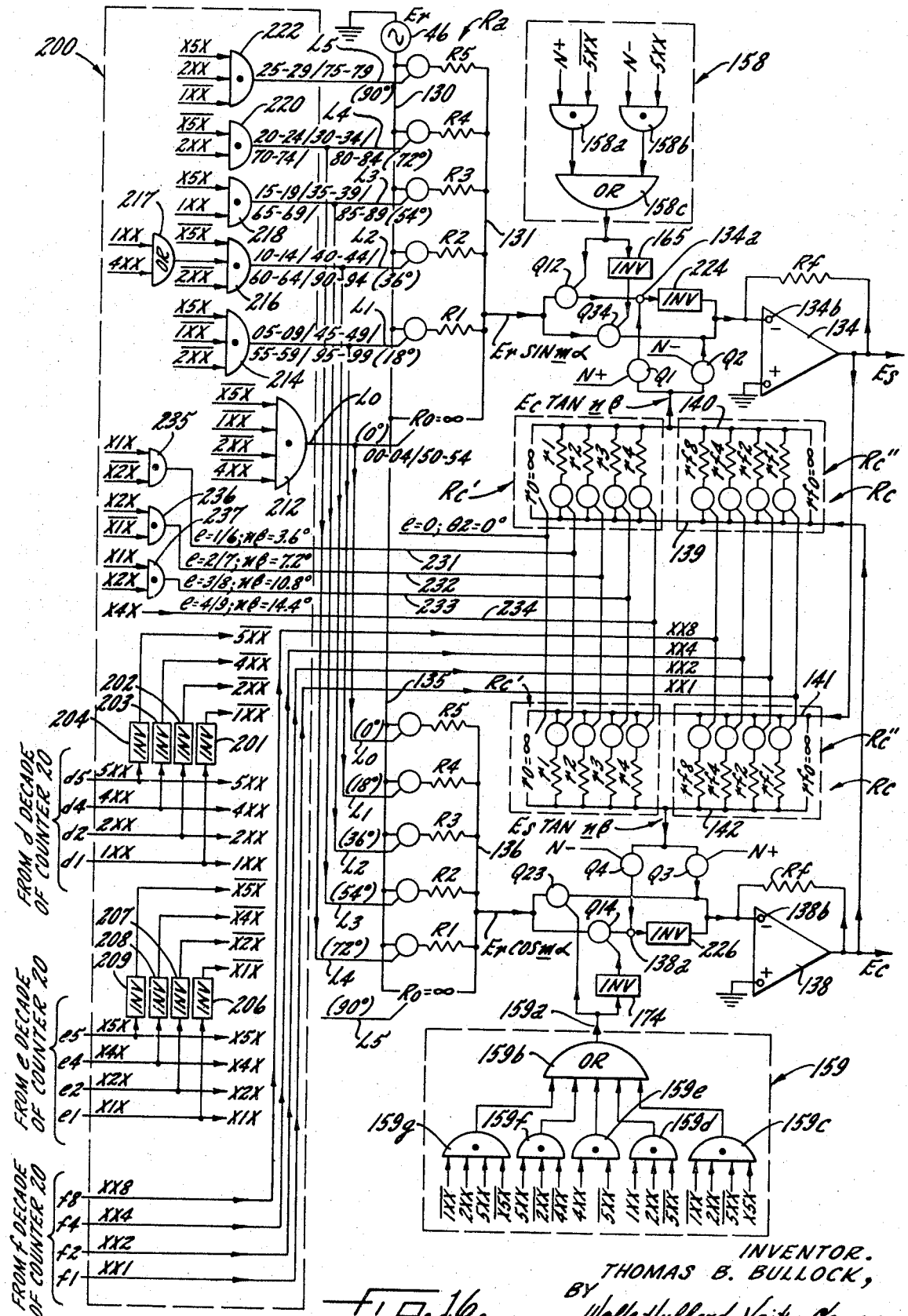
Figure 17:
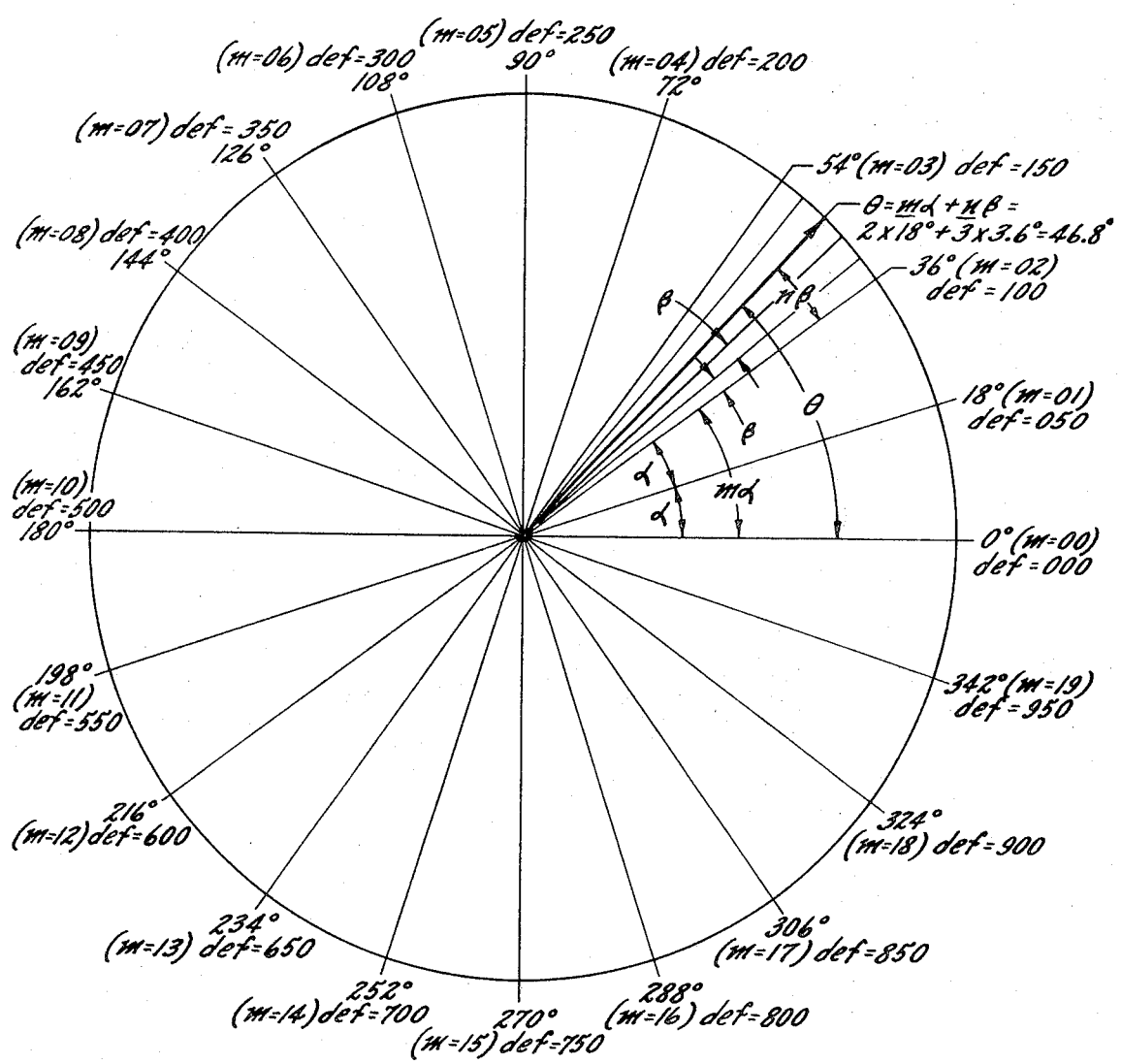
Figure 18:
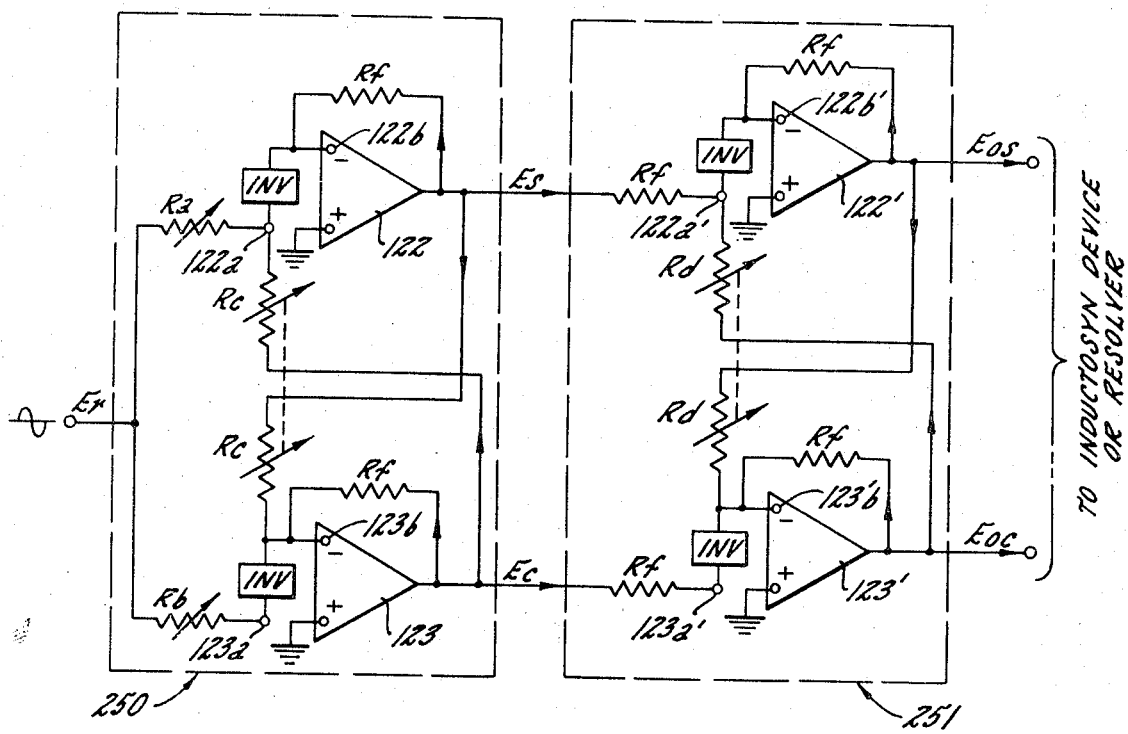

FIGS. 13A and 13B when joined together form a schematic diagram of the complete decoder and digital-to-analog converter which appears generally in FIG. 2;

FIG. 14 shows typical portions of the logic gating for FIG. 13A;

FIG. 15 is a detailed illustration of a variable frequency pulse producer which is preferably employed in lieu of the pulse producer shown in FIG. 2;

FIG. 16 is a schematic diagram of an alternative and preferred embodiment of the digital-to-analog converter;

FIG. 17 is a chart similar to that of FIG. 6 but showing the relation of numbers and angles for the apparatus of FIG. 16; and FIG. 18 is a generalized schematic diagram for still another alternative embodiment of the digital-to-analog converter.

While the invention has been shown and will be described in some detail with reference to particular embodiments thereof, there is no intention that it thus be limited to such detail. On the contrary, it is intended here to cover all modifications, alternatives and equivalents falling within the spirit and scope of the invention as defined by the appended claims.

THE NUMERICAL POSITION-SIGNALING SYSTEM, IN GENERAL

Figure 1:
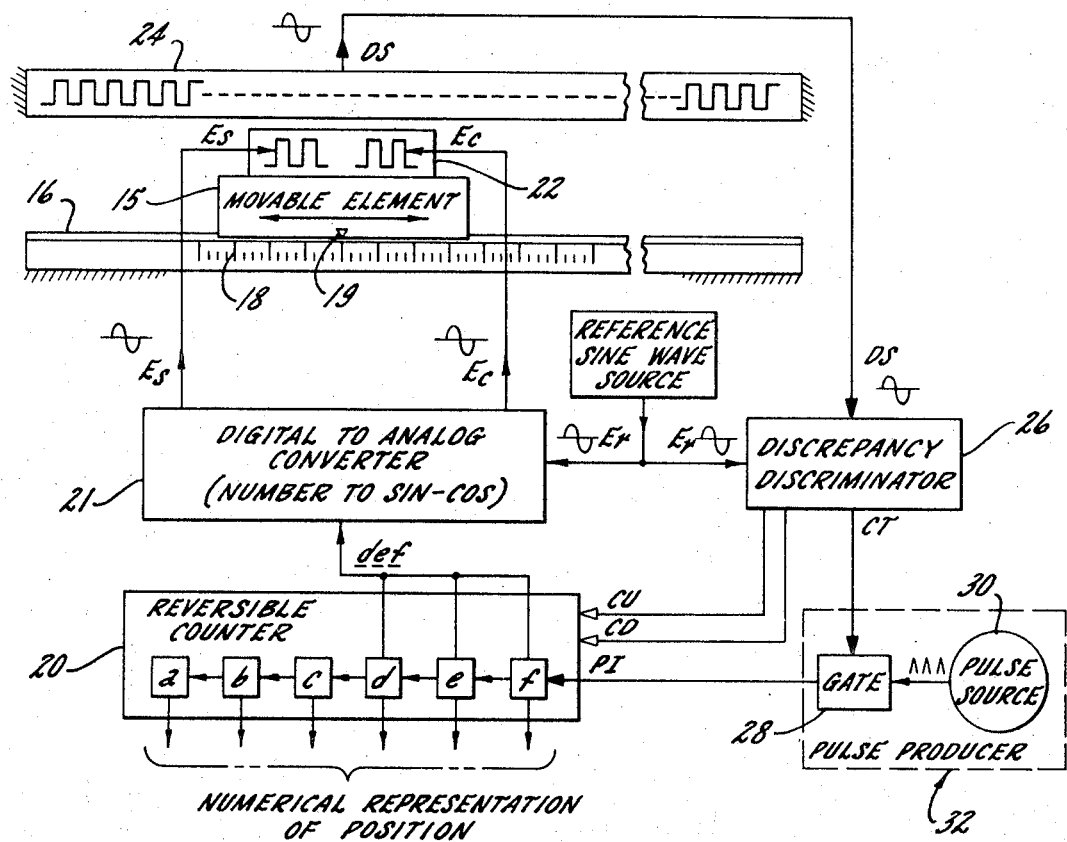
FIG. 1 is a generalized block diagram of a digital position-signaling system embodying the present invention.

The general organization and operation of the numerical position-signaling system may be understood by brief reference to FIG. 1 wherein an element 15 (for example, the work table of a machine tool) is movable horizontally to the left or to the right along a supporting bed 16 so that it may reside in different selected positions. The automatically or manually operated means for translating the element from one position to another are not shown. Merely as an illustration that the element's position may be designated in numerical terms, a calibrated scale 18 similar to, but more precise than, a yardstick is shown fixed to or scribed on the stationary bed, and the location of an index mark 19 carried by the element 15 with reference to the scale may be read visually in order to determine the numerical value of the element's position with respect to the zero point of the scale. Of course, where the range of travel of the element is on the order of 200", and the position of the element is to be determined with an accuracy to the nearest .0001", the provision of such a finely calibrated scale and the visual reading of it are impractical.

Yet, in the operation of machine tools, for example, there are many instances when it is desirable to determine and signal the position of a movable element with a high degree of accuracy. The numerical signaling of the position may be employed for the purpose of making that position conform to a commanded and numerically signaled position, as disclosed for example in the copending application of Jack A. Wohlfeil, Ser. No. 447,291 filed Apr. 12, 1965, and assigned to the assignee of the present application. Moreover, it is in many cases desirable to keep the machine tool operator informed of the position of a movable machine tool element so that he can bring it precisely to a desired location or so that he can check the operation of an automatic positioning control system. In these cases, the numerical signaling of the element's position may be caused to energize numerical visual display devices.

In many prior systems, the position of a movable element has been electrically signaled in binary or binary coded decimal notation by mechanically coupling a pulse generator to the element or to a lead screw which is rotated in order to move the element. One pulse for each incremental movement (e.g., .001″) is fed from the generator to a counter so that the number held in and signaled by the latter always represents the position of the element. This sort of arrangement is disclosed, for example, in the copending Wohlfeil application identified above. In such feedback pulse generating systems, there is always the danger that some feedback pulses will be "missed," i.e., not generated or not counted; and there is the corresponding danger that extra spurious pulses due to electrical "noise" might appear in the circuitry and be registered in the counter. In either case, the number signaled by the counter will then be in error.

The system shown generally in FIG. 1 overcomes these difficulties and does away with the need for a feedback pulse generator driven in timed relationship to the movement of the element. It includes a first means for signaling a represented position in numerical terms, by bi-level electrical signals representing the number in binary coded decimal notation. Such means are here shown as a reversible counter 20 having a plurality of decade counting stages $a, b, c, d, e, f$ connected in tandem, and with the lower order stage $f$ adapted to receive input pulses supplied to a pulse input terminal PI. As is well known in the counter art, each decade stage may include four bistate devices such as flip-flop circuits (not shown) interconnected by gates so that the bi-level signals on their output lines collectively represent any decimal value from 0 to 9 as ten successive input pulses are received by that stage. Thus, as shown in FIG. 1, the output lines from the successively lower order stages in the counter 20 will carry binary signals which represent any number $ab.cdef$ held in the counter, where each of the letters in the foregoing expression can have any decimal digit value from 0 to 9. The number held in and signaled by the counter may be increased or decreased by supplying pulses to the pulse input terminal PI while simultaneously applying an enabling signal to counter control terminals CU or CD, respectively, thereby causing the counter to count upwardly or downwardly. A counter of this general type is disclosed in detail in the above-identified Wohlfeil application.

In the practice of the present invention, the signaled position, i.e., the number signaled by the counter 20, is continuously compared with the actual position of the element 15, and a discrepancy signal indicative of the sense and extent of any difference between the signaled and actual positions is produced. So long as the discrepancy signal exists, indicating that the represented and actual positions do not agree, that signal activates a means for correctively changing the signaled position, e.g., means for supplying pulses to the counter 20 so as to change the number signaled thereby until the discrepancy is reduced substantially to zero. As generally illustrated in FIG. 1, the output signals from the lower order stages $d, e, f$ of the counter 20 are supplied to a digital-to-analog converter 21 which produces variable magnitude output signals $E_s$ and $E_c$ representing in analog form the numerically signaled position. More particularly, the analog output from the converter 21 represents the numerically signaled position to the nearest .0001″ within a span of 0.1000″, since the input number $def$ supplied to the converter may represent any distance from $xx.x000″$ to $xx.x999″$. The output signals $E_s$ and $E_c$ are in this instance sinusoidal alternating voltages which vary in amplitude and phase polarity according to sine and cosine functions of an angle $\theta$ which is the product of the signaled number $def$ and a predetermined increment angle $\beta$. The converter 21 receives as its input signal a sinusoidal reference voltage $E_r$, and the two output signals vary in amplitude relative to the amplitude and phase of the reference signal $E_r$ as sine and cosine functions of the angle $\theta$. That is, $E_s = E_r \sin \theta = E_r \sin def \cdot \beta$ and $E_c = E_r \cos \theta = E_r \cos def \cdot \beta$. Merely by way of example, the number $def$ represented by input signals to the converter 21 can take on any value between 000 and 999; and if the predetermined increment angle $\beta$ is 0.36°, then the angle $\theta$ can have any value from 0° to 359.64° in steps of 0.36° as the number $def$ changes from 000 to 999.

These sine and cosine function signals $E_s$ and $E_c$ are suitable for excitation of a transducer which is responsive to the element's position to produce a discrepancy signal. More particularly, the transducer employed is of the "resolver type" which is mechanically coupled to the movable element and thus is responsive to its actual position. The term "resolver type" device is used here as a generic designation for that class of well known devices exemplified by (a) a standard wound-rotor and wound-stator rotary induction resolver, (b) a rotary Inductosyn unit, or (c) a linear Inductosyn unit. If the movable element 15 is one which travels in a circular path instead of the linear path here shown, then the rotor of a conventional resolver or a rotational Inductosyn unit would be mechanically coupled to the element either directly or through precision gearing. Also, in the case where the element 15 is translatable along a linear path by a precision lead screw, a conventional rotary resolver or a rotational Inductosyn unit might be connected directly or through precision gearing to the lead screw so as to be responsive to the actual position of the element. As here shown in FIG. 1, however, a linear Inductosyn unit is employed, comprising a slider 22 rigidly fixed to and movable with the element 15 along a path closely adjacent to a stationary scale 24.

Linear Inductosyn devices have been described in numerous publications (e.g., Journal of British I.R.E., vol. 17, No. 7, pp. 369–383, July 1957) and are well known to those skilled in the art. It will suffice, therefore, to observe briefly that the sine and cosine signals from the converter 21 are connected respectively to excite two physically displaced and interlaced ribbon-like conductors or "windings" on the slider 22, and the resulting electromagnetic field induces an output signal in a ribbonlike conductor or "winding" which extends the length of the scale 24. In summary terms, sinusoidal alternating voltage induced in the scale 24 varies in amplitude and phase polarity (relative to the reference voltage $E_r$) according to the sense and extent of the difference between the signaled position represented by the excitation signals $E_s$ and $E_c$ supplied to the slider and the actual position of the slider relative to the scale (over a predetermined fine span, for example, 0.1000″). That is, the excitation signals $E_s$ and $E_c$ represent an analog of the signaled position of the element corresponding to the number $def$; the position of the slider 22 is a true analog of the actual position of the element 15; and the output signal from the scale 24 by its amplitude and phase polarity is an analog of the discrepancy between the signaled and actual positions. When the discrepancy is reduced to zero, the output signal from the scale (here called the discrepancy signal DS) is reduced substantially to a zero amplitude. More particularly, since it is assumed that the Inductosyn device 22, 24 has a repeating fine span of 0.1000″, any given value of the number $def$ and the corresponding combination of the signals $E_s$ and $E_c$ will represent a plurality of "signaled positions" or null locations uniformly spaced apart by 0.10″ along the path. The discrepancy signal DS is proportional in amplitude, and agreeable in polarity with, a sine function of the extent and sense of the difference between the actual position of the element 15 and the nearest one of the null positions represented by the number $def$, but in the region of any null it may be assumed that the discrepancy signal DS is generally proportional to the extent of the said difference.

The discrepancy signal DS is received by a discriminator 26 which serves two functions. First, if the signal position is numerically less than or greater than the actual position of the element 15, the discriminator 26 in comparing the phase relationship of the reference signal $E_r$ and the discrepancy signal DS supplies an enabling potential to the counter control terminals CU or CD, respectively, so that the counter will count in an "up" or "down" sense in response to any pulses received on its input terminal PI. Secondly, so long as the discrepancy signal is in amplitude appreciably greater than zero, the discriminator 26 produces a count signal CT which opens a normally closed gate 28, permitting the latter to transfer pulses from a recurring pulse source 30 to the counter input terminal PI. The gate 28 and the pulse source 30 collectively constitute a pulse producer 32 controlled by the discriminator so as to admit pulses to the counter 20 whenever the number signaled by the latter does not precisely represent the true position of the element 15 as sensed by the Inductosyn unit 22, 24.

To summarize the operation briefly, it may be assumed that the counter 20 originally holds and signals on its output lines a number 21.5243; and that the element 15 resides precisely at a position of 21.5243″ from the reference point of measurement. The number $def$ signaled on the counter output terminals and supplied to the converter 21 will be 243, and assuming that the increment angle $\beta$ is 0.36″, the sine and cosine signals will in amplitude be proportional to sin 87.48° and cos 87.48° times the amplitude of the reference signal $E_r$. This combination of excitation signals applied to the two conductors in the slider 22 establishes an electromagnetic field which induces no discrepancy signal in the scale 24 when the slider is at any physical position designatable $xx.x243″$ (the small $x$'s in a numerical expression indicate that the corresponding digits may have any value). Thus, under the assumed conditions, the discrepancy signal has zero volts amplitude, the discriminator 26 produces no count signal CT, the gate 28 is closed, and no pulses are supplied to the counter 20. Because the signaled position agrees precisely with the actual position of the element 15, the number signaled by the counter remains constant.

If now the element 15 is moved to the right, so that its actual position becomes greater than 21.5243″, then the discrepancy signal DS will increase in amplitude with a positive phase polarity (i.e., it will be in phase with the reference signal $E_r$), so that discriminator 26 will supply an enabling potential to the control terminal CU, and will create a count signal CT to open the gate 28. Accordingly, as the element 15 moves to the right, pulses will be admitted to the counter 20 and counted in an upward sense, so that the signaled position will increase. By the time that the element moves to and stops in a position of 22.8130″, the counter will almost simultaneously arrive at a higher count state in which the numerically signaled position is 22.8130, and the discrepancy signal DS will return to zero, and the gate 28 will close to leave the counter in a state precisely representing the new actual position of the element. The same sort of operation will occur when the element 15 is moved from a first position toward the left to a second position, although in this instance the counter will count downwardly in response to input pulses received thereby until the signaled position agrees precisely with the new, numerically smaller actual position.

AN EXEMPLARY EMBODIMENT OF THE SYSTEM IN DETAIL

Referring now to FIG. 2, the counter 20 is there shown in more detail as comprising six decade stages corresponding to the digit orders $10^1$, $10^0$, $10^{-1}$, $10^{-2}$, $10^{-3}$, and $10^{-4}$ with each stage having four output lines on which appear bi-valued voltages (for example, 0 volts or +12 volts representing the binary levels "0" or "1") which represent any decimal value from 0 to 9 in the familiar 1-2-4-8 decimal code. For ready understanding of the operation of each counter stage in the "count up" mode, this 1248 code notation is set forth below:

TABLE I

| Pulses received: | Output line levels | | | | Decimal No. signaled |
|---|---|---|---|---|---|
| | 1 | 2 | 4 | 8 | |
| 0 | 0 | 0 | 0 | 0 | 0 |
| 1 | 1 | 0 | 0 | 0 | 1 |
| 2 | 0 | 1 | 0 | 0 | 2 |
| 3 | 1 | 1 | 0 | 0 | 3 |
| 4 | 0 | 0 | 1 | 0 | 4 |
| 5 | 1 | 0 | 1 | 0 | 5 |
| 6 | 0 | 1 | 1 | 0 | 6 |
| 7 | 1 | 1 | 1 | 0 | 7 |
| 8 | 0 | 0 | 0 | 1 | 8 |
| 9 | 1 | 0 | 0 | 1 | 9 |
| 10 | 0 | 0 | 0 | 0 | 0 Carry pulse to next stage |

Of course, when the counter is operating in the "count down" mode, each pulse received by a stage causes the latter to revert to its next lower decimal state, and when the stage switches from the decimal "0" to the decimal "9" state, a "borrow" pulse is transmitted to the next higher order stage in the tandem array. The counter counts "up" or "down" in response to pulses received on its terminal P1 while an enabling or binary "1" level signal is applied to its control terminal CU or CD from a count direction control 35 to be described more fully below.

Other types of multiplace reversible counters may be employed, for example, those formed by ten-cathode counter tubes; and other signal notations (e.g., binary, straight decimal or different binary decimal codes) may be employed as a matter of choice. In the exemplary arrangement of FIG. 2, the position-representing number $ab.cdef$ which can have any value between 00.0000 and 99.9999 may be signaled by the bi-level voltages which appear in different patterns on the six groups of four output lines of the counter. Of course, a greater or lesser number of digit places may be used. For convenience in the following description, the changeable six-place number signaled by the counter 20 will be referred to as number N.

It is contemplated that the reference point from which the position of the element 15 is measured and numerically signaled may be located anywhere along the path which the element 15 travels, and that the element may move to either positive or negative regions on opposite sides of the reference point. For example, if the reference point is at the middle of a travel path which is 100″ long, then when the element is located 25″, 50″ or 75″ from the left extremity of the path, its position will be numerically designated as —25.0″, 0.0″, or +25.0″. In order to signal the sign of the number N established in the counter 20, a bistate sign flip-flop 36 is associated with the counter. When this flip-flop is in its set or reset states, the signals N+ and N— appearing at its two output terminals will respectively reside at binary "1" levels, indicating that the sign of the counter number N is positive or negative, respectively. The manner in which the state of the sign flip-flop is switched by a sign control 38 will be treated hereinafter.

To display in visual form the numerically signaled position, the output lines of the counter 20 are connected to actuate a multidigit lighted numerical display system. For example, the decade stage $c$ of the counter 20 has its four output lines connected as inputs to a BCD-to-decimal decoder 39 so that as the $c$ digit of the signaled number has any value 0 through 9, a corresponding one of the ten output lines 0 through 9 of the decoder 39 receives an energizing voltage which is applied as a controlling input to a $c$ digit display unit 40, thereby causing the corresponding decimal numeral 0 through 9 to appear visually illuminated on the face of that unit. The display unit 40 may be, for example, one of the well-known Nixie tubes or any of the several projection type numerical display devices which are presently available on the commercial market. The other five digit places for the counter 20 are associated with decoders and display units in precisely the same fashion so that the entire position-representing number N may be easily read by an operator.

For displaying the sign of the counter number N, the N+ and N— signals are supplied to a sign display unit 41 which shows an illuminated + or — symbol whenever the sign flip-flop 36 is respectively in its set or reset states, and the N+ or N— signal resides at a binary "1" level.

The number N signaled in 1–2–4–8 binary coded decimal notation by the potential levels on the twenty-four counter output lines may be utilized for computation and control purposes, as well as for actuating the visual display units. Merely to illustrate this fact, the twenty-four output lines of the counter 20 are shown in FIG. 2 as leading through a multiconductor cable 42 to other utilization devices which are not specifically illustrated. Moreover, it is desirable in the control of the present numerical display system to produce a signal when the number contained in the counter 20 is zero, i.e., when N=00.0000. In FIG. 2, the twenty-four output lines from the counter 20 are shown as leading to zero a detector 44 which produces an output signal Z at a binary "1" level only when the complete counter number N is zero. The manner in which the signal Z is utilized will become clear from subsequent portions of the present disclosure.

The twelve output lines of the three lowest order counter stages $d$, $e$, $f$ are also coupled to the input of a decoder 21a which forms a part of the digital-to-analog converter 21. These three groups of four output lines are here conveniently designated $d8$, $d4$, $d2$, $d1$; $e8$, $e4$, $e2$, $e1$; and $f8$, $f4$, $f2$, $f1$. Merely to give an example, if the number $def$ (formed by the three lowest order digits of the number N) signaled on these twelve counter output lines is 764, then they will reside at the following binary levels, reading from left to right: 0111 0110 0100. Any number $def$ between 000 and 999 may thus be signaled by the three lowest order stages of the counter and supplied as the input to the decoder 21a.

The output conductors from the decoders 21a supply signals in a different form to the input of the converter 21, as will be fully explained below. For the present, it may be assumed that the converter 21 receives an exciting reference voltage $E_r$ from a sinusoidal reference wave generator 46 which may be a continuously running oscillator operating at a frequency of 1000 hertz. In response to the number-representing signals received from the decoder 21a, the converter 21 produces two sinusoidal voltages $E_s$ and $E_c$ which vary in amplitude and phase polarity (relative to the reference voltage $E_r$) as sine and cosine functions of an angle $\theta$ which is proportional to the value of the signaled number $def$. This will be explained more fully as the details of the converter 21 are described hereinafter.

The sine and cosine signals $E_s$ and $E_c$ are transferred through a manually adjustable differential resolver 48, whose purpose will become apparent later (and through appropriate impedance matchers or amplifiers, not shown), to the "sine winding" 22a and the "cosine winding" 22b of the Inductosyn slider 22. Assuming for the moment that the stator and rotor windings of the differential resolver 48 are alined, the voltages $E_s$ and $E_c$ will be transferred through the resolver to the slider 22 without substantial change.

As noted previously, the slider 22 is rigidly fixed to or carried by the movable element 15, and the latter is illustrated in FIG. 2 as rigidly connected to a nut 49 engaged with a lead screw 50 rotationally and selectively drivable in opposite directions by a motor 51 controlled by any suitable manual or automatic positioning control system 52.

When the signaled position and the actual position of the element 15 disagree, then the sine and cosine excitation signals applied to the slider 22 will cause an alternating discrepancy signal or voltage to be induced in the winding 24a of the scale 24. This signal is passed through an amplifier 54 and appears as the sinusoidal discrepancy signal DS which is routed to one input of an amplitude and phase polarity discriminator 55. This discriminator also receives as a second input a recurring square wave signal REF matched precisely in frequency and phase to the reference signal $E_r$, and derived from the latter by a squaring circuit 56. As hereinafter made clear, if the signaled number is less than or greater than the actual position of the element 15, then the discriminator 55 produces a SIG+ or a SIG— signal, respectively, and the latter are utilized in determining the direction of corrective counting by the counter 20 and in determining the correct sign for the counter number. Moreover, when the discrepancy signal has an amplitude greater than zero or a predetermined small null value, the discriminator 55 produces a count signal CT which opens the gate 28 in the pulse producer 32 to admit pulses from the source 30 to the counter 20.

DETAILS OF THE AMPLITUDE AND PHASE POLARITY DISCRIMINATOR

Although other suitable discriminators will suggest themselves to those skilled in the art, one preferred form as shown in FIG. 3 includes a field effect transistor 60 having its gate terminal G connected to receive the square wave reference voltage REF, its source terminal S connected to receive the sinusoidal discrepency voltage DS, and its drain terminal D connected through a capacitor 61, paralleled by a bleeder resistor 62, to a point of common reference potential here shown as ground.

As is well known, a field effect transistor (hereinafter called an "FET") presents an extremely high resistance (which may be viewed as an opened circuit, for purposes of discussion) between its source and drain terminals S, D so long as the gate G is held at a potential substantially negative with respect to the drain D and the source S. This negative "turn-off" potential will here be considered as a binary "0" level. Conversely, when the gate G is raised to a potential at or slightly positive (here termed a binary "1" level) with respect to the potential of the drain D, then a very low resistance (which may be viewed as a short circuit for purposes of discussion) exists between the source and drain terminals, so that current may flow readily between the source and the drain—and in either direction.

With this in mind, it will be seen that when the discrepancy signal DS is in phase with the reference signal REF (compare the wave forms 64 and 65 in FIG. 4), then during the positive half cycles of the reference wave, the source-drain path of the FET 60 will be conductive, and the signal DS will make the source positive with respect to ground. Accordingly, current will flow from the source to the drain (during positive half cycles of the signal DS, shown shaded on the wave form 65 in FIG. 4), charging the capacitor 61 positively (uncircled polarity signs)—and to a voltage level which is proportional to the peak amplitude of the discrepancy signal DS. Under these conditions, the source-drain path of the FET 60 will be nonconductive during the negative half cycles of the reference voltage REF, so that during the negative half cycles of the discrepancy signal DS the capacitor is not discharged, except to a very slight degree by current passing through the resistor 62. Since the capacitor can discharge only slowly through the resistor 62, and the positive half cycles of the signals DS recur frequently to recharge the capacitor, the voltage V1 which appears across the capacitor is held substantially constant at a magnitude which is proportional to the peak amplitude of the discrepancy signal.

Figure 4:
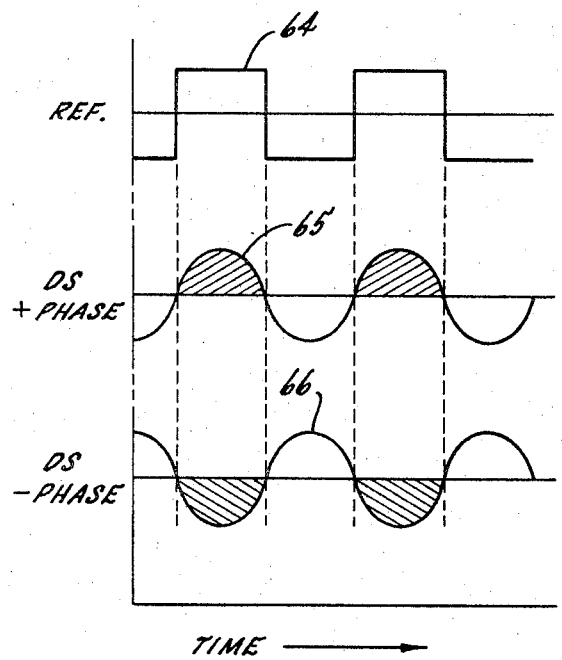
FIG. 4 is a series of wave forms which depict the relationships of certain signals in the operation of the amplitude and polarity discriminator shown in FIG. 3.

On the other hand, when the discrepancy signal is 180° out of phase (here called a negative phase polarity) with the reference wave REF, the FET 60 will conduct current from the drain D to the source S as a result of the negative half cycles of the discrepancy signal which coincide with the positive half cycles of the reference signal. Compare the curves 64 and 66 which are shown in FIG. 4, and observe that the source-drain path of the FET 60 will conduct current during the shaded negative half cycles shown in association with the curve 66. In this case, the capacitor 61 will be charged negatively (circled polarity signs) and to a voltage magnitude which is proportional to the peak amplitude of the discrepancy signal.

Under normal circumstances the discrepancy signal DS will be substantially zero in amplitude, and the voltage V1 appearing across the capacitor 61 will normally be zero. However, when the discrepancy signal exists with a positive or negative phase polarity, then the D.C. voltage V1 will appear across the capacitor, corresponding in polarity and magnitude to the phase polarity and amplitude of the discrepancy signal.

As a way of representing the phase polarity of the discrepancy signal by binary logic signals, the voltage V1 is supplied as the input to two trigger circuits 68 and 69 which may be similar or equivalent to the well known Schmitt triggers. The first trigger circuit responds only when the voltage V1 is positive in polarity and greater than a predetermined, small magnitude. Under these conditions, the trigger circuit 68 is "set" and it produces an output signal SIG+ at a binary "1" level. By contrast, the second trigger circuit is arranged to respond only when the voltage V1 is negative in polarity and greater than a predetermined, small magnitude. When triggered under these circumstances, the circuit 69 produces an output signal SIG— at a binary "1" level. The SIG+ and SIG— signals are connected as inputs to the sign control 38 and the count direction control 35 as shown in FIGS. 2 and 3.

The triggering levels of the circuits 68 and 69 may be adjusted by setting control rheostats 68a and 69a associated therewith, such adjustments being made in order to preclude triggering in response to minute noise signals which might appear at their inputs. Moreover, the triggering levels of the circuits 68 and 69 may be adjusted so that neither circuit triggers when the voltage V1 is reduced to a very low level corresponding to a null response in the scale 24 in those cases where a null is not indicated by the discrepancy signal falling completely to zero volts amplitude.

As shown in FIG. 3, the SIG+ and SIG— signals are supplied as inputs to an OR circuit 70, the output of the latter creating the count signal CT at a binary "1" level when either the SIG+ and SIG— signal is a binary "1." The appearance of the count signal CT opens the gate 28 (FIG. 2) as previously explained. In summary, it will now be understood that the amplitude and phase polarity discriminator 55 serves as a means for producing a first control signal CT so long as the discrepancy signal has greater than a predetermined, small amplitude (preferably zero); and it also constitutes a means for producing second and third control signals SIG+ and SIG— when the phase polarity of the existing discrepancy signal is positive or negative relative to the reference voltages REF and $E_r$. Conversely, when the discrepancy signal is reduced substantially to zero, the CT, SIG+ and SIG— signals all revert to a binary "0" level.

DETAILS OF THE SIGN CONTROL

As mentioned previously, the changeable number $N=ab.cdef$ signaled by the counter 20 may represent the position of the element 15 in terms of its displacement in a positive or negative direction from a zero reference point located on the path of travel. Thus, the signaled number N must also have a signaled sign to be complete, and the bistate flip-flop 36 when in its first or second (set or reset) states makes the signals N+ or N— respectively have a binary "1" level to represent the number sign as positive or negative.

To make certain that the bistate flip-flop 36 is always correctly set or reset, means in the form of the zero detector 44 (FIG. 2) are provided to produce the signal Z whenever the complete counter number N is zero. The signal Z will thus switch at least momentarily to a "1" level when the number N in the counter 20 is reduced to zero, and irrespective of whether this occurs due to the element approaching the zero reference point by movement to the left or right from the positive or negative regions of its path.

Secondly, means are provided to drive the sign flip-flop 36 to its set or reset state, respectively, in response to the concurrent existence of (a) the zero signal Z and a discrepancy signal DS of positive polarity, or (b) the zero signal Z and a discrepancy signal DS of negative polarity. As shown in FIGS. 2 and 3, the sign control 38 to serve this function comprises two AND gates 75 and 76, respectively, connected to receive the SIG+ and SIG— signals, and both connected to receive the Z signal, as controlling inputs. The gates 75 and 76 have their outputs S+ and R— respectively connected to the set and reset input terminals of the sign flip-flop 36.

Assume that the element 15 is at rest in the positive region of its path so that the signal N+ is at a "1" level, the signal DS has zero amplitude, and signals SIG+ and SIG— are at "0" levels. If the element moves to the left toward the zero reference point, signal DS will become finite with a negative phase polarity, the SIG— signal will switch to a binary "1" level, the signal CT will change to a "1" level, and pulses will be admitted to the counter 20 to make the latter count down, thereby decreasing the number N. If the element 15 continues to move through the zero reference position and into the negative region, then at the instant the number N is reduced to zero and the signal Z switches momentarily to a "1" level, the gate 76 will make its output signal R— a "1," thereby resetting the flip-flop 36. The signals N+ and N— thus switch to binary "0" and "1" levels, and the display unit 41 will thereafter show a — symbol.

Conversely, if the element 15 resides initially in the negative region (and the flip-flop 36 is reset to make N— a "1") but moves to the right through the zero reference point to the positive region, the counter number N will decrease to zero. At the instant this occurs, the signals Z and SIG+ are simultaneously at the "1" level, and the output signal S+ from the gate 75 will thus switch the flip-flop 36 to its set state, making the signal N+ a binary "1." When it is once placed in its set or reset state to signal that the counter number N is positive or negative, the flip-flop 36 will remain in that state so long as the element 15 remains in the positive or negative region of its path. Each time the element 15 passes through the zero reference point from the positive to the negative region (or from the negative to the positive region), the flip-flop will be switched to its reset (or set) state, so that the sign of the number N will be signaled as negative (or positive) by virtue of the N— signal (or the N+ signal) residing at a binary "1" level.

DETAILS OF THE COUNT DIRECTION CONTROL

As pointed out below, the signaled number *def* represents the indicated position of the movable element, and the sine and cosine voltages $E_s$ and $E_c$ derived therefrom establish an analog representation of the indicated position. More particularly, the sine and cosine voltages establish the location of a plurality of null positions, i.e., positions of the element at which the discrepancy signal will have a minimum or substantially zero amplitude. For example, if the signaled number *def* is 185 (that is, the number N has some value representable as $xx.x185$), there will be a null or minimum amplitude for the discrepancy signal DS when the element 15 has an actual position numerically representable as *xx.x*185″. This means that the null response will occur when the element is at any of the actual positions 00.0185″, 00.1185″, 00.2185″, 00.3185″, and so on up to 99.9185″. For a given value of the number *def*, the nulls will be spaced 0.1000″ apart along the path of travel, but their actual locations on the path will be determined to the nearest .0001″ according to the value of the number *def*. If the counter number N is positive (N+="1"), then as each input pulse is counted in an up or down sense by the counter, the number *def* will increase or decrease by one, and all of the nulls will shift to the right or left by a distance of .0001″. If the number N is negative (N−="1"), then as each input pulse is counted in an up or down sense by the counter, the number *def* will increase or decrease by one, and all of the nulls will shift to the left or right through a distance of .0001″. As explained above, the present system functions correctively to change the number N in the counter so as to make the signaled number *def* agree with the last three digits *d'e'f'* in a number which corresponds to the actual position of the movable element. If the number *def* is greater or less than the number *d'e'f'*, then the counter must count down or up, respectively, until the two become equal. The signal DS by its phase polarity indicates whether the number *def* is greater or less than the actual position number *d'e'f'*, that is, whether the nearest null corresponding to the number *def* is located to the left or to the right of the actual position of the element as the latter moves to different positions. But this relationship is different in the positive and negative regions, that is, on opposite sides of the zero reference point, as will become clear from the position and signal relationships illustrated as exemplary cases by FIG. 5.

If it is assumed that the number *def* is +009, the sine and cosine function voltages $E_s$ and $E_c$ supplied to the Inductosyn slider 22 will make the discrepancy signal DS have a zero or null amplitude when the element 15 is located at a true position of +009 with respect to a zero reference point ZRP. But if the element assumes different positions spaced from the +009 location, the discrepancy signal will take on amplitudes and phase polarities as represented by the curve 80 in FIG. 5. Let it be assumed, as a Case I example, that the actual position of the element is at +014 (see the open arrow 81). The discrepancy signal DS corresponding to the point 80*a* on curve 80 will be of positive phase polarity. To correctively change the number *def* so as to locate the null at the actual position of the element 15, pulses will be admitted to the counter 20 and counted in an upward sense. As the counter number *def* thus increases from +009 to +014, the location of the corresponding null shifts progressively to the right as indicated by curve portions 82*a*, 82*b*, 82*c*, 82*d* and 82*e*. When the null reaches the latter location at +014, the discrepancy signal is reduced to zero and the corrective counting ceases. Thus, Case I as illustrated in FIG. 5, requires that the counter 20 count upwardly whenever the counter number N is positive (i.e., N+="1") and the signaled position *def* is numerically less than the actual position *d'e'f'* so that the phase polarity of the signal DS is positive (i.e., SIG+=1).

FIG. 5 also illustrates the relationships constituting what may be called Case II. If the counter number *def* is +009 so that the curve 80 is applicable, but if the actual position number *d'e'f'* is less, e.g., +005 as represented by the open arrow 84, then the signal DS will have a negative phase polarity and an amplitude corresponding to the point 80*b* on the curve 80. Under these circumstances, the counter must count down in response to corrective pulses. As each pulse is received, the number *def* will decrease from +009 to +008 to +007, etc., thereby shifting the null location progressively to the left as indicated by curve portions 85*a*, 85*b*, 85*c* and 85*d*. By the time the signaled number *def* is reduced to +005, the discrepancy signal DS is restored to a zero amplitude and the corrective counting ceases. Thus, Case II as illustrated in FIG. 5 requires that the counter count down whenever the number N is positive (i.e., N+="1") and the signaled position *def* is greater than the actual position *d'e'f'* so that the phase polarity of the signal DS is negative (i.e., SIG−="1").

Next, let it be assumed that the counter number is negative (i.e., N−="1") and that the number *def* is −011. The discrepancy signal will take on the polarities and amplitudes indicated by the curve 86 (FIG. 5) when the element 15 is located in the region of the null at −011. For Case III, assume that the actual position of the element is at −007 (see open arrow 88), so that the signal DS has a positive phase polarity corresponding to the point 86*a* on curve 86 (and SIG+ is a "1"). Under these circumstances, the counter 20 must count down in response to corrective pulses, and as each such pulse is received, the null location will shift one unit to the right as shown by curve portions 89*a*, 89*b*, 89*c* and 89*d*. When the number *def* has been reduced in magnitude from −011 to −007, the discrepancy signal becomes zero and corrective counting ceases. From Case III, it may be said that when the number N is negative (N−="1") and the phase polarity of the signal DS is positive (SIG+ is a "1"), then the counter must count down to bring the null location into agreement with the element's actual position.

As Case IV, let it be assumed that the counter number is negative (N−="1") and the number *def* is −011 so that the curve 86 in FIG. 5 is applicable. Further, let it be assumed that the actual position of the element is in numerical magnitude greater than the number *def*, e.g., is −016 as represented by the open arrow 90 in FIG. 5. With these relationships, the discrepancy signal DS will have a negative phase polarity and a magnitude corresponding to the point 86*b* on the curve 86 (and SIG− will be a "1"). Thus, the counter must count up in response to corrective pulses, and as each such pulse is received, the null location will shift one unit to the left as shown by curve portions 91*a*, 91*b*, 91*c*, 91*d* and 91*e*. When the number *def* has been increased in magnitude from −001 to −016, the corrective counting ceases with the null for the curve 91*e* corresponding to the actual location of the element, i.e., the open arrow 90. From Case IV it will be seen that when the counter number is negative (N− is a "1") and the phase polarity of the signal DS is negative (SIG− is a "1"), then the counter must count up to bring the null into agreement with the element's actual position.

With the foregoing in mind, the count direction control 35 of the present invention may now be understood. This control comprises means responsive to signals representing the polarities of the number N and the discrepancy. More specifically, it includes means to cause the counter 20 to count up in response to such signals indicating that the signs of the DS signal and the counter number are alike; together with means to cause the counter to count down whenever the signs of the DS signal and the counter number are unlike. To accomplish this, two AND gates 94, 95 (FIG. 3) are coupled to receive as their paired inputs the SIG+ and N+ signals, and the SIG− and N− signals, respectively. Whenever the signs of the number N and the discrepancy signal are alike, one or the other of these gates 94, 95 will produce a binary "1" output which will be transferred through an associated OR circuit 96 to make the signal CU reside at a "1" level. The counter 20 (FIG. 2) will thus count up in response to any pulses received on its input terminal PI.

Further, the count direction control 35 includes two AND gates 97, 98 coupled to receive as their paired inputs the SIG+ and N− signals, and the SIG− and N+ signals, respectively. When the signs of the discrepancy signal polarity and the number N are alike, one or the other of these AND gates 97 and 98 will produce a binary "1" output signal which will be transferred through an associated OR circuit 99 to make the signal CD reside at a binary "1" level. The counter 20 will thus count downwardly to reduce the number N in response to pulses received on its input terminal PI. The control signals CU and CD have a complemental relationship so that only one of them can reside at a binary "1" level at any given time.

With reference to FIGS. 3 and 5, the gate 94 produces a response to make the signal CU a binary "1" under circumstances which have been designated Case I. Similarly, the gates 98, 97 and 95 in the count direction control 35 produce output signals which bring about the correct direction of counting under those circumstances which have been illustrated as Case II, Case III and Case IV in FIG. 5.

By virtue of the count direction control 35, when the element 15 moves toward and then passes through the zero reference point, the counter 20 will first count down until the number N signaled therein is reduced to zero, and as movement of the element continues in the same direction, the counter 20 will then begin counting in an upward sense so that the signaled number N increases from zero, although the sign of the signaled number N is reversed by changing the state of the flip-flop 36, as previously explained.

PRESETTING TO SELECT THE ZERO REFERENCE POINT

According to one feature of the present invention, very simple and conveniently operated means are provided to make the signaled number N numerically represent the position of the element 15 relative to a zero reference point which may be given any desired location along the element's path of travel. Such means may best be described by a narrative sequence of the procedure for setting up the system with the zero reference point at a desired location.

Assume for the sake of discussion that the entire range of travel for the element 15 is 200″ in length. If the element is located at some selected position, say, 75″ from the left end of the travel range which the user wishes to be numerically signaled as −31.6450″, he may without moving the element cause the counter 20 to electrically signal, and the digit displays to visually indicate, the number −31.6450. As the element thereafter moves to different locations, its position will be numerically signaled with respect to a zero reference point located 31.6450″ to the right of its original position. In the example given, the numerical signaling system will in effect be adjusted to signal thereafter any position of the element with respect to a zero reference point which is 75.0000 plus 31.6450=106.6450″ from the left extremity of the travel path.

To permit such reference selection, the differential resolver 48 (FIG. 2) serves as a means for presetting the number def signaled by the counter stages d, e and f to any desired value. As is well known per se, when sine and cosine function excitation signals such as the voltages Es and Ec are coupled through a differential resolver, the amplitude and phase polarity relationships of the resulting signals are changed as a function of the resolver rotor's angular position relative to the stator. As the rotor is turned through 360°, the null which is represented by the two output signals from the resolver is progressively shifted relative to the null represented by the input signals $E_s$ and $E_c$. By leaving the element 15 stationary and angularly adjusting the position of the resolver rotor, the number def signaled by the counter stages d, e and f (and visually readable from the digit displays d, e, f) may be changed, because angular displacement of the resolver rotor will create the discrepancy signal DS which in turn will cause pulses to be admitted to the counter 20 until the number def in the latter arrives at a new value which restores the discrepancy signal to zero.

Thus, to pursue the foregoing example, if the element 15 resides at a position 75.000″ from the left extremity of a 200″ travel range, and the initial zero reference point is 100″ from the opposite extremities, the counter number N will be signaled as −25.0000″ because the element is actually located 25″ to the left of the initial zero reference point (assuming the resolver 48 is set at its zero angle).

The user of the system may now rotate the rotor of the resolver 48, thereby creating a discrepancy signal DS and causing the counter 20 to receive pulses. By observing the digit displays d, e, f, the user may turn the rotor until the number def contained in the last three counter stages and represented by the output signals therefrom has been changed from 000 to exactly 450.

It is possible for the user to rotate the resolver rotor through several revolutions, each of which will change the counter number N by 0.1000, until the entire counter number N=ab.cdef has the desired value of 31.6450. But to avoid such a time-consuming procedure, the upper stages a, b, c may be directly preset. The user need only manually adjust preselector means which can be set to electrically signal, preferably in BCD notation, any three digit decimal number. Such means are here shown as decade dial switches 100, 101, 102 (FIG. 2) each having four bit output lines coupled to preset input terminals of the a, b and c stages of the counter 20. By appropriately setting the dials for these decade switches, the latter are conditioned so that they will produce output signals representing any number abc—which in the present example is 316. Next, the user adjusts a bistate sign preselection 103 to a + or a — position, and in the present example this switch will be set it its − position.

The operator need now only momentarily close a preset enabling switch 104 which energizes the preselectors 100–103 so that the latter produce output signals which represent in BCD notation the numbers and the sign which have been preselcted by adjustment thereof. These output signals, in the example previously referred to, will drive the sign flip-flop 36 and the decade counter stages a, b and c to the particular states which cause them to hold and signal the number −316.

As a result of such presetting, the complete number N signaled by the counter 20 is −31.6450. The discrepancy signal, however, is of zero amplitude and the gate 28 is closed. The element is 75.0000″ to the right of the left extremity of the travel path, so the zero reference point from which the element's position is numerically signaled is now 106.6450″ from such left extremity. The element 15 may now be moved in either direction to a succession of different positions, and when this occurs, the gate will be opened and the counter 20 will receive pulses to change the signaled number N by .0001 for each .0001″ through which the element moves. Thus, the signaled number N will continue to represent accurately the position of the element 15 with respect to the zero reference point which has been selected by designating a particular absolute position of the element as constituting a certain desired numerical position.

It is important to observe that the element 15 need not be moved to the path location which is to be selected as the desired zero reference point in order to condition the system so that it will signal and display numerical positions relative to that location. On the contrary, the operator of the equipment need only, by manipulating the resolver 48 and the preselectors 100–103, make the signaled number N agree with the desired numerical designation for a particular position in which the element resides, and the zero reference point will automatically be established at the correct corresponding location.

Noteworthy is the fact that one any particular zero reference point has been selected and established, then the element 15 may move to any position within its range of travel, in either the positive or negative regions of that range, and the counter 20 will always be correctively adjusted so as to display a number N which precisely represents the position of the element. This is true even though the element is moved through a range of several inches, and pulses admitted to the lowest order stage of the counter 20 may cause the signaled number *def* to cyclically increase or decrease many times. Even though only the three lowest order stages *d*, *e* and *f* of the counter are utilized to supply number-representing input signals to the decoder 21a and the converter 21, the higher order counter stages *c*, *b* and *a* always accurately signal the values of the higher order digits in the position-representing number N because the carry outputs from the lower to the higher order stages within the counter make these stages *c*, *b* and *a* always contain digit values which change from their initial settings by one count for each tenth of an inch, inch, and tens of inches through which the element 15 travels. In other words, the higher order stages of the counter automatically and correctly "follow" the changes in the number *def* signaled by the lower order stages and supplied as the input to the digital-to-analog converter.

THE DIGITAL-TO-ANALOG CONVERTER (A) Review of the relationships between numbers and signals for exciting resolver type devices It will be useful to review briefly the relationships which are involved in producing sine and cosine function voltages which vary according to a changeable number in order to excite a resolver or an Inductosyn type of transducer for establishing an analog of the position represented by the number. First, the changeable number is one which in most cases may vary repetitively over a predetermined range of values. For example, the signaled number *def* described above may have one thousand different values from 000 to 999 and it can change repeatedly and cyclically through that range as several thousand input pulses are received by the counter 20. The numerical range is conveniently equated to a corresponding range of angles, preferably a range of 360°. By way of example, if the number has one thousand possible values, then an angle $\theta$ may be said to be equal to the number *def* times an increment angle $\beta$ which is equal to $360°/1000 = .36°$. As the number varies in successive steps from 000 to 999, the angle $\theta$ varies from 0° to 359.64° in steps of 0.36°. Thus, if the signaled number is 164, the corresponding value for the angle $\theta$ will be $164 \times .36° = 59.04°$.

The range of variation of the input number and the corresponding angle are related to a predetermined span of distance along the path which the movable element travels, and this relationship is determined by the choice of the transducer parameters, including the ratio of its mechanical connection to the movable element. In the case of a linear Inductosyn device such as that discussed with reference to FIG. 2 and where the slider 22 is fixed to a movable element, it may be assumed that as the input number *def* represented by input signals supplied to the decoder 21a and converter 21 varies from 000 to 999, the angle $\theta$ respectively varies over a range of 360°, and that the position represented in analog form by the output voltages $E_s$ and $E_c$ varies from .0000″ to .1000″. In other words, the locations of all of the nulls established by the transducer excitation voltages $E_s$ and $E_c$ may shift from their starting points through a span or range of 0.1″ as the signaled input number varies through its range of one thousand different values.

From the foregoing, in the exemplary apparatus here to be described, the alternating sine and cosine voltages vary in amplitude and phase polarity according to the relationships:

$$E_s = K \sin \theta \quad (1)$$
$$E_c = K \cos \theta \quad (2)$$

where $$\theta = (def) \cdot \beta \quad (3)$$

The number *def* has one thousand possible values, and the increment angle $\beta$ is .36°. K is merely a constant factor of proportionality.

In effect, therefore, the angle $\theta$ may have any of 1000 values within a 360° circle, and the signals $E_s$ and $E_c$ are made to agree in amplitude and phase polarity with the sine ordinate and cosine abscissa for the different points on the circle which correspond to the changeable angle $\theta$ as the number *def* has any value between 000 and 999. Of course, other numerical ranges, angular ranges and increment angles may be adopted as a matter of choice, and the present invention is not limited to those which are here described as examples.

For added clarity, FIG. 6 illustrates a circle with certain ones of the one thousand points located thereon. As an example, when the signaled number has a value of 150 (shown as *mn*=150), then the angle $\theta$ will be 54° (i.e., 150×.36°). Assuming that the circle radius has unity value, then the amplitudes of sine and cosine function signals are to be made proportional to the ordinate 110 and the abscissa 111 shown in FIG. 6. As mentioned below, it is not essential that the amplitudes of the sine and cosine signals be rigorously proportional to $\sin \theta$ and $\cos \theta$, respectively, as the angle $\theta$ takes on different values; on the contrary, complete accuracy may be achieved in a system which corrects to a null by so controlling the sine and cosine signal amplitudes that the ratio of those amplitudes is proportional to $\tan \theta$, i.e., such that $$\frac{E_s}{E_c} = \frac{\sin \theta}{\cos \theta} = \tan \theta$$

For ease of understanding, however, in the present application, the signals $E_s$ and $E_c$ will be discussed as if they are respectively proportional to $\sin \theta$ and $\cos \theta$.

To achieve the desired accuracy, it is desirable to permit the angle $\theta$ to have any one of a large number of possible values, e.g., one thousand. But apparatus comprising one thousand individual circuit elements for producing one thousand different values of the sine function signal $E_s$, and one thousand different circuit elements for producing one thousand different values of a cosine function signal $E_c$ would be prohibitively expensive, complex and subject to malfunction. For this reason, the angle $\theta$ is treated as the sum of two smaller angles $\theta_1$ and $\theta_2$ which are respectively proportional to higher and lower order portions of the signaled input number. To reduce the number of circuit components necessary to derive one thousand different combinations of sine and cosine function signals, the input number *def* is considered as constituting a composite number *mn*, wherein the higher order portion *m* corresponds to the digits *d*, *e* (which can take on any value between 00 and 99), and wherein the lower order portion *n* corresponds to the digit *f* (which can take on any value between 0 and 9). It is for this reason that FIG. 6 shows the number *mn* as having different values for different angular positions around the circle, the lower order number *n* being zero for each point illustrated therein.

The angle $\theta$ is treated as the sum of two smaller variable angles according to the relationship:

$$\theta = \theta_1 + \theta_2 = m\alpha + n\beta \quad (4)$$

where the angle $\alpha$ has a predetermined value (such as 3.6°) and the angle $\beta$ has a predetermined value (such as .36°) which is a submultiple of the angle $\alpha$. Thus, in Equation 4, the angle $\theta_1$ may vary from 0° to 356.40° in steps of 3.6° as the number *m* varies from 00 to 99; the angle $\theta_2$ may vary from 0° to 3.24° as the number *n* varies from 0 to 9; and the angle $\theta$ can vary in steps of .36° from 0° to 359.64° as the composite number *mn* (and the number *def*) changes in steps from 000 to 999.

FIG. 6 shows the points on a circle representing several values of the angle $\theta_1$ as the number *m* has corresponding different values, each illustrated point being located with the assumption that the number $n$ and the angle $\theta_2$ are zero. Once any value of the angle $\theta_1$ is established by a given value of the number $m$, then as the lower order number $n$ increases to different values, the composite angle $\theta$ increases in small steps of .36°. As an example purposely not drawn to scale, FIG. 7 illustrates the case where the input number $mn$ is 107; i.e., the number $m$ is ten and the number $n$ is seven. The angle $\theta_1$ is thus 36°, and the angle $\theta_2$ is 2.52°, making the total angle $\theta$ equal to 38.52°. The relationships of $\theta$, $\theta_1$, and $\theta_2$ as the number $mn$ takes on different values between 000 and 999 will be clear from the example of FIG. 7. And it may be noted from FIG. 7 that the ordinate representing the value of sin $\theta$ differs from the ordinate representing sin $\theta_1$ according to the value of the angle $\theta_2$, whereas the abscissa representing cos $\theta$ progressively changes, relative to that for cos $\theta_1$, as the angle $\theta_2$ progressively increases from zero.

It will be apparent to those skilled in the art that values other than 3.6° and .36° may be chosen for the angles $\alpha$ and $\beta$ and the range of values for the numbers $mn$, $m$ and $n$ may also be different.

(B) General organization for producing sine and cosine functions of sums of two angles Now that it is understood how the changeable number $def$ (or its counterpart number $mn$) represents different values for a changeable angle $\theta$, the apparatus for producing signals which vary in magnitude as sine and cosine functions of the angle $\theta$ may be appreciated in a general sense by reference to FIG. 8.

It is assumed in FIG. 8 that suitable means, examples of which will be described below, are provided to produce two input signals which vary as the sine and cosine of the angle $\theta_1$, such signals here being represented as voltages $E_r$ sin $\theta_1$ and $E_r$ cos $\theta_1$, where the voltage $E_r$ is a constant magnitude reference voltage. In the practice of the present invention, these first and second signals are supplied as first inputs respectively to two algebraic combining devices 114, 115, each of the latter being characterized by its operation of producing output signals which vary in magnitude and polarity according to the algebraic combination of the plural input signals applied thereto. That is, the device 114 serves to produce an output signal agreeable in polarity and proportional in magnitude to the algebraic sum of all input signals applied to its additive input terminal 114a taken with their actual polarities, and all input signals applied to its subtractive input terminal 114b taken with polarities opposite to their actual polarities.

Moreover, means are provided to produce and supply in an additive sense to the combining device 114 a second input signal which in effect varies as the product of the output signal from the second device 115 and the tangent of the changeable angle $\theta_2$. For this purpose, the output signal, labeled $E_c$, from the second combining device 115 is transferred via a conductor 116 to the input of a multiplying unit 117 controlled according to the value of the changeable angle $\theta_2$, and which produces an output signal $E_c$ tan $\theta_2$ at its output terminal 117a. This output terminal 117a is coupled to the additive or + input terminal 114a of the combining device 114, so that it contributes in an additive algebraic sense to the output signal $E_s$ from the device 114.

In a similar manner, means are provided to produce and supply as a second input to the combining device 115 a signal which in effect varies as the product of the output signal from the first combining device 114 and the tangent of the changeable angle $\theta_2$. For this purpose, the output signal $E_s$ is coupled via a conductor 118 to the input of a multiplier unit 119 which is also controlled according to the value of the angle $\theta_2$, and the latter produces on its output terminal 119a a signal which varies in proportion to $E_s$ tan $\theta_2$. The latter signal is supplied to a subtractive input terminal 115b for the combining device 115, whereas the input signal $E_r$ cos $\theta_1$ is supplied to an additive input terminal 115a. Thus, the two input signals to the combining device 115 combine in an algebraic subtractive sense to produce the output signal $E_c$.

From inspection of FIG. 8 and with the understanding that the algebraic combining devices 114 and 115, respectively, combine the two input signals supplied thereto in an additive and a subtractive sense, the following equations representing the output signals of the two devices 114 and 115 may be written:

$$E_s = E_r \sin \theta_1 + E_c \tan \theta_2 \qquad (5)$$
$$E_c = E_r \cos \theta_1 + E_s \tan \theta_2 \qquad (6)$$

Substituting the expression for $E_c$ from (6) into (5) and the expression for $E_s$ from (5) into (6) yields:

$$E_s = E_r \sin \theta_1 + E_r \cos \theta_1 \tan \theta_2 - E_c \tan^2 \theta_2 \qquad (5a)$$
$$E_c = E_r \cos \theta_1 - E_r \sin \theta_1 \tan \theta_2 - E_s \tan^2 \theta_2 \qquad (6a)$$

Equations 5a and 6a may be simplified and rewritten to express $E_s$ and $E_c$:

$$E_s = \frac{E_r \sin \theta_1 + E_r \cos \theta_1 \tan \theta_2}{1 + \tan^2 \theta_2} \qquad (5b)$$

$$E_c = \frac{E_r \cos \theta_1 - E_r \sin \theta_1 \tan \theta_2}{1 + \tan^2 \theta_2} \qquad (6b)$$

It will be remembered that the sine and cosine function voltages $E_s$ and $E_c$ are to be used for exciting a resolver type device in order to locate null positions according to the value of a changeable angle $\theta$ which is equal to $\theta_1 + \theta_2$. For precision location of nulls, the individual amplitudes of the sine and cosine signals are relatively immaterial, and the important condition to be satisfied is that the ratio of the sine signal to the cosine signal be equal to the tangent of the angle $\theta$. By taking the ratio of Equations 5b and 6b, one may write:

$$\frac{E_s}{E_c} = \frac{\sin \theta_1 + \cos \theta_1 \tan \theta_2}{\cos \theta_1 - \sin \theta_1 \tan \theta_2} \qquad (7)$$

Dividing numerator and denominator of Equation 7 by cos $\theta_1$ and recalling that sin $\theta_1$/cos $\theta_1$ is equal to tan $\theta_1$, the following is obtained:

$$\frac{E_s}{E_c} = \frac{\tan \theta_1 + \tan \theta_2}{1 - \tan \theta_1 \tan \theta_3} \qquad (8)$$

But the expression (8) is the well known trigonometric identity for the tangent of the sum of two angles $\theta_1$ and $\theta_2$, so it may be rewritten:

$$\frac{E_s}{E_c} = \tan (\theta_1 + \theta_2) = \tan \theta \qquad (9)$$

Equation 9 indicates that as the angles $\theta_1$ and $\theta_2$ take on different values, the ratio of the sine and cosine signals $E_s$ and $E_c$ will vary as the tangent of $(\theta_1 + \theta_2)$, i.e., as tan $\theta$, thereby exciting the transducer 22, 24 shown in FIGS. 1 and 2 to establish null locations which agree with the angle $\theta$ and thus with the changeable number $def$ signaled by the counter 20. This is precisely the relationship which is desired.

(C) An operational amplifier viewed as an algebraic signal-combining device

Although other forms of algebraic signal combining devices may be employed in various embodiments of the invention, operational amplifiers are advantageously used for this purpose, and FIG. 9 diagrammatically shows a typical amplifier with negative feedback and a plurality of inputs.

Those familiar with operational amplifiers will understand the following principles which are briefly stated here without analytical proof merely for the sake of completeness and to simplify the ensuing description. Assuming that the amplifier 120 shown in FIG. 9 has, by itself, a very high gain and that a resistor $R_f$ is connected to create negative feedback by transmitting the output signal $E_o$ to the subtractive or "−" input terminal 120b, then input signals supplied to the additive and subtractive input terminals 120c and 120b (marked "+" and "−") will contribute algebraically in an additive and subtractive sense to the magnitude and polarity of the output signal $E_o$. Signals applied to the terminal 120c will appear without polarity or phase reversal as one component of the output signal $E_o$, and signals applied to the terminal 120a will appear with polarity or phase reversal as another component of the signal $E_o$. In those instances where the input resistors, to be described, have different and changeable values, however, it is much more convenient and conducive to accurate operation to simply ground the additive input terminal 120c, and to create another equivalent additive input terminal 120a which is connected to the subtractive input terminal 120b through an inverter 121. Signals applied to terminal 120a are inverted or reversed in polarity or phase in passing through the inverter 121 to the subtractive input terminal 120b; and those same signals are then again reversed or reinverted in polarity or phase as an incident to passing through the amplifier 120—so that such signals appear in the signal $E_o$ as components having their original polarities. Thus, it is perfectly proper to consider the input terminal 120a as an "additive" input for the amplifier 120, and in the discussions below the inverter which follows the additive input terminal will be considered as a part of the amplifier itself.

If the input signals applied to the terminals 120a and 120b are created by connecting input voltages through individual resistors, as shown, the signals will in effect be weighted not only according to the magnitude of the voltage applied to such resistors, but also according to the ratio of the feedback resistance $R_f$ to the individual input resistance. Thus, assuming that the voltages $E_2$, $E_3$ and $E_4$ as labeled in FIG. 9 are all zero, then the amplifier 120 in FIG. 9 operates to produce an output signal which varies according to the following equation:

$$E_0 = -E_1 \cdot \frac{R_f}{R_a} \cdot G \qquad (10)$$

where G is a factor of proportionality corresponding to the net gain of the amplifier with negative feedback, and where the negative sign on the right indicates that the output signal is negative in polarity relative to the polarity of the input voltage $E_1$ due to the inversion which results in the amplifier 120 for a signal to the subtractive input terminal 120b. Since the gain factor G is constant, and may be considered as unity, it will be neglected in the following discussions.

From what has been said, and assuming that the four voltages shown in FIG. 9 may vary to have different amplitudes and polarities, then the output signal $E_o$ may be expressed:

$$E_0 = -E_1 \frac{R_f}{R_a} - E_2 \frac{R_f}{R_b} + E_3 \frac{R_f}{R_c} + E_4 \frac{R_f}{R_d} \qquad (11)$$

More rigorously, each input voltage may be of either sign (i.e., have a positive or negative polarity if it is a D.C. voltage, or have a positive or negative phase polarity if it is an A.C. voltage), so that the full significance of Equation 11 may be seen more readily from:

$$E_0 = -\left(\pm E_1 \frac{R_f}{R_a}\right) - \left(\pm E_2 \frac{R_f}{R_b}\right) + \left(\pm E_3 \frac{R_f}{R_c}\right) + \left(\pm E_4 \frac{R_f}{R_d}\right) \qquad (11a)$$

where the sign of each voltage depends upon the polarity or phase polarity thereof. Thus, each term in the expression for the output voltage $E_o$ may contribute in a positive or negative sense depending jointly upon the polarity of the voltage which appears in that term and the particular input terminal 120a or 120b to which it is applied; and each component of the output voltage is proportional to both the magnitude of the input voltage and the ratio of feedback resistance to input resistance. Depending upon the relative magnitudes of the four terms in the left side in Equation 11a, the output voltage $E_o$ will have a positive or negative polarity, and its magnitude will be equal to the algebraic sum of the four components.

Although the input and output voltages for the amplifier 120 may be D.C. signals, and the output signal $E_o$ may be converted into a sinusoidal A.C. voltage of corresponding amplitude and phase polarity, it is equally feasible and indeed desirable to utilize input and output voltages which alternate sinusoidally, and which may vary in amplitude and phase polarity. In this way, there is no need to convert D.C. signals into corresponding A.C. signals after the algebraic combination has been effected. It may be mentioned, also, that while input signal voltages corresponding to the first and second pairs of terms in the right side of Equation 11a do not exist, strictly speaking at the terminals 120b and 120a in FIG. 9, current flow proportional to the terms does exist, and the operational effect is the same as if the amplifier 120 receives and combines signal voltages as input signals. For this reason, the discussion which follows will for ease of description refer to effective input signals as being determined in magnitude by a resistance ratio and as being applied additively or subtractively.

(D) The digital-to-analog decoder in general form

FIG. 10 shows the digital-to-analog decoder of the present invention in a generalized form, with operational amplifiers of the type illustrated in FIG. 9 employed as the algebraic combining devices to arrive at a physical embodiment corresponding to that illustrated in FIG. 8. In the arrangement of FIG. 10, a reference signal $E_r$ is routed through changeable resistances $R_a$, $R_b$ to the additive input terminals 122a, 123a of the first and second algebraic combining operational amplifiers 122 and 123. In functional effect, as the resistances $R_a$ and $R_b$ take on different values, input signals are applied to the terminals 122a and 123a which vary in proportion to quantities $$E_r \frac{R_f}{R_a} \text{ and } E_r \frac{R_f}{R_b}$$

The output signal $E_c$ from the amplifier 123 is transferred through a variable or changeable resistance $R_c$ to the additive input 122a of the amplifier 122; and the output signal $E_s$ from the amplifier 122 is transferred through an identical changeable resistance $R_c$ to the subtractive input terminal 123b of the amplifier 123. In effect, therefore, these second input signals applied through the two resistors $R_c$ to the terminals 122a and 123b vary as $$E_s \frac{R_f}{R_c} \text{ and } E_c \frac{R_f}{R_c}$$

and they are respectively applied in an additive and a subtractive sense to the amplifiers 122 and 123.

From inspection of FIG. 10, the equations for the two output signals may be written:

$$E_s = E_r \frac{R_f}{R_a} + E_c \frac{R_f}{R_c} \qquad (12)$$

$$E_c = E_r \frac{R_f}{R_b} - E_s \frac{R_f}{R_c} \qquad (13)$$

Expanding and rewriting (12) and (13):

$$\frac{E_s}{E_r} = \frac{\frac{R_f}{R_a} + \frac{R_f}{R_b} \cdot \frac{R_f}{R_c}}{1 + \left(\frac{R_f}{R_c}\right)^2} \qquad (12a)$$

$$\frac{E_c}{E_r} = \frac{\frac{R_f}{R_b} - \frac{R_f}{R_a} \cdot \frac{R_f}{R_c}}{1 + \left(\frac{R_f}{R_c}\right)^2} \qquad (13a)$$

Dividing Equation 12a by Equation 13a produces:

$$\frac{E_s}{E_c} = \frac{\frac{R_f}{R_a} + \frac{R_f}{R_b} \cdot \frac{R_f}{R_c}}{\frac{R_f}{R_b} + \frac{R_f}{R_a} \cdot \frac{R_f}{R_c}} \quad (14)$$

In accordance with the present invention, the four changeable resistances in the arrangement of FIG. 10 are caused to change their values in response to changes in two angles $\theta_1$ and $\theta_2$ such that.

$$\frac{R_f}{R_a} = \sin \theta_1 \quad (15)$$

$$\frac{R_f}{R_b} = \cos \theta_1 \quad (16)$$

$$\frac{R_f}{R_c} = \tan \theta_1 \quad (17)$$

Indeed, if these ratios of resistance values are "normalized" so that the resistors $R_f$ have unity value, then it may be said that the resistances $R_a$, $R_b$, $R_c$ are varied or changed as inverse functions of $\sin \theta_1$, $\cos \theta_1$, and $\tan \theta_2$, respectively.

Substituting (15)–(17) into Equation 14 produces the expression:

$$\frac{E_s}{E_c} = \frac{\sin \theta_1 + \cos \theta_1 \tan \theta_2}{\cos \theta_1 - \sin \theta_1 \tan \theta_2} \quad (18)$$

Since Equation 18 is identical to Equation 7 supra, then Equation 9 is also fully applicable as defining the operation of the apparatus shown in FIG. 10—assuming that the resistances $R_a$, $R_b$, $R_c$ are varied in accordance with Equations 15–17.

This analysis confirms that the apparatus of FIG. 10 requires only four changeable resistors and two operational amplifiers to produce output voltages $E_s$ and $E_c$ which vary in amplitude and phase polarity, relative to the constant amplitude reference voltage $E_r$, such that the ratio $E_s/E_c$ has the value:

$$\frac{E_s}{E_c} = \tan \theta = \tan(\theta_1 + \theta_2) = \tan(m\alpha + n\beta) \quad (18a)$$

Thus, the sine and cosine function signals $E_s$ and $E_c$ will serve to excite a resolver type device in a system such as that illustrated in FIG. 2, providing that the signals from the counter stages $d$, $e$ and $f$ can be caused to vary the resistances $R_a$, $R_b$ and $R_c$ according to the relationships:

$$\frac{R_f}{R_a} = \sin \theta_1 = \sin m \quad (19)$$

$$\frac{R_f}{R_b} = \cos \theta_1 = \cos m \quad (20)$$

$$\frac{R_f}{R_c} = \tan \theta_2 = \tan n \quad (21)$$

As the composite number $mn$ takes on different values, the resistances $R_a$, $R_b$ and $R_c$ should be varied according to the three equations expressed immediately above, and apparatus for accomplishing this purpose will be described later.

(E) A Preferred Version of FIG. 10

FIG. 11 illustrates an arrangement equivalent to that of FIG. 10, and demonstrates a preferred organization wherein auxiliary operational amplifiers are employed as the inverters shown in FIG. 10. Thus, the first two amplifiers 125, 126 in FIG. 11 serve merely as inverters, whereas the second two amplifiers 127 and 128 in FIG. 11 correspond essentially to the amplifiers 122 and 123 of FIG. 10. It will be seen from what follows, that all physical input connections to the amplifiers lead to subtractive input terminals, but the subtractive input terminals of the first two amplifiers are in effect additive input terminals 127a and 128a for the principal amplifiers 127 and 128. It is assumed for simplicity in connection with FIG. 11 that all of the amplifiers are constructed to produce a net gain of unity.

From what has been said earlier, the equations for the output signals of the four amplifiers in FIG. 11 may be readily written:

$$E_a = -E_r \frac{R_f}{R_a} - E_c \frac{R_f}{R_c} \quad (22)$$

$$E_b = E_r \frac{R_f}{R_b} \quad (23)$$

$$E_s = E_a \frac{R_f}{R_f} = -E_a \quad (24)$$

$$E_c = E_b \frac{R_f}{R_f} - E_s \frac{R_f}{R_c} \quad (25)$$

Substituting (22) into (24) and (23) into (25) yields:

$$E_s = E_r \frac{R_f}{R_a} + E_c \frac{R_f}{R_c} \quad (26)$$

$$E_c = E_r \frac{R_f}{R_b} - E_s \frac{R_f}{R_c} \quad (27)$$

Since Equations 26 and 27 are identical to Equations 12 and 13, supra, they may be manipulated in the manner described above to arrive at the same expression set forth by Equation 18, and thus to arrive at the same expression set forth by Equation 9. This confirms that the arrangement of FIG. 11 functions in the same manner as the apparatus of FIG. 10.

The various figures to be described below show input connections which physically lead either directly or through an inverter to the subtractive input terminal (labeled "—") of algebraic combining devices constituted by operational amplifiers, but it will be understood that the terminal designated by an "$a$" suffix on the reference character identifying that device is in actual effect an additive input terminal. Of course, where it is convenient and accurate to do so, one may employ physical connections directly to additive inputs of algebraic combining devices. The physical connections to the inputs of the amplifiers are thus a matter of choice, and it is only the effective input connections which are important.

(F) Changing the Resistance Values

In keeping with one aspect of the present invention, the changeable resistance $R_a$ is constituted by a first plurality of individual resistors having values, relative to the selected constant feedback resistors $R_f$, which satisfy Equation 19 as the number $m$ takes on different values. Similarly, the changeable resistance $R_b$ is constituted by a second plurality of individual resistors having values, relative to the feedback resistor $R_f$, which satisfy Equation 20 as the number $m$ takes on different values.

Finally, the two variable resistances $R_c$ are respectively constituted by third and fourth identical pluralities of resistors having values, relative to the feedback resistor $R_f$, which satisfy Equation 21 as the number $n$ takes on different values.

Further, solid state switching means characterized by high operating speed and the lack of any physical switching contacts are made responsive to the signal number $def$ as shown in FIG. 2, and thus to the number $mn$, for rendering the corresponding one of the first plurality of resistors conductive when the number $m$ has any particular value, thereby to supply a first input signal to an associated operational amplifier which is in effect proportional to $\sin m\alpha$. Likewise solid state switching means are made responsive to the signaled number $def$ (and thus to the number $mn$) for rendering the corresponding one of the second plurality of resistors effective when the number $m$ has any particular value, thereby to supply a first input signal to an associated amplifier which is in effect proportional to $\cos m\alpha$. Finally, solid state switching means are arranged to render the corresponding one of the third and fourth pluralities of resistors effective when the number $n$ has a particular value, thereby to supply second input signals to the first and second amplifiers which are in effect proportional to the product of tan $n\beta$ times the output signal of the other amplifier.

Figure 12:
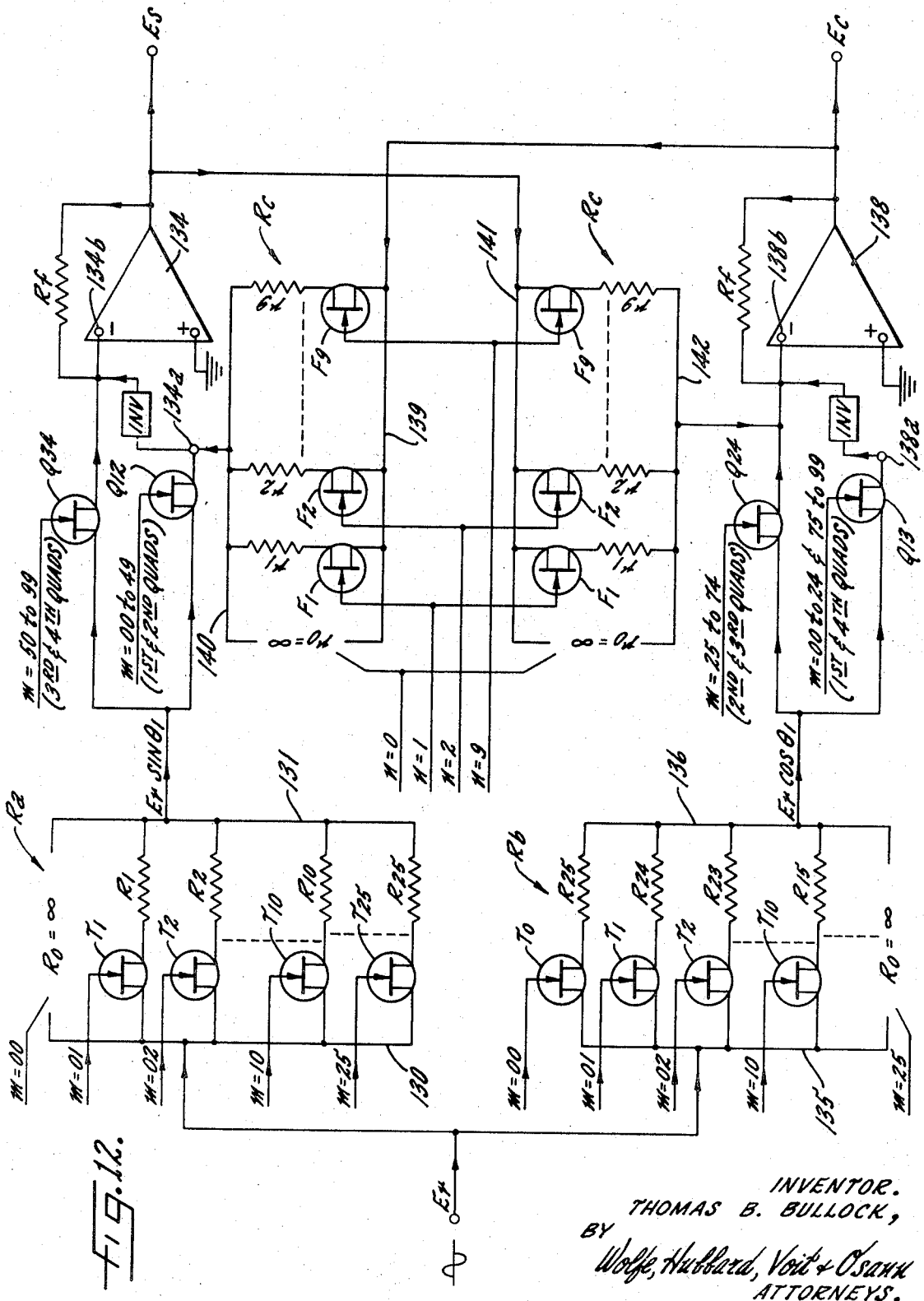
FIG. 12 is a schematic diagram illustrating the general organization which is employed for switching in differently valued resistors and controlling effective signal polarities according to the quadrant of the numerically signaled angle.

Apparatus for accomplishing these objectives is illustrated in FIG. 12 wherein the changeable resistance $R_a$ is constituted by twenty-six resistors $R_0$ through $R_{25}$ (only five of which are shown for the sake of simplicity) connected between first and second conductors 130 and 131, each such resistor being in series with a corresponding field effect transistor $T_0$ through $T_{25}$ (only five being shown). The first such resistor $R_0$ is a special case, since it is to have a value of infinity. Thus, the resistor $R_0$ is formed simply by an open circuit, and no FET need be associated therewith.

Each of the FET's which form a part of the changeable resistance $R_a$ is normally cut off by virtue of a binary "0" potential applied to the input line leading to its gate, and means (not here shown, but to be described later) are provided to apply a "1" level potential to the input line for the gate of the applicable FET whenever the number $m$ has any value between 00 and 25. This is the significance of the labeled control lines leading to the gates of the FET's shown in FIG. 12.

As the number $m$ takes on any value between 00 and 25, the corresponding FET will be made conductive, and the corresponding one of the resistors $R_0$ through $R_{25}$ will be connected between the conductors 130, 131 to establish a selected value for the resistance $R_a$.

That particular one of the resistors $R_0$ through $R_{25}$ which is thus rendered effective will be interposed between the source of the reference voltage $E_r$ and the additive input terminal 134a of an operational amplifier 134 (assuming that the illustrated control FET Q12 is conductive) thereby to supply an input signal to the amplifier which is additive and in effect proportional to the ratio of the feedback resistor $R_f$ to the value of the selected one of resistors $R_0$ through $R_{25}$.

Especially advantageous is the fact that any one of the FET's which is turned on to render the associated one of the resistors $R_0$ through $R_{25}$ effective will conduct current in either direction between its source and drain, so that the sinusoidal reference voltage $E_r$ is effectively transferred through the selected resistor to appear as an input signal on the terminal 134a which is in effect proportional in amplitude to the ratio of the values of the resistor $R_f$ and the selected one of the resistors $R_0$–$R_{25}$.

If it is assumed for the sake of discussion that the feedback resistor $R_f$ has a value of one thousand ohms and that the angle $\alpha$ is 3.6°, then the individual resistors $R_0$ through $R_{25}$ are chosen to have the values shown in the third column of the following table:

TABLE II

| Number $m$ Digits de | $\theta_1 = m(3.6°)$ Degrees | $R_a$ $\dfrac{1000}{\sin\theta_1}\,\Omega$ | $R_b$ $\dfrac{1000}{\cos\theta_1}\,\Omega$ |
|---|---|---|---|
| 00 | 0 | ∞ ($R_0$) | 1,000 ($R_{25}$) |
| 01 | 3.6 | 15,926 ($R_1$) | 1,002 ($R_{24}$) |
| 02 | 7.2 | 7,979 ($R_2$) | 1,008 ($R_{23}$) |
| 03 | 10.8 | 5,337 ($R_3$) | 1,018 ($R_{22}$) |
| 04 | 14.4 | 4,021 ($R_4$) | 1,032 ($R_{21}$) |
| 05 | 18.0 | 3,236 ($R_5$) | 1,051 ($R_{20}$) |
| 06 | 21.6 | 2,716 ($R_6$) | 1,076 ($R_{19}$) |
| 07 | 25.2 | 2,349 ($R_7$) | 1,105 ($R_{18}$) |
| 08 | 28.8 | 2,076 ($R_8$) | 1,141 ($R_{17}$) |
| 09 | 32.4 | 1,866 ($R_9$) | 1,184 ($R_{16}$) |
| 10 | 36.0 | 1,701 ($R_{10}$) | 1,236 ($R_{15}$) |
| 11 | 39.6 | 1,569 ($R_{11}$) | 1,298 ($R_{14}$) |
| 12 | 43.2 | 1,461 ($R_{12}$) | 1,372 ($R_{13}$) |
| 13 | 46.8 | 1,372 ($R_{13}$) | 1,461 ($R_{12}$) |
| 14 | 50.4 | 1,298 ($R_{14}$) | 1,569 ($R_{11}$) |
| 15 | 54.0 | 1,236 ($R_{15}$) | 1,701 ($R_{10}$) |
| 16 | 57.6 | 1,184 ($R_{16}$) | 1,866 ($R_9$) |
| 17 | 61.2 | 1,141 ($R_{17}$) | 2,076 ($R_8$) |
| 18 | 64.8 | 1,105 ($R_{18}$) | 2,349 ($R_7$) |
| 19 | 68.4 | 1,076 ($R_{19}$) | 2,716 ($R_6$) |
| 20 | 72.0 | 1,051 ($R_{20}$) | 3,236 ($R_5$) |
| 21 | 75.6 | 1,032 ($R_{21}$) | 4,021 ($R_4$) |
| 22 | 79.2 | 1,018 ($R_{22}$) | 5,337 ($R_3$) |
| 23 | 82.8 | 1,008 ($R_{23}$) | 7,979 ($R_2$) |
| 24 | 86.4 | 1,002 ($R_{24}$) | 15,926 ($R_1$) |
| 25 | 90.0 | 1,000 ($R_{25}$) | ∞ ($R_0$) |

To make the ratio $R_f/R_a$ equal to sin $m\alpha$ as $m$ takes on any value between 00 and 25, the values of the individual resistors $R_0$ through $R_{25}$ are computed and chosen such that $$R_m = \frac{R_f}{\sin\theta_1} = \frac{1000}{\sin m(3.6°)} \qquad (28)$$

It may be ascertained that the values of the resistors $R_0$ through $R_{25}$ as shown in Table II agree with Equation 28 which is a restatement of Equation 19, supra.

In like manner, the changeable resistance $R_b$ as shown in FIG. 12 is constituted by a plurality of individual resistors $R_0$ through $R_{25}$ (only five being shown for simplicity) each interposed in series with a field effect transistor $T_{25}$ through $T_0$ between two conductors 135 and 136. Because the value of the resistor $R_0$ is to be infinity, a physical resistor $R_0$ and the corresponding field effect transistor $T_{25}$ need not be provided for this special case. The twenty-five field effect resistors $T_0$ through $T_{25}$ included within the changeable resistance $R_b$ are selectively rendered conductive by the application of a binary "1" potential to input lines leading to their gates as the number $m$ takes on any value between 00 and 25, as labeled in FIG. 12. It should be noticed, however, that as the number $m$ changes from 0 to 25, then individual resistors labeled $R_{25}$ to $R_0$ are selectively rendered effective to constitute the resistance $R_b$. This designation has been chosen because the individual resistors $R_0$ through $R_{25}$ which constitute the changeable resistance $R_b$ may have the same ohmic values as the resistors $R_0$ through $R_{25}$ in the changeable resistance $R_a$, but in the resistance $R_b$ these resistors are rendered effective in a different sequence as the number $m$ takes on progressively higher values. This is possible because of the well known trigonometric relation $\cos\theta_1 = \sin(90° - \theta_1)$.

More particularly, from Equation 19 and with the assumptions that $R_f = 1000$ ohms and the angle $\alpha$ is 3.6°, the value of the changeable resistance $R_b$ for any value of the number $m$ may be written:

$$R_b = \frac{R_f}{\cos\theta_1} = \frac{1000}{\cos m(3.6°)} \qquad (29)$$

Thus, for each value of the number $m$ between 00 and 25, a particular one of the resistors $R_{25}$ through $R_0$ having the ohmic values shown in the right column of Table II will be effectively connected between the conductors 135 and 136. As a result, the reference voltage $E_r$ will be transferred through the selected ones of these resistors to appear on the conductor 136 as a signal which in effect is proportional to $E_r \cos\theta_1$. Assuming for the moment that the field effect transistor Q13 is conductive, this signal will be transferred to the additive input terminal 138a of the second operational amplifier 138. To make this effective input signal vary as the cosine of the angle $\alpha$, it is only necessary that the appropriate one of the control lines leading to the FET gates in the changeable resistance $R_b$ receive a binary "1" potential as the number $m$ takes on different values. As thus far described, therefore, FIG. 12 illustrates means to supply first input signals to the amplifiers 134 and 138 which are in effect proportional to $E_r \sin m\alpha$ and $E_r \cos m\alpha$, as $m$ takes on twenty-five different values from 00 to 25.

The values for the resistors $R_0$ through $R_{25}$ as shown in Table II above have been computed with the assumption that the associated FET's $T_0$ through $T_{25}$ when rendered conductive present zero resistance between their sources and drains. It will be understood, however, that where the source-to-drain resistance of a conductive FET is appreciable, that resistance value may be considered as constituting a part of the associated physical resistor, and the value of the later may be correspondingly reduced.

As shown in FIG. 12, the first changeable resistance $R^c$ exits between two conductors 139 and 140, and the second identical changeable resistance $R_c$ appears between conductors 141 and 142. The conductors 139 and 141 are connected to receive the signals $E_c$ and $E_s$ at the output terminals of the second and first amplifiers 138 and 134, and the conductors 140 and 142 are connected to supply input signals to the additive and subtractive terminals 134a and 138b of the respective amplifiers. The effective input signals applied to these input terminals are thus proportional to $$E_c \frac{R_f}{R_c} \text{ and } E_s \frac{R_f}{R_c}$$

To make these latter signals vary in proportion to the tangent of the angle $\theta_2$, and thus in proportion to the tangent of the angle $n\beta$, as $n$ takes on any of its ten possible values 0 through 9, each of the two changeable resistance $R_c$ is constituted by ten individual resistors $r_0$ through $r_9$ (only four of these being shown) which are selectively connected between the paired conductors 139, 140 and 141, 142 by turning on or off associated FET's $F_0$ through $F_9$. The value for the resistor $r_0$ is infinity so that no physical resistor or associated FET $F_0$ is required in this special case. Each of the other resistors $r_1$ through $r_9$ is connected in series with a field effect transistor having its gate coupled to receive (from means to be described later) a binary "1" level potential when the number $n$ has the corresponding value of 1 through 9. Thus, when $n=2$, the resistor $r_2$ is connected between the conductors 139, 140 and its counterpart resistor $r_2$ is connected between the conductors 141 and 142.

Recalling from Equation 21 that the ratio $R_f/R_c$ is to be made equal to $\tan \theta_2$, and thus to $\tan n\beta$ as $n$ takes on different values 0-9, the values of the individual resistors $r_0$ through $r_9$ are made to conform to the relation:

$$R_c = \frac{R_f}{\tan \theta_2} = \frac{R_f}{\tan n\beta} \quad (30)$$

for each value of $n$ which is signaled. Assuming that the feedback resistor $R_f$ are each 1000 ohms and that the angle $\beta$ is .36°, then the values for the resistors $r_0$–$r_9$ are computed and made to agree with:

$$R_c = \frac{1000}{\tan n(.36°)} \quad (31)$$

Thus, the resistors $r_0$–$r_9$ in FIG. 11 are given the ohmic values which are shown in the following table:

TABLE III

| Number $n$ | $\theta_2$ Digit $f$ $n \times .36°$, degrees | $R_c$ $\dfrac{1000}{\tan \theta_2}\,\Omega$ |
|---|---|---|
| 0 | 0 | ∞ ($r_0$) |
| 1 | .36 | 159,153 ($r_1$) |
| 2 | .72 | 79,573 ($r_2$) |
| 3 | 1.08 | 53,045 ($r_3$) |
| 4 | 1.44 | 39,780 ($r_4$) |
| 5 | 1.80 | 31,820 ($r_5$) |
| 6 | 2.16 | 26,513 ($r_6$) |
| 7 | 2.52 | 22,722 ($r_7$) |
| 8 | 2.88 | 19,878 ($r_8$) |
| 9 | 3.24 | 17,665 ($r_9$) |

As the number n takes on any value, the corresponding ones of the FET's included in the changeable resistances $R_c$ will be rendered conductive and the effective value of the resistances $R_c$ will agree with that shown by Table III.

As thus far described, the apparatus of FIG. 12 will produce output voltages $E_s$ and $E_c$ whose ratio $E_s/E_c$ is equal to $\tan (\theta_1+\theta_2)$ as the number $mn$ varies from 000 to 250, that is, as the number $m$ has any number from 00 to 25, while the number $n$ has any value from 0 to 9. Thus, two-hundred-fifty different angles in steps of .36° may be selected in the first quadrant (FIG. 6) to make the angle $\theta$ have two-hundred-fifty different values between 0° and 90°.

To expand this operation so that one thousand different values for the angle $\theta$ may be selected within a full 360° range, the effective input signals for the amplifiers 134 and 138 are selectively reversed in polarity, as will now be explained.

Inspection of FIG. 6 will reveal that the sine of 36°, 144°, 216°, or 324° (corresponding to the number $m$ having a value of 10, 40, 60, or 90) is identical in magnitude, but has a positive sign in the first and second quadrants and a negative sign in the third and fourth quadrants. Similarly, the cosine of 36°, 144°, 216° or 324° is identical in magnitude but has a positive sign in the first and fourth quadrants, and a negative sign in the second and third quadrants. In general, therefore, the sine and cosine magnitudes are the same for an angle $\theta$ in the first quadrant, for $180°-\theta$ when $\theta$ lies in the second quadrant, for $\theta-180°$ when $\theta$ lies in the third quadrant, and for $360°-\theta$ when $\theta$ lies in the fourth quadrant. However, the sign of the sine function is positive when the angle $\theta$ lies in the first or second quadrants, and negative when the angle $\theta$ lies in the third or fourth quadrants; and the sign of the cosine function is positive in the first and fourth quadrants but negative in the second and third quadrants. In the practice of the present invention, these relationships are used to advantage. The effective amplitudes of the sine and cosine input signals supplied to algebraic combining devices are made the same for (a) any number $m$ which lies in the first quadrant, (b) any number $$\left(\frac{P}{2}-m\right)$$

when $m$ lies in the second quadrant, (c) any number $$\left(m-\frac{P}{2}\right)$$

when $m$ lies in the third quadrant, and for any number ($P-m$) when $m$ lies in the fourth quadrant; —where P is the quantity of angles into which the full 360° is divided, i.e., the range over which the input number $m$ may vary. In the example here described, P is one hundred so that magnitudes of the input signals transferred to the amplifiers in FIG. 12 may be properly created with the available resistors twenty-six (actually, twenty-five) by treating any number $m$ falling between 00 and 24 at its face value; by treating any number $m$ between 25 and 49 as if it were equal to $50-m$; by treating any number $m$ falling between 50 and 74 as if it were equal to $m-50$; and by treating any number $m$ falling between 75 and 99 as if it were equal to $100-m$. In the example depicted by FIG. 6, the numbers $m$ equal to 10, 40, 60 and 90 corresponding to $\theta_1$ angles of 36°, 144°, 216° and 324° are treated the same insofar as the amplitudes of the sine and cosine input signals are concerned, and the resistors $R_{10}$ and $R_{15}$ in the resistances $R_a$ and $R_b$ are rendered effective for all of these $m$ values. This will be discussed more fully below with reference to FIGS. 13A and 13B, but it will now be understood that the system of FIG. 12 will operate over a range of 000 to 999 for the composite number $mn$ insofar as the magnitudes of the input signals created by the resistors $R_0$–$R_{25}$ included within the changeable resistances $R_a$ and $R_b$ are concerned.

To make the generated input signals combine with proper phase polarities, however, means are employed to selectively reverse the sense with which the first input signal $E_r \sin \theta_1$ is supplied to the amplifier 134, depending upon the quadrant in which the angle $m\alpha$ falls. For this purpose, the signal $E_r \sin \theta_1$ which appears on the conductor 131 is selectively coupled through two complementally controlled FET's Q12 and Q34 (FIG. 12) to the additive and subtractive input terminals 134a and 134b. As labeled, the gates of the transistors Q12 and Q34 respectively receive enabling "1" potentials when the number $m$ (a) has any value from 00 to 49, or (b) has any value from 50 to 99. From inspection of FIG. 6, it will be apparent that the transistor Q12 is rendered conductive, and the effective input signal $E_r \sin \theta_1$ is transferred to the additive input terminal 134a whenever the angle $m\alpha$ lies in the first or second quadrants. Conversely, the transistor Q12 is cut off, and the transistor Q34 is made conductive to transfer the signal $E_r \sin \theta_1$ to the subtractive input terminal 134b whenever the angle $m\alpha$ lies in the third or fourth quadrants. In this way, the amplifier 134 treats the signal $E_r \sin \theta_1$ as if it is positive when $\theta_1$ lies in the first or second quadrants, and treats that signal as if it were negative when the angle $\theta_1$ lies in the third or fourth quadrants. This is the proper polarity relationship for a sine function. Thus, the twenty-six resistors which constitute the changeable resistance $R_a$ serve to produce an effective signal $E_r \sin \theta_1$ which is of proper amplitude over a 90° range, and the sign-controlling transistors Q12 and Q34 control the sign which the signal is treated so that the signal may represent any of one hundred different angles spaced at 3.6° intervals.

Similarly, the effective signal $E_r \cos \theta_1$ which appears on the conductor 136 is coupled through two complementally controlled FET's Q13 and Q24 respectively to the additive and subtractive input terminals 138a and 138b for the amplifier 138. As labeled, the gates of the transistors Q13 and Q24 respectively receive enabling "1" potentials when the number $m$ has (a) any value from 00 to 24 or from 75 to 99, or (b) any value from 25 to 74. From inspection of FIG. 6, it will be apparent that the signal $E_r \cos \theta_1$ is thus transferred through the transistor Q13 to the terminal 138a and treated as having a positive sign whenever the angle $m\alpha$ lies in the first or fourth quadrants. Conversely, the transistor Q13 is turned off, and the transistor Q24 made conductive to transfer the signal $E_r \cos \theta_1$ to the subtractive terminal 138b whenever the angle $m\alpha$ lies in the second or third quadrants, and in this case that signal is treated as having a negative polarity. Thus, the twenty-six different individual resistors which constitute the changeable resistance $R_b$ will provide a signal $E_r \cos \theta_1$ of proper amplitude as $\theta_1$ takes on twenty-five different values over a 90° range, and the control transistors Q13 and Q24 make this signal have the proper effective polarity such that it will properly represent both in amplitude and sign the cosine of $\theta_1$ as the latter takes on one hundred different values over a 360° range.

(G) A detailed embodiment of the present decoder and converter

FIGS. 13A and 13B together form a detailed diagram of apparatus constructed in accordance with the more general forms shown in FIGS. 8, 10, 11 and 12, and which is adapted to serve as the decoder 21a and the converter 21 represented only by blocks in FIG. 2.

As shown at the left in FIG. 13A, the twelve output lines from the $d$, $e$ and $f$ decade stages of the counter 20 (FIG. 2) form the inputs to the decoder 21a, and the signals on these lines represent the changeable number $def$ in 1-2-4-8 BCD notation, as previously explained. The four output lines from the $d$ decade stages form inputs to a BCD-to-decimal decoder 140 of any suitable type well known per se and which has ten output lines corresponding to the $d$ digit values 0–9. When the $d$ digit has any of its ten possible values, the corresponding one of these output lines receives a binary "1" potential and the others reside at a "0" level. Since the digit $d$ will be "0" as the number $def$ has any number from 000 to 099, and will be a "1" as the number $def$ has any value from 100 to 199; etc., these ten output lines are labeled $0xx$, $1xx$, $2xx$, etc.

Similarly, BCD-to-decimal decoders 142 and 143 receive the input signals from the $e$ and $f$ decade stages of the counter 20. Each of these decoders has ten output lines, the corresponding one of which will reside at a binary "1" potential when the digits $e$ and $f$ have any particular value between 0 and 9. The output lines for the decoder 142 are labeled $x0x$, $x1x$, $x2x$, etc., since these lines will be at a "1" potential when the $e$ digit is 0, 1, 2, etc., and irrespective of the values of the digits $d$ and $f$ in the number $def$. Likewise, the ten output lines from the decoder 143 are labeled $xx0$, $xx1$, $xx2$, etc.

The output lines from the decoders 140 and 142 lead into a system of logic gating 145 here represented as a single block for the sake of simplicity. The details of the gating 145 will become clear from a brief explanation of the function to be obtained.

Recalling that the number $m$ is constituted by the higher order digits $de$ of the number $def$, the gating 145 operates to produce a binary "1" signal on a particular one of twenty-six output lines as the number $m$ takes on twenty-six values from 00 to 25, these numbers corresponding to twenty-six values for the angle $m\alpha$ in steps of 3.6° between 0° and 90°. These differently valued angles are labeled in parenthesis on the gating output lines, and the corresponding value of the number $m$ (and thus as the number $de$) appear as the first figure at the left on the respective output lines.

As an example, if the signaled number $de$ is 14, then the output line labeled "14$x$" at the left and "(50.4°)" at the right will receive a binary "1" potential—and all other gating output lines will reside at "0" levels.

But the gating system is readily constructed to place the proper one of its twenty-six output lines at a "1" level when the numbers $m$ and $de$ lie between 251 and 999, indicating that the angle $\theta_1$ lies in the second, third or fourth quadrants. Essentially, the gating system 145 produces the same response to any angle $\theta_1$ lying in the second quadrant as if that angle had a value of $180° - \theta_1$; it produces the same response to any angle $\theta_1$ lying in the third quadrant as if that angle had an angle of $\theta_1 - 180°$; and it produces the same response to any angle $\theta_1$ lying in the fourth quadrant as if that angle had a value of $360° - \theta_1$.

To take specific examples, when the signaled number $m$ is either 00 or 50, the response of the gating 145 is the same, and that output line labeled 0° receives a binary "1" signal. Similarly, when the signaled number $m$ is 01, 49, 51 or 99, the response is the same and the gating circuit output line for the first quadrant angle of 3.6° is placed at a binary "1" level. As a further example, when the number $m$ is 14, 36, 64 or 86, the output line labeled 50.4° is placed at a binary "1" level, and from FIG. 6 it will be ascertained that the magnitudes of sine and cosine functions for these four values of the number $m$ are identical, although they may differ in sign.

From these examples, it will be understood that the gating system 145 makes one of the twenty-six output lines for a binary "1" signal thereon when the number $m$ and the identical number $de$ takes on one hundred different values from 00 to 99—the particular output line which receives this signal corresponding to the first quadrant angle which has sine and cosine magnitudes identical to the angle $m\alpha$ and regardless of the quadrant in which the angle $m\alpha$ lies.

Those skilled in the art will understand from the foregoing discussion how the logic gating system 145 may be constructed in detail. FIG. 14 shows two examples of the logic gating associated with the 90° and 50.4° output lines 146 and 147. To make the line 146 reside at a "1" level when the number $de$ is either 25 or 75, the decoder output lines $2xx$, $x5x$ and $7xx$, $x5x$ are coupled as paired inputs to two respective AND gates 148 and 149 whose outputs lead through an OR circuit 150 to the line 146. When the digits $d$ and $e$ are 2 and 5, respectively, or when the digits $d$ and $e$ are 7 and 5, respectivety, then a "1" signal when the number $m$ is 14, 36, 64, 86 and the corresponding whenever the number $m$ is twenty-five or seventy-five and the angle $m\alpha$ is 90° or 270° (see FIG. 6).

For the output line 147, four AND gates 151–154 are coupled to receive paired inputs from the decoder lines $1xx$ and $x4x$, $3xx$ and $x6x$, $6xx$ and $x4x$, and $8xx$ and $x6x$. These gates are all coupled through an OR circuit 155 to the line 147 so the latter will receive a binary "1" signal when the number $m$ is 14, 36, 64, 86 and the corresponding $m\alpha$ is 50.4°, 129.6°, 230.4° or 309.6°.

The twenty-six gating output lines are connected to the control gates of the twenty-five FET's (shown simply as circles in FIG. 13A) associated with the risestor $R_0$ through $R_{25}$ which form the changeable resistance $R_a$. These resistors have values as set forth in Table II above, and a particular one is effectively connected between the conductors 130 and 131 for any value of the signaled number $de$. For example, if the number $de$ is fourteen, a binary "1" signal on the gating output line 147 will render the FET associated with resistor $R_{14}$ effective, but this will also occur if the signaled number $de$ is 36, 64 or 86. Thus, the decoding and logic gating serves to control the changeable resistance $R_a$ so that the twenty-five resistors therein serve to produce a signal which in amplitude is effectively equal to $E_r \sin \theta_1$ where the angle $\theta_1$ can take on one hundred different values equally spaced around all four quadrants. This signal $E_r \sin \theta_1$ in effect appears on the line 131 and is transferred either through the transistor Q12 or the transistor Q34 to the additive or substractive input terminal 134$a$ or 134$b$ of the amplifier 134, as previously described with reference to FIG. 12.

As shown in FIGS. 13A and 13B, the same twenty-six output lines from the logic gating 145 are connected to control the gates of the twenty-five FET's (shown simply as circles) associated with the respective resistors $R_0$ through $R_{25}$ which form the changeable resistance $R_b$. These indivdual resistors have the values set forth in Table II above, and a particular one is coupled between the conductors 135 and 136 for each value of the signaled number $de$. However, as previously noted, the gating output lines receive signals when the signaled angle $\theta_1$ lies in any of the four quadrants, and from inspection of Table II and FIG. 6, it will be seen that the output signals from the logic gating control the transistors utilized in the variable resistance $R_b$ such that the signal appearing on the line 136 in effect varies as $E_r \cos \theta_1$.

As shown in FIGS. 13A and 13B, the ten output lines from the $f$ digit decoder 143 are coupled directly to the gates of the individual FET's associated with the corresponding ones of the resistors $r_0$–$r_9$ which constitute the two changeable resistance $R_c$. These resistors have the values set forth in Table III. As noted previously, when the digit $f$, representing what has here been called the number $n$, is for example a 4, the two FET's associated with the two resistor $r_4$ will be made conductive so as to connect those resistors between the paired conductors 139, 140 and 141 and 142. Thus, the signals which appear on the conductors 140 and 142 will in effect be proportional to $E_c \tan 1.44°$ and $E_s \tan 1.44°$. As the $f$ digit and the $n$ number take on different values, the ratio $Rf/R_c$ will be proportional to $\tan n\beta$, and the signals on the line 140 and 142 will in effect be proportional too $E_c$ and $\tan n\beta$ and $E_s \tan n\beta$.

The signal on the line 140 is routed selectively through one or the other of two field effect transistors Q1 or Q2 to the additive or subtractive input terminals 134$a$ or 134$b$ of the amplifier 134. Similarly, the signal $E_s \tan \theta_2$ appearing on the conductor 142 is routed selectively through one or the other of two field effect transistors Q3 and Q4 to the subtractive or additive terminal 138$b$ or 138$a$ of the amplifier 138. These transistor Q1–Q4 are controlled by N+ or N− signals according to the sign of the number N signaled by the counter 20, for reasons to be explained below. For the moment, it may be assumed that the N+ signal is a 1, and the transistor Q1 and Q3 are conductive, so that the effective connections are identical to those shown in FIG. 12.

(1) Control of effective signal polarities according to quadrants

In discussing the application of sine and cosine function signals to the algebraic combining amplifiers 134 and 138, it has been assumed that these signals have a positive phase polarity, i.e., are in phase with the reference voltage $E_r$, when the angle $\theta_1$ lies in the first quadrant. The signals produced by the changeable resistances $R_a$ and $R_b$ are indeed always of positive phase polarity in the exemplary apparatus here shown. But when the angle $\theta_1$ lies in the second, third or fourth quadrants, these signals in certain cases must be treated as having negative polarities.

As demonstrated by FIG. 6, the signal $E_r \sin \theta_1$ is to be treated as positive when $\theta_1$ lies in the first and second quadrants, but the same signal is to be negative when $\theta_1$ lies in the third and fourth quadrants. The signals $E_r \cos \theta_1$ is to be positive in the first and fourth quadrants, but negative in the second and third quadrants.

The proper effective signal polarities are here achieved by gate units 158 and 159 which respond to the decoder signals representing the number $de$ and complementally control the conduction of the transistors Q12, Q34, and Q14, Q23—so that the signals $E_r \sin \theta_1$ and $E_r \cos \theta_1$ act on the amplifiers 134 and 138 with the proper sense.

The gate unit 158 serves as means for effectively reversing the polarity of the signal $E_r \sin \theta_1$ when $\theta_1$ lies in either the third or fourth quadrants. As noted previously with reference to FIG. 6, if the number $m$ or $de$ lies between 00 and 49, the angle $\theta_1$ is in the first or second quadrants, but if that number lies between 50 and 99, the angle $\theta_1$ lies in the third or fourth quadrants. As shown in FIG. 13B, the output lines 0$xx$, 1$xx$, 2$xx$ and 4$xx$ from the decoder 140 are connected as inputs to an OR circuit 160 so that its output line 160$a$ will receive a binary "1" potential when the angle $\theta_1$ lies in either the first or second quadrant. Conversely, the line 160$a$ will receive a binary "0" potential if the angle $\theta_1$ lies in the third or fourth quadrants. Assuming for the moment that the signals N+ and N− are respectively "1" and "0," so that an AND gate 161 is disabled and an AND gate 162 is enabled, the "0" or "1" output from the OR circuit 160 is transferred through the gate 162 to a second OR circuit 164 and then directly to the gate of the transistor Q12 but through an inverter 165 to the gate of the transistor Q34. Thus, when the signaled number $de$ or $m$ lies between 00 and 49 (and the angle $\theta_1$ is in the first or second quadrants) the transistor Q12 will be turned on and the transistor Q34 will be turned off. The effective signal $E_r \sin \theta_1$ will thus be routed to the input terminal 134$a$. But on the other hand, if the signaled number $de$ and $m$ lies between 50 and 99 (so that the angle $\theta_1$ lies in the third or fourth quadrants), then the transistor Q12 will be turned off, and the transistor Q34 will be turned on. Under these conditions, the effective signal $E_r \sin \theta_1$ will be coupled to the subtractive terminal 134$b$, and it will be treated by the amplifier 134 as if it has a negative phase polarity.

The gate unit 159 serves as a means for reversing the effective polarity of the signal $E_r \cos \theta_1$ when the angle $\theta_1$ lies in the second or third quadrants, as contrasted with first or fourth quadrants. It may be observed from FIG. 6 that $\theta_1$ lies in the first quadrant when the number $m$ has values between 00 and 24; and that $\theta_1$ lies in the second, third or fourth quadrants when the number $m$ has values of 25–49, 50–74 and 75–99, respectively. From inspection of the gate unit 159, it will be seen that a first OR circuit 168 receives the decoder output signals 3$xx$, 4$xx$, 5$xx$ and 6$xx$. It additionally receives on an input line 168$a$ a binary "1" signal from an AND circuit 169 when the latter receives a binary "1" signal representing 7$xx$ and a binary "1" signal from an OR circuit 170 having one binary "1" input signal when the digit $e$ has any of the values 0 through 4. Thus, the input line 168$a$ receives a binary "1" signal when the number $def$ falls between 700 and 749. Still another input line 168$b$ for the OR circuit 168 receives the output from an AND gate 171 which has one input coupled to the decoder output line 2$xx$, and a second input leading from an OR circuit 172 coupled to receive binary "1" signals when the $e$ digit has any of the values 5 through 9. Thus, the input line 168b will receive a binary "1" signal when the number *def* has any value from 250 to 299.

It will now be apparent that the output line 168c of the OR circuit 168 will reside at a binary "1" level when the number *def* lies within the range of 250 to 749, i.e., when the number *m* lies between 25 and 74 and the angle $\theta_1$ lies in the second or third quadrants. Of course, if the number *def* and the number *m* lies outside that range, and the angle $\theta_1$ is in the first or fourth quadrants, the line 168c will receive a binary "0" potential. The line 168c is coupled directly to the gate of the transistor Q23 and through an inverter 174 to the gate of the transistor Q14. Thus, when the angle $\theta_1$ lies in the first or fourth quadrants, the transistor Q23 will be cut off, and the transistor Q14 turned on so that the signal $E_r \cos \theta_1$ will in effect be applied to the additive input terminal 138a. This is the normal "positive phase polarity" condition which has been assumed above. On the other hand, when the angle $\theta_1$ lies in the second or third quadrants, the transistor Q14 will be cut off, and the transistor Q23 rendered conductive so that the signal $E_r \cos \theta_1$ will be applied, in effect, to the subtractive terminal 138b. In these circumstances, that signal will be processed by the amplifier 138 as if it has a negative phase polarity.

(2) Changes in effective signal polarities depending upon sign of counter number N In describing the converter 21 of FIGS. 13A, 13B thus far, it has been assumed that the number N in the counter 20 (FIG. 2), and thus the number represented by the last three digits *def* which form the signaled input to the decoder 21a, is positive. The converter 21 will indeed function properly in the system of FIG. 2 if the range of travel of the movable element 15 is restricted to the positive region, and the sign of the number N is always positive.

However, in the case where the counter number N can become negative and increase in magnitude as the element moves to the left from the zero reference point, it has been found necessary to reverse the effective polarities of certain input signals fed to the algebraic combining devices.

First, consider the two signals $E_r \sin m\alpha$ and $E_r \cos m\alpha$ created by the changeable resistances Ra and Rb which are responsive to the absolute value $|m|$ of the signaled number $+m$. When *m* is zero, the signal $E_r \sin m\alpha$ has zero amplitude, and the signal $E_r \cos m\alpha$ has its maximum amplitude. As the movable element moves to the right from the zero reference point, the signal DS will be of positive phase polarity, the counter 20 will count up as previously explained, and the number *m* will increase in magnitude, so that the signals $E_r \sin m\alpha$ and $E_r \cos m\alpha$ will respectively increase and decrease in amplitude with both having a positive phase polarity, thus causing the null for the DS signal to shift to the right. The system will come to equilibrium with the counter containing the correct positive number N representing the element's new position.

But if the movable element 15 shifts to the left from the zero reference point, the signal DS will be of negative phase polarity, the signal N— will be "1," the counter will count up as previously explained, and the number *m* will increase in magnitude, so that the signals $E_r \sin m\alpha$ and $E_r \cos m\alpha$ will respectively increase and decrease in amplitude with both having a positive phase polarity, thus causing the null for the DS signal to shift to the right—the same as before. In this situation, the closest null for the DS signal will move away from the element's actual position, and the counter will continue to count up until the null located 0.1″ to the left of the closest null is brought into agreement with the element's actual position.

To eliminate this improper response when the element's true position and the counter number N are negative, the converter 21 is made to respond as if the resistances $R_a$ and $R_b$ did not change as a function of $|m|$, but on the contrary, as if they respond to both the sign and magnitude of the number *m*, where *m* is $\pm de$. In other words, the signals $E_r \sin m\alpha$ and $E_r \cos m\alpha$ are manipulated so that they do not represent $E_r \sin |m|\alpha$ and $E_r \cos |m|\alpha$, but on the contrary represent $E_r \sin \pm m\alpha$ and $E_r \cos \pm m\alpha$, where the signs are the signs of the number N (and thus of the number *def*) in the counter 20.

For this purpose, no change need be made in the cosine signal because the cosine of any angle is the same in sign and magnitude as the cosin of the negative ot the same angle (i.e., $\cos \phi = \cos -\phi$). Thus, $$E_r \cos (+m)\alpha E_r \cos (-m)\alpha = E_r \cos |m|\alpha$$

and the signal $E_r \cos \theta_1$ which in effect is produced by the changeable resistance $R_b$ (and given the proper phase polarity according to the quadrant of $m\alpha$ by the gates 159 and the transistors Q14, Q23, FIG. 13B) is always correct irrespective of the sign of the number *m*.

But from the familiar trigonometric identity $(\sin -\phi) = -(\sin +\phi)$, it may be seen that when the angle $m\alpha$ in the present system is negative, then the signal $E_r \sin m\alpha$ should have a polarity opposite to that for a positive angle $m\alpha$. Means are here provided responsive to the sign of the number *m* (and thus of the numbers N and *def*) for causing the signal $E_r \sin |m|\alpha$ to be in effect positive or negative in phase polarity when *m* is positive or negative— so that the signal $E_r \sin m\alpha$ correctly represents a sine function of the angle $m\alpha$ whenever that angle is either positive or negative. For this purpose, the two AND gates 161 and 162 controlled by the signals N— and N+ are included in the gating unit 158 which controls the transistors Q12 and Q34 (FIG. 13B). When the angle $|m|\alpha$ is in the first or second quadrants ($m=00$ to 49), the line 160a will be at a "1" level; and if the counter number is positive (N+="1") the gate 162 will be qualified so that the transistor Q12 is conductive (and Q34 is turned off), and the signal $E_r \sin \theta_1$ is applied to the amplifier 134 with an effective positive phase polarity. But if the angle $|m|\alpha$ is in the first or second quadrants and hte counter number is negative (N—="1"), then neither gate 161 nor 162 will produce a "1" reponse, the output of OR circuit 164 will be a "0," the transistor Q34 will be turned on by the "1" signal from inverter 165, the transistor Q12 will be turned off, and the signal $E_r \sin \theta_1$ will be applied to the amplifier terminal 134b so as to have an effective negatve phase polarity. From inspection of the gating unit 158, when the angle $|m|\alpha$ lies in the third or fourth quadrants ($|m|\alpha=50$ to 99), gate 162 will be disqualified, the inverter 163 will supply a "1" input to the gate 161 so that the transistor Q12 will be turned on if the number N is negative and the transistor Q34 will be turned on if the number N is positive. Thus, the gating unit 158 causes the signal $E_r \sin \theta_1$ to be treated with a positive phase polarity (a) if the angle $\theta_1$ in magnitude lies in the first or second qudrants and the number *m* is positive, or (b) if the angle $\theta_1$ in magnitude lies in the third or fourth quadrants and the number *m* is negative. Conversely, the signal $E_r \sin \theta_1$ is treated with a negative phase polarity if (a) the angle $\theta_1$ in magnitude lies in the first or second quadrants and the number *m* is negative, or (b) the angle $\theta_1$ in magnitude lies in the third or fourth quadrant and the number *m* is positive. Proper phase polarity for the effactive sine function signal is thus provided depending upon both the quadrant and the sign of the angle $m\alpha$.

Secondly, when the number *mn* is positive and increasing the angle $\theta$ increases in a counterclockwise sense from the 000 point in FIG. 6. With the signal N+="1" (FIGS. 2 and 3), and the transistors Q1 and Q3 (FIG. 13B) are conductive, the signals $E_c \tan \theta_2$ and $E_s \tan \theta_2$ will combine properly with the signals $E_r \sin \theta_1$ and $E_r \cos \theta_1$ in the amplifiers 134 and 138 to make the final output signals $E_s$ and $E_c$ respectively and substantially proportional to $E_r \sin \theta$ and $E_r \cos \theta$. FIG 7 shows this for a typical case in the first quadrant, and from this example, the signal combination will be apparent in all four quadrants.

In the second quadrant, for example, the signal $E_c$ tan $\theta_2$ must act to decrease the amplitude of the signal $E_r$ sin $\theta_1$ in order to arrive at the output signal $E_s = E_r$ sin $\theta$. Because in the second quadrant the effective signal $E_r$ sin $\theta_1$ is positive, and the signal $E_c$ is negative, then the two signals $E_r$ sin $\theta_1$ and $E_c$ tan $\theta_2$ have opposite polarities, and since both are, in effect, applied to the additive input terminal 134a, the latter reduces the contribution of the former in the output signal $E_s$. Similarly, in the second quadrant with the number N positive, the signal $E_s$ is positive, and the signal $E_s$ tan $\theta_2$ as it appears on conductor 142 is in effect positive in polarity. The signal $E_r$ cos $\theta_1$ as it appears on the conductor 136 is in effect positive. These two signals are respectively coupled through transistors Q3 and Q23 to the subtractive input terminal 138b, so that the former adds to the latter in creating the output signal $E_c$ with a negative phase polarity.

However, when the number $mn$ is negative and increasing, the angle $\theta$ is in effect negative and it increases in a clockwise sense from the 000 point in FIG. 6. Thus, when the number $mn$ is negative, the change to the magnitude of the signals $E_r$ sin $\theta_1$ and $E_r$ cos $\theta_1$ contributed by the signals $E_c$ tan $\theta_2$ and $E_s$ tan $\theta_2$ in arriving at the final outputs $E_s$ and $E_c$ must be opposite to that when the number $mn$ is positive. To accomplish this, the signals $E_c$ tan $\theta_2$ and $E_s$ tan $\theta_2$ are routed through the tarnsistors Q2 and Q4 which are turned on when the signal N— is a "1," to the subtractive and additive input terminals 134b and 138a, thereby in effect inverting or reversing the signal polarities.

Taking an example, when the number $m$ is $-60$, so that in an absolute sense the angle $\theta$ is $-216°$, the quadrant switching described above causes the signals $E_r$ sin $\theta_1$ and $E_r$ cos $\theta_1$ to be generated as if the number $m$ were $+40$ (i.e., the effective $m$ is the actual $m$ minus 50). See FIG. 6. As the number $n$ increases so that $mn$ changes from $-600$ to $-601$, to $-602$, etc., then the signal $E_c$ tan $R_2$ must add to the amplitude of the signal $E_r$ sin $\theta_1$ in producing the final signal $E_s$; and the signal $E_s$ tan $\theta_2$ must subtract from the amplitude of the signal $E_r$ cos $\theta_1$ in producing the final signal $E_c$. As shown in FIG. 13B, when the number $mn$ is $-601$, then the $E_r$ sin $\theta_1$ signal is transferred from conductor 131 through the transistor Q12 to terminal 134a and is treated as positive. The signal $E_c$ is negative in phase polarity, so the signal $E_c$ tan $\theta_2$ on line 140 is negative in phase polarity and is transferred through the transistor Q2 to the subtractive input terminal 134b. Thus, the signal $E_c$ tan $\theta_2$, being negative and being subtractive in effect, actually increases the positive polarity signal $E_s$ relative to the amplitude the latter would have solely as a result of the signal $E_r$ sin $\theta_1$. Correspondingly, when the number $mn$ is $-601$, the signal $E_r$ cos $\theta_1$ is coupled through the transistor Q23 to the terminal 138b, and thus treated as having a negative phase polarity. The signal $E_s$ is positive in phase polarity, so the signal $E_s$ tan $\theta_2$ as it appears on conductor 142 is positive in phase polarity but routed through the transistor Q4 to the additive input terminal 138a. Thus, the signal $E_c$ is negative in phase polarity due to the effect of the first input signal $E_r$ cos $\theta_1$, but it is reduced in amplitude by the contribution of the signal $E_s$ tan $\theta_2$. This is the sense of signal combining required when the number $mn$ is negative and lies in what may be called the third quadrant range of values. The similar correct sense of signal combining may be vertified for the other quadrants by repeating the foregoing train of deduction.

In summary, it will be seen that the decoder 21a and converter 21 as shown in FIGS. 13A and 13B may be employed for those corresponding portions of the system illustrated in FIG. 2. Responding to the changeable number $def$ signaled by the three lowest order stages of the counter 20, the decoder 21a and converter 21 produces sine and cosine function signals to excite the Inductosyn slider windings 22a, 22b with signals which vary in amplitude and phase polarity according to the relations $E_s = E_r$ sin $(de\alpha + f\beta)$ and $E_c = E_r$ cos $(de\alpha + f\beta)$ as the number $def$ has any value from 000 to 999 and either a positive or negative sign.

RESUMÉ OF SYSTEM OPERATION

Now that the decoder 21a and converter 21 have been described in detail with reference to FIGS. 13A and 13B, the operation of the complete numerical position signaling system in FIG. 2 may be briefly reviewed for a better understanding.

The system may at any time be conditioned to locate the numerical zero reference point at any physical position along the path of the element 15. It is only necessary to move the element to a position which is to have a known and desired numerical designation, say $+34.5678"$. The operator of the system then simply turns the differential resolver 48 until pulses admitted from the producer 32 as a result of the signal DS cause the decade counter stages $d, e, f$ to signal the number 678. This is conveniently accomplished, since the number $def$ can be read from the $d, e$ and $f$ digit displays, and the resolver turned until the displayed number has the desired value. Next, the dial switches 100, 101, 102 are manually set to represent a number 345, the switch 103 is set to its $+$position, and the enabling switch 104 momentarily closed. The flip-flop 36 and the counter stages $a, b, c$ are thus preset to the states representing $+345$. The entire counter 20 now signals a number $N = +34.5678$ and this is visually readable on the display devices.

As the element 15 is thereafter moved to the left or the right to any new position, the signal DS will appear with a negative or positive phase polarity as soon as such motion begins. Pulses will be admitted to the counter 20 from the producer 32 so that the signaled number N will decrease or increase to stay in agreement with the actual position of the element. The pulse source 30 may have a relatively high frequency (say, 20 kHz.) so that even if the element moves at 120 inches per minute, the signaled number N will represent with essentially no lag the instantaneous position of the element while it is in motion. When the element stops, the counter will count until the discrepancy signal DS disappears, and the signaled number N will precisely represent the actual position of the element relative to the selected reference point.

The element 15 may move to positions in positive or negative regions on either side of a zero reference point and as the element moves from one region to the other, the sign flip-flop 36 will be switched in state to correctly represent the sign of the position. Moreover, the counter will count up or down as the element 15 moves away from or toward the zero reference point, so that the signaled number N will always represent the element's position measured from that point.

The closed loop which includes the counter 20, the converter 21, the transducer 22-24, the discriminator 55, and the gate 28 requires only that the lowest order stages (as here described, the three stages $d, e, f$) of the counter be sensed to control the digital-to-analog converter. The higher order stages, once correctly preset, automatically "follow" to signal the values of the higher order digits in the position-representing number. Thus, a very "fine" or precise transducer of the Inductosyn or resolver type may be employed without any need for "medium" or "coarse" channels in order to signal any of a wide range of position-representing numbers. The system acts so quickly to keep the number N in agreement with the actual position of the element as the latter moves the discrepancy can never exceed more than half the "span" of the transducer's cycle.

The digital-to-analog converter divides the cycle span of the transducer precisely into a large number of parts (here, one thousand) but requires only a relatively few discrete impedances or resistors (here sixty-eight resistors making up the changeable resistances $R_a$, $R_b$, $R_c$). By the use of cross coupled algebraic combining devices, such as simple differential amplifiers, the wide range input number $def$ may be treated as higher and lower order portions $m$ and $n$, so that final sine and cosine function signals $E_s$ and $E_c$ are derived in proper trigonometric relationship, both as to amplitude and sign. The use of field effect transistors to selectively connect different ones of the individual resistors into the changeable resistances $R_a$, $R_b$, $R_c$ yields three important advantages. First, the number signaled by the counter 20 changes very rapidly and the analog signals $E_s$ and $E_c$ must change equally fast; the transistors accomplish this with the necessary speed which would be virtually unobtainable with physical relay contacts. Secondly, the transistors offer no source of malfunction due to wear, as would be true of physical relay contacts. And thirdly, the field effect transistors when turned on conduct bi-directionally, and thus serve to transfer alternating voltages which would not be conducted by conventional transistors.

The converter 21 in effect works over only one quarter of the transducer span so far as magnitudes of the analog signals are concerned, but it accommodates the whole span by changing the effective signal polarities for the different quadrants. Moreover, the converter handles both positive and negative input numbers, responding to the sign signals N+ and N−, so that the counter number is always indicative of the magnitude of the element's position in either positive or negative regions.

The choice of signal polarity designations in the digital-to-analog converter is arbitrary and specific designations have been made in the foregoing description merely for the sake of concrete example. Any two complemental sign or polarity relations may be changed. For instance, the reference sigal $E_r$ may be given a negative phase polarity with respect to the signal RSF, and counter 20 controlled so that it counts up or down when the phase polarity of the discrepancy signal DS is respectively negative or positive. It is to be understood, therefore, that the present invention is to embrace the many obviously alternative and equivalent signal sign or polarity designations which may be chosen.

A PREFERRED PULSE PRODUCER CONTROLLED IN FREQUENCY

The pulse producer 32 shown in FIG. 2 supplies pulses at constant frequency from the source 30 to the counter 20 whenever the signal DS is appreciably greater than zero and the count signal CT opens the gate 28. The frequency of the source may be chosen to have any suitable value, preferably one which is relatively high so that corrective counting in the counter occurs rapidly whenever any discrepancy exists.

In the preferred form of the invention the pulse producer 32 is one which supplies corrective pulses to the counter at a rate or frequency which is generally related or approximately proportional to the magnitude of the discrepancy. This alternative form of pulse producer is illustrated at 32' in FIG. 15, and may be used in FIG. 2 in lieu of the pulse producer 32.

In the pulse producer 32', means are provided to create a D.C. voltage which is proportional in magnitude to the amplitude of the discrepancy signal DS, and irrespective of the phase polarity of the latter. As shown in FIG. 15, the discrepancy voltage DS is coupled through a half-wave rectifier or diode 185 to one input of an AND gate 186 whose output is connected to one side of a grounded capacitor 188. The other input of the gate 186 comes from an OR circuit 189 having the SIG+ and SIG− signals as inputs. Although the gate 186 and OR circuit 189 are not essential, they serve to prevent any charging of the capacitor 188 unless and until the discrepancy signal exceeds the minimum amplitude established by the trigger circuits 68 and 69 in FIG. 3. Assuming that the signal DS does exceed that minimum amplitude so that SIG+ or SIG− is a "1," to qualify the gate 186, then the positive half cycles of the signal DS (regardless of whether the latter has a positive or negative phase polarity) will create current flow through the diode 185 and the gate 186 to charge the capacitor 188 to a voltage substantially equal to the peak amplitude of the discrepancy signal. The capacitor cannot discharge rapidly, so the voltage across it is a relatively smooth D.C. voltage $V_2$ proportional in magnitude to the amplitude of the signal DS.

This voltage $V_2$ might be employed as the control input for a voltage-controlled variable frequency pulse oscillator, but the range of frequencies desired (from say 1 p.p.s. to 100,000 p.p.s.) would require complex and expensive circuitry. As a simpler pulse generator controllable over a wide frequency range, the producer 32' of FIG. 15 includes a trigger circuit 190, similar or equivalent to the well known Schmitt trigger, coupled to respond to the voltage across an input capacitor 191. The capacitor 188 is connected through a resistor 192 to the capacitor 191 so that the latter, once discharged, will exponentially charge (by current flow represented by the dotted line) toward the voltage $V_2$ across the former. As the voltage across capacitor 191 reaches the critical triggering level for the circuit 190, the latter turns "on" and supplies an abruptly increased voltage to the input of a one-shot multivibrator 194, which responds by producing an output pulse of predetermined, short duration. That output pulse is fed to the inpt terminal PI of the counter 20 (FIG. 2), but it is also fed back via a conductor 195 to turn on a gated, constant current generator 196 for the very short period of the pulse duration. The current generator is associated with a negative voltage source (here shown as a battery 198) and, when enabled, it quickly discharges the capacitor 191 to substantially zero volts by current flow around the path illustrated by the dashed line arrows. The resistor 192 prevents any appreciable discharge of the capacitor 188 during those short periods when the current generator 196 is turned on.

When the pulse is produced by the one-shot device 194 and the generator 196 is turned on, the capacitor 191 almost immediately discharges and the trigger circuit 190 is immediately turned off. Then, the capacitor 191 begins to charge exponentially from the capacitor 188, and the cycle of operation repeats. The time required for the capacitor 191 to charge to the triggering voltage of the circuit 190 will be approximately proportional to the magnitude of the voltage $V_2$ and thus to the amplitude of the discrepancy voltage DS. Therefore, each of the pulses supplied from the producer 32' to the counter will be of the same short duration determined by the one-shot device 194, but the frequency of those pulses will be generally proportional to the amplitude of the discrepancy signal DS. When the discrepancy falls to zero, no corrective pulses will be produced.

This controlled frequency pulse producer is advantageous in that it eliminates the simple on-off gate 28 of FIG. 2 and avoids the two conditions where either no corrective pulses are admitted to the counter or such pulses are admitted at a very high rate determined by the frequency of the source 30. If settling time in the counter stages or in the analog circuitry is appreciable, the counter could conceivably overcorrect before the gate 28 is closed, and a second correction might be necessary to make the counter count in the reverse direction to bring the discrepancy signal back to zero. By making the corrective pulse frequency generally proportional to the magnitude of the discrepancy, the correction is very fast when the discrepancy is large, but slower when the discrepancy approaches zero, so that the number N signaled by the counter dynamically follows very closely rapid changes in the position of the element 15 but does not overshoot and hunt about the correct value when the element moves very slowly or stops.

A SIMPLIFIED AND PREFERRED EMBODIMENT OF THE DIGITAL-TO-ANALOG CONVERTER

The digital-to-analog converter described with reference to FIGS. 13A and 13B will function with very high accuracy in the system of FIG. 2, and it represents a typical embodiment of the present invention. As a practical matter, however, the invention may be practiced with a more simplified embodiment of the digital-to-analog converter when the position-sensing transducer has an accuracy (for example, ±50 microinches) considerably greater than the accuracy of the lowest order digit place value (here the nearest ten-thousandths of an inch) to be signaled and displayed.

FIG. 16 illustrates a practical and preferred embodiment of the present digital-to-analog converter which is in many respects similar to the one already described. However, this simplified embodiment produces sine and cosine function signals which are based on an approximation of the contribution made by the lowest order digit of the input number, and it utilizes certain other advantageous alternatives in decoding the input number and controlling the effective polarities of the several signals to be combined.

The decoder 200 in FIG. 16 has twelve inputs which, as labeled on the left, are connected to the twelve output lines of the counter decade stages $d$, $e$ and $f$ in FIG. 2. However, it is assumed that the decade counter stage $f$ of FIG. 2 signals its digit value in 1-2-4-8 code on lines $f1$, $f2$, $f4$, $f8$ (as described previously), but that the stages $d$ and $e$ in the counter 20 are arranged to signal their respective digit values in the familiar, alternative 1-2-4-5 code on output lines labeled $d1$, $d2$, $d4$, $d5$ and $e1$, $e2$, $e4$, $e5$. For ready reference, the combinations of "1" and "0" binary signals which in the 1-2-4-5 code respectively represent the decimal digit values of 0 through 9 are set forth below:

TABLE IV

| Decimal Value | 1 BIT | 2 BIT | 4 BIT | 5 BIT |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 0 | 0 | 0 | 1 |
| 6 | 1 | 0 | 0 | 1 |
| 7 | 0 | 1 | 0 | 1 |
| 8 | 1 | 1 | 0 | 1 |
| 9 | 0 | 0 | 1 | 1 |

The weight or value contributed to the composite number $def$ when respective ones of the twelve input lines are at a "1" potential is labeled on each input line in FIG. 16. Taking an example, if the lines $d1$ and $d2$ are at a "1" level, they signal that the number $def$ includes a value of 300; if the lines $e2$ and $e5$ are also at a "1" level, they signal that the number $def$ includes an additional quantity of 70; and if the lines $f1$ and $f8$ are at a "1" level, they signal that the number $def$ includes an additional nine—making the total number $def$ equal to 379.

From the number $def$ so signaled on the twelve input lines, the decoder 200 derives the complements of the $d$ and $e$ decade output signals. As here shown, the four input lines from the $d$ decade of the counter are coupled to inverters 201–204 so as to produce complement signals (represented by a superposed bar above the weight-designating label) $\overline{1xx}$, $\overline{2xx}$, $\overline{4xx}$, $\overline{5xx}$.

Similarly, the four output lines from the $e$ decade counter 20 are coupled to inverters 206–209 which produce complement signals $\overline{x1x}$, $\overline{x2x}$, $\overline{x4x}$, $\overline{x5x}$. These "true" and "complement" signals form inputs to logic gates which will be described more fully below.

In arriving at the organization of the converter shown in FIG. 16, the first quadrant of a circle is divided into five equal angles of 18°, thus designating six points on the circle corresponding to angles of 0°, 18°, 36°, 54°, 72° and 90° (FIG. 17). The predetermined angle $\alpha$ is in this case 18°, and the angle $\theta_1 = m\alpha$ is 0°, 18°, 36°, 54°, 72° or 90° as $m$ takes on the values of 0, 1, 2, 3, 4 or 5. Around the full 360° circle as shown in FIG. 17, the angle $m\alpha$ may vary from 0° to 342° in steps of 18° as $m$ takes on any value between 00 and 19. Thus, twenty points spaced at 18° intervals around the full circle correspond to steps of fifty in the number $def$, and it may be considered as the number $def$ changes in steps of fifty from $00x$ to $95x$, the value of $m$ changes in steps of one from 00 to 19.

Each of the 18° divisions shown in FIG. 17 is further divided into five equal submultiples of 3.6°, as shown by way of example between the principal angles of 36° and 54°. In this instance, therefore, the angle $\beta$ is 3.6°, and the angle $\theta_2 = n\beta$ can have any value from 0° to 14.4° in steps of 3.6° as $n$ takes on any of five respective values, 0, 1, 2, 3 or 4. In terms of the number $def$, the value of $n$ is represented by the value of the $e$ digit when $e$ is less than five, but by the value of $(e-5)$ when $e$ is five or greater.

With this approach, any of one hundred points corresponding to angles equally dividing a circle may be represented by the composite number $mn$, where $m$ can vary from 0 to 19 and $n$ can vary for 0 to 4. Each increment angle of 3.6° is further divisible into ten angles of .36° based upon the value of the digit $f$ in the number $def$, and this approximation will be more fully described below. For the present, it may be understood that the full 360° is divisible into one thousand approximately equal angles corresponding to the one thousand different possible values of 000 to 999 for the signaled number $def$. The whole number $def$ may be viewed as formed by the expression $$(d \times 100) + (e' \times 50) + (e'' \times 10) + (f \times 1)$$

in which $d$ can have any value 0–9, $e'$ can have the value 0 or 1 depending upon whether the 5 bit of the signaled $e$, digit is a "0" or a "1," $e''$ can have any value 0–4 as signaled by the 1, 2 and 4 bits of the $e$ digit, and $f$ can have any value 0–9.

To form the changeable resistance $R_a$ in FIG. 16, only six resistors $R_0$–$R_5$ need be employed (the first having a value of infinity and being physically omitted). These resistors are sized according to the rationale already explained such that the ratio $$\frac{R_f}{R_a} = \sin m\alpha$$

as they are respectively rendered effective when $m$ takes on the values of 00 through 05, as shown for the first quadrant in FIG. 17. That is, assuming for the sake of discussion that the feedback resistors $R_f$ in FIG. 16 each have a value of 1000 ohms, the five resistors in the changeable resistance $R_a$ are sized to satisfy the relationship:

$$R_m = \frac{R_f}{\sin m\alpha} = \frac{1000}{\sin (m)18°} \qquad (32)$$

From this, the values of the individual resistors are calculated and chosen:

$$R_0 = \frac{1000}{\sin 0°} = \infty$$

$$R_1 = \frac{1000}{\sin 18°} = 3.236 K\Omega$$

$$R_2 = \frac{1000}{\sin 36°} = 1.701 K\Omega$$

$$R_3 = \frac{1000}{\sin 54°} = 1.236 K\Omega$$

$$R_4 = \frac{1000}{\sin 70°} = 1.051 K\Omega$$

$$R_5 = \frac{1000}{\sin 90°} = 1.000 K\Omega$$

The changeable resistance $R_b$ in FIG. 16 similarly formed by six resistors (one being infinity and physically omitted). For the reasons already made clear, these six resistors are sized according to the function:

$$\frac{R_f}{R_b} = \cos m\alpha = \cos (m)18° \quad (33)$$

Because $\cos \theta_1 = \sin (90° - \theta_1)$, the six resistors $R_0-R_5$ in the changeable resistance $R_b$ have the same values as the six resistors in the changeable resistance $R_a$, but they are connected to be effective in a different order as the angle $m\alpha$ takes on different values. Thus, the resistors $R_0-R_5$ shown as constituting the changeable resistance $R_b$ in FIG. 16 have the same values as listed above, based upon the assumption that the feedback resistors $Rf$ in FIG. 16 have values of 1000 ohms.

Each of the resistors $R_1$ through $R_5$ in the resistances $R_a$ and $R_b$ is connected in series between the source 46 of the reference voltage $E_r$ and the respective conductors 131 and 136 through a field effect transistor, in the same manner explained previously with respect to FIGS. 13A-B. The gates of these transistors are controlled differently in comparison to the arrangement of FIGS. 13A and 13B.

As explained previously, the sine of 0° and 180° is the same, and the cosine of 0° and 180° is the same (except for a difference in sign). To render the resistors $R_0$ and $R_5$, respectively, effective in the resistances $R_a$ and $R_b$ when the angle $m\alpha$ is 0° to 180° (and thus when the number $def$ has values from 000 to 049 or 500 to 549), it is only necessary to provide an AND gate 212 with four inputs as labeled in FIG. 16. From Table IV it may be seen that the first input $\overline{x5x}$ will be a "1" only if the $e$ digit is 0, 1, 2, 3 or 4 and it will be a "0" if $e$ is 5 or greater. Moreover, the three inputs $\overline{1xx}$, $\overline{2xx}$, $\overline{4xx}$ will all be a "1" only if the $d$ digit is either 0 or 5. Thus, the output line $L_0$ from gate 212 will be at "1" level only when the angle $m\alpha$ corresponding to the signaled number $def$ is either 0° or 180°. Of course, the angle $n\beta$ can have any of its possible values, determined by the $e$ and $f$ digits of the number $def$ when $m\alpha$ is 0° or 180°, and for this reason the output line $L_0$ is labeled 00–04/50–54 to indicate that it will be at a "1" level when the digits $de$ constitute a number having any value of 00 to 04 or 50 to 54.

The ouput line $L_0$ need not connect to the changeable resistance $R_a$ since the latter is given a value of infinity (by leaving resistors $R_1-R_5$ therein effectively disconnected) when that line is at a "1" level. However, the "1" signal on line $L_0$ connects to the gate of the FET in series with the resistor $R_5$ in the resistance $R_b$, making the ratio $$\frac{R_f}{R_b} = \cos m\alpha$$

when $m\alpha$ is 0° or 180°.

To render the resistors $R_1$ and $R_4$ respectively effective in the resistances $R_a$ and $R_b$ when the output line $L_1$ of a gate 214 is at a "1" level, that line is connected to the gates of the two associated FET's as shown in FIG. 16. This gate receives inputs, as labeled, $x5x$, $\overline{1xx}$, and $\overline{2xx}$. Its output can be a "1" only if the digit $e$ in the number $def$ has a value of 5 or more (i.e., 5 through 9) and if the digit $d$ has a value of 0, 4, 5 or 9. Inspection of Table IV will confirm that the input signals $\overline{1xx}$ and $\overline{2xx}$ can both be "1"s only if the $d$ digit is 0, 4, 5 or 9. Thus, the line $L_1$ will be at a "1" level when and only when the number $def$ has values of 050 to 099, or 450 to 499, or 550 to 599, or 950 to 999—and the angle $m\alpha$ is 18°, 162°, 198° or 342°.

In like manner the resistors $R_2$ and $R_3$ in the resistances $R_a$ and $R_b$ are respectively rendered effective when the output line $L_2$ of a gate 216 is at a "1" level. Bearing in mind the 1–2–4–5 code shown in FIG. 2, it may be seen from inspection that the output of an associated OR circuit 217 with inputs $1xx$, $4xx$ will be a "1" coincidentally with the input $\overline{2xx}$ only when the $d$ digit has values of 1, 4, 6 or 9. Of course, the other gate input $\overline{x5x}$ will be a "1" only when the $e$ digit is less than 5. Thus, the output $L_2$ will be at a "1" level only when the angle $m\alpha$ is 36° or a corresponding angle in the other quadrants, i.e., when the number $def$ has values of 100 to 149, or 400 to 449, or 600 to 649, or 900 to 949.

The three remaining gates 218, 222 shown in FIG. 16 serve to make their output lines $L_2$, $L_3$, $L_4$ receive a "1" signal when the angle $m\alpha$ has values of 54°, 72°, or 90° (or corresponding values in the second, third or fourth quadrants), respectively. This function will be clear to those skilled in the art from the labeled gate inputs and the preceding examples.

Thus, as the signaled input number $def$ takes on different values, the relatively simple decoder 200 will render different resistors effective in the resistances $R_a$ and $R_b$ to make the ratio $R_f/R_a$ and $R_f/R_b$ equal to sin $m\alpha$ where $\alpha$ is 18° and $m$ is related to the $d$ and $e$ digit values. Since the resistances $R_a$ and $R_b$ are input resistances for the operational amplifiers, signals $E_r$ sin $m\alpha$ and $E_r$ cos $m\alpha$ are effectively created on the conductors 131 and 136.

As in the case FIGS. 13A–B, the transistor Q12 is conductive when the angle $m\alpha$ lies in the first or second quadrants and the sign of the signaled number is positive (N+="1"). Otherwise, the transistor Q12 is turned off and the transistor Q34 is turned on. Thus, when $m\alpha$ is in the first quadrant and N+ is "1," the signal $E_r$ sin $m\alpha$ is coupled to the additive input terminal 134a and through an inverter 224 (which may be an operational amplifier) to the terminal 134b. Since the signal is assumed to initiate with a positive phase polarity at conductor 131, it appears after inversion with an effective negative polarity at subtractive terminal 134b, so that its contribution to the output signal Es is in net effect additive. From this, it will be understood that the signal $E_r$ sin $m\alpha$ actually produces an additive effect in the amplifier 134 when the angle $m\alpha$ (a) lies in the first or second quadrants and the counter number sign is positive or (b) lies in the third or fourth quadrants and is negative. Otherwise, the transistor Q34 is conductive and the signal $E_r$ sin $m\alpha$ is routed without inversion to the terminal 134b to produce a subtractive effect in the amplifier.

The transistors Q14 and Q23 in FIG. 16 are controlled in the same manner explained above with respect to FIG. 13B. Transistor Q14 is conductive when the angle $m\alpha$ lies in the first or fourth quadrants (and the number $def$ lies between 000 and 249 or between 750 and 999), and will transfer the effective signal $E_r$ cos $m\alpha$ to the additive input terminal 138a and through an inverter 226 (which may be an operational amplifier) to the subtractive input terminal 138b. The signal will thus produce an additive effect in its contribution to the output signal $E_c$. On the other hand, when the angle $m\alpha$ lies in the second or third quadrant, the transistor Q23 is conductive to transmit the positive polarity signal $E_m$ cos $m\alpha$ directly to the terminal 138b, so the signal will produce a subtractive effect in the amplifier 138.

The embodiment of FIG. 16 operates to control the effective polarities of the sine and cosine signals based upon the quadrant of the angle $\theta$ and the sign of the counter number N in the same way discussed above with reference to FIGS. 13A–B. However, in the arrangement of FIG. 16, the gating units 158 and 159 which control the transistors Q12, Q34, and Q14, Q23 may be considerably simpler because the input number $def$ has its digits $d$ and $e$ signaled in 1-2-4-5 binary code. The gating unit 158 need only include two AND gates 158a and 158b having inputs as labeled. Since the signal $\overline{5xx}$ will be a one only when the number $def$ is less than 500, the gate 158a will produce a "1" output only if the angle $m\alpha$ lies in the first or second quadrants (see FIG. 17) and the counter number is positive (N+= "1"). Correspondingly, the signal $5xx$ will be a one only when the number $def$ is 500 or greater, and thus the gate 158b will produce a "1" output only if the angle $m\alpha$ lies in the third or fourth quadrants, and the counter number is negative $$(\mathrm{N}-=\text{``}1\text{''})$$

The outputs of these two gates lead through an OR circuit 158c whose output line connects directly to the gate of the transistor Q12, and through an inverter 165 to the gate of the transistor Q34. Thus, the transistor Q12 will receive a "1" level control potential if the counter number is positive and the angle $m\alpha$ lies in the first or second quadrants, or if the counter number is negative and the angle $m\alpha$ lies in the third or fourth quadrants—the transistor Q34 being turned off under these conditions. Under any other conditions, however, the transistor Q12 will be turned off, and the transistor Q34 turned on. Thus, the effective polarity of the signal $E_r \sin m\alpha$ is controlled according to the quadrant of the angle and the sign of the counter number, as previously explained.

The gate unit 159 in FIG. 16 has its output line 159a leading from an OR circuit 159b directly to the gate of the transistor Q23 and through an inverter 174 to the gate of the transistor Q14. As will be explained, the output line 159a resides at a "1" potential when the angle $m\alpha$ lies in the second or third quadrants and the number def lies between 250 and 749, thereby making the transistor Q23 conductive and the transistor Q14 nonconductive. But when the angle $m\alpha$ lies in the first or fourth quadrants, then the output line 159a is at a "0" potential so that the transistor Q14 is turned on and the transistor Q23 is turned off.

This operation is produced by five AND gates 159c–g having their output lines connected to the inputs of the OR circuit 159b and having inputs, as labeled, from the decoder 200. A moment's thought with reference to Table IV will confirm that the inputs $\overline{1xx}$, $\overline{2xx}$ and $\overline{5xx}$ will permit the gate 159c to produce a "1" output signal only when the $d$ digit value is 2; and the fourth input $x5x$ will further qualify this gate so it can produce a "1" output only when the digit $e$ is five or greater. Thus, the gate 159c will cause the output line 159a to receive a "1" signal when the number def lies between 250 and 299.

The three inputs $1xx$, $2xx$ and $5xx$ to the gate 159d will result in a "1" output from the latter when the digit $d$ has a value of 3 (and the number def lies between 300 and 399). Likewise, the labeled inputs for the gate 159e will cause it to produce a "1" output when the digit $d$ has a value of 4 and the labeled inputs for the gate 159f will cause it to produce a "1" output when the digit $d$ has a value of either 5 or 6. Finally, the labeled inputs for the gate 159g will cause the latter to produce a "1" output only when the digit $d$ has a value of 7 and the digit $e$ has a value of less than 5 (that is, the number def lies between 700 and 749). Thus, at least one of the gates 159c–g will produce a "1" output, and cause the OR circuit 159b to produce a "1" output at the line 159a, when and only when, the number def lies between 250 and 749, designating that the angle $m\alpha$ lies in the second or third quadrants (see FIG. 17). This is the same result which is produced by the gating unit 159 shown in FIG. 13B.

The two changeable resistances $R_c$ in FIG. 16 are cross coupled between the outputs and the inputs of the two amplifiers 134 and 138, in the fashion already shown and discussed with reference to FIG. 13B. However, each of the two identical resistances $R_c$ may be viewed as formed by two individual changeable resistances $R'_c$ and $R''_c$ which are connected in parallel with one another. For the moment it will be assumed that the resistances $R''_c$ have values of infinity and thus produce no effect.

The two changeable resistances $R'_c$ each comprise five resistors $r_0$–$r_4$ (one being infinity and physically omitted) corresponding to the values of 0°, 3.6°, 7.2°, 10.8° and 14.4° for the angle $n\beta$ as $n$ has the respective values 0, 1, 2, 3, 4. In keeping with the rationale previously set forth, these resistors are sized such that $$\frac{R_f}{R_b} = \tan \theta_2 = \tan n\beta \qquad (34)$$

Since the number $n$ can have any value 0–4, the angle $\beta$ is assumed to be 3.6°, and the value of the resistors $R_f$ is assumed to be 1000 ohms, the values of the five resistors may be calculated and selected as follows:

$$r_0 = \frac{1000}{\tan 0°} = \infty$$

$$r_1 = \frac{1000}{\tan 3.6°} = 15.8045 \text{ K}\Omega$$

$$r_2 = \frac{1000}{\tan 7.2°} = 7.9158 \text{ K}\Omega$$

$$r_3 = \frac{1000}{\tan 10.8°} = 5.2422 \text{ K}\Omega$$

$$r_4 = \frac{1000}{\tan 14.4°} = 3.8947 \text{ K}\Omega$$

To render appropriate ones of the resistors $r_1$–$r_4$ effective as the number $n$ and the angle $n\beta$ have different values, each of these resistors is connected in series with a field effect transistor which is controlled by a logic signal supplied from the decoder 200. In this instance, the FET's for the resistors $r_1$ through $r_4$ are controlled by signals on lines 231 through 234, respectively, which receive a "1" signal from the decoder 200 when the number $n$ has values of 1 through 4, respectively. For this purpose, the decoder 200 includes three AND gates 235, 236, 237 having their outputs connected to the lines 231, 232, 233; and the input signal $x4x$ is connected directly to the line 234. Merely from inspection of the labeled inputs and by reference to Table IV, it will be apparent that the gate 235 produces a "1" signal on the line 231 when the signaled digit $e$ has a value of either 1 or 6 ($n$=1). It will be evident also that the lines 232, 233, 234 will reside at "1" levels when the signal digit $e$ has a value of 2 or 7 ($n$=2), 3 or 8 ($n$=3), or 4 or 9 ($n$=4), respectively. Thus, as the number def takes on different values, the effective signals which appear on the conductors 140 and 142 will respectively have the product values $E_c \tan n\beta$ and $E_s \tan n\beta$ where $\beta$ is 3.6° and $n$ is determined by the value of the digit $e$ (i.e., $n=e$ when $e<5$, or $n=[e-5]$ when $e>4$).

These product signals are respectively routed through transistors Q1 and Q3 when the counter number is positive (N+="1"), or through transistors Q3 and Q4 when the counter number is negative (N−="1"), so that the sense of their contributions to the output signals $E_s$ and $E_c$ is dependent upon the sign of the counter number N. More specifically, if the transistor Q1 is conductive, the effective signal $E_c \tan n\beta$ is transferred to the additive input terminal 134a and thence through the inverter 224 to the subtractive input terminal 134b. Thus, if the signal $E_c$ is either of positive or negative phase polarity, the signal $E_c \tan n\beta$ will act additively or subtractively in contributing to the output signal $E_s$. Conversely, if the transistor Q2 is turned on because the counter number is negative (and the transistor Q1 is turned off), then when the signal $E_c \tan n\beta$ of corresponding polarity will be routed directly to the input terminal 134b, and it will act subtractively or additively in contributing to the output signal $E_s$.

Similarly, when the transistor Q3 is conductive, the product signal $E_s \tan n\beta$ is routed directly to the subtractive input terminal 138b; but when the transistor Q4 is conductive (because the counter number is negative) then that signal will be routed to the additive input terminal 138a and thence through the inverter 226 to the terminal 138b so that its effective polarity is reversed. Thus, the sense of the combining of signals in the amplifiers 134 and 138 depends upon both the quadrant of the angle $m\alpha$ and the sign of the counter number $n$ in the same way as described with reference to FIGS. 13A–B.

With the apparatus of FIG. 16 as thus far described, the amplifiers 134 and 138 will produce output signals $E_s = \sin(m\alpha + n\beta)$ and $E_c = \cos(m\alpha + n\beta)$, or more particularly such that $$\frac{E_s}{E_c} = \tan(m\alpha + n\beta) \qquad (35)$$

as the number $def$ takes on different values to change the related values of $m$ and $n$. This will be clear from Equations 12 through 18a, supra. However, the total angle $\theta = (\theta_1 + \theta_2) = (m\alpha + n\beta)$ can only have one hundred different values equally spaced at 3.6° around a circle (FIG. 17) with the arrangement where $m$ may have any of twenty values (0–19) and $n$ may have any of five values (0–4).

To make it possible for the angle $\theta$ to have one thousand different values as the number $def$ takes on one thousand possible values, the two changeable resistances $R_c$ are modified according to the values of the lowest order signaled digit $f$. This is done by changing the values of the resistances $R''_c$ according to the value of the digit $f$ so that the resultant resistance $R_c$ formed by the parallel resistances $R'_c$ and $R''_c$ follows the relation $$\frac{R_f}{R_c} = \tan \theta_2 = \tan(n\beta + f\gamma) \qquad (36)$$

However, it has been found that the relationship of Equation 36 may be approximated rather than rigorously followed, while nevertheless obtaining final output signals $E_s$ and $E_c$ which are sufficiently accurate.

As here shown, the two changeable resistances $R''_c$ each comprise five resistors $nf_0$, $rf_1$, $rf_2$, $rf_4$, $rf_8$ (the first one being infinity and physically omitted) respectively connected in series with field effect transistors which are controlled by bi-valued potentials corresponding to the binary values of the bits of the signaled digit $f$. That is, the resistors $rf_1$, $rf_2$, $rf_3$, $rf_4$, $rf_8$ are connected through individual FET's in parallel with the associated resistance $R'_c$ when the input signals $xx1$, $xx2$, $xx4$, $xx8$ are respectively at "1" levels. Thus, more than one of these resistors may be connected in the circuit at a given time, depending upon the value of the digit $f$. By trial and error, it has been possible to establish values for the resistors $rf_1$, $rf_2$, $rf_4$, $rf_8$ which will result in a close approximation of the relationship expressed by Equation 36. Such a trial and error procedure for selecting the values of these resistors is within the ken of one skilled in the art, but for the sake of an example, these values will be set forth below in a table which indicates the values of the resistance $R''_c$ as the digit $f$ takes on different values, and assuming that the resistors $r_1$–$r_4$ have the exemplary values listed above:

TABLE V

| Decimal value of $f$ | X=resistors in parallel to form $R''_c$ | | | | Value of $R''_c$ in KΩ |
|---|---|---|---|---|---|
| | $rf_1$ 153.95 KΩ | $rf_2$ 76.906 KΩ | $rf_4$ 38.382 KΩ | $rf_8$ 19.114 KΩ | |
| 0 | | | | | ∞ |
| 1 | X | | | | 153.95 |
| 2 | | X | | | 76.906 |
| 3 | X | X | | | 51.286 |
| 4 | | | X | | 38.382 |
| 5 | X | | X | | 30.723 |
| 6 | | X | X | | 25.604 |
| 7 | X | X | X | | 21.953 |
| 8 | | | | X | 19.114 |
| 9 | X | | | X | 17.003 |

The ten possible values of $R''_c$ set forth in Table V may be used to compute fifty possible values of the resistance $R_c$ as the resistance $R'_c$ has the five possible values given above. It will be found that the equation $$\frac{R_f}{R_c} = \tan nf(.36°) \qquad (37)$$

is very closely approximated as $n$ takes on any of five values 0–4 and $f$ takes on any of ten values 0–9, so that the number $nf$ has any value from 00 to 49 and the angle $nf$ (.36°) can vary from 0° to 17.64° in steps of .36°. In this way, the system of FIG. 16 follows to a close approximation the relationship $$\frac{E_s}{E_c} \tan(m\alpha + nf\gamma) \qquad (38)$$

where $\alpha$ and $\gamma$ are 18° and .36°, respectively, and $m$ can have any of twenty values while $nf$ can have any of fifty values, thereby making one thousand different combinations corresponding to the one thousand possible values of the input number $def$. It has been verified by calculations which need not be repeated here that the magnitudes and polarities of the signals $E_s$ and $E_c$ with the arrangement of FIG. 16 will represent the analog of the signaled number $def$ with a theoretical error no greater than ±35 microinches; and when this embodiment of the digital-to-analog converter is used in the system of FIG. 2 with a linear Inductosyn device 22, 24 having an accuracy of ±50 microinches, the entire system will be more than adequate to keep the number signaled by the counter 20 accurate to the nearest ten-thousandths of an inch.

Thus, with only twenty-six individual resistors employed to constitute the changeable resistances $R_a$, $R_b$, $R_c$ and with a very simple decoder 200, the converter of FIG. 16 will provide essentially the same operation which has already been described in detail with respect to FIGS. 13A–B.

AN EMBODIMENT OF THE DIGITAL-TO-ANALOG CONVERTER FOR COMBINING MORE THAN TWO CHANGEABLE ANGLES

The converter described with reference to FIGS. 10, 13A–B and 16 produces and combines signals which vary as trigonometric functions of two individually changeable angles in order to provide final output signals $E_s$ and $E_c$ which vary as the sine and cosine of the sum of such angles, each of the two angles being based upon a portion of a changeable three-digit input number $def$. Of course, the invention may be embodied in apparatus which responds to only a two-digit input number, and this will be apparent without further comment to those skilled in the art. But still further, the invention may be embodied in apparatus which serves to provide two final output signals which vary precisely as sine and cosine functions (and whose ratios vary as a tangent function) of the sum of three or more changeable angles which respectively correspond in value to three or more successively lower order portions of an input number having three or more digit places.

Such an embodiment of the invention is illustrated in generalized form by FIG. 18, wherein a first section 250 is organized and operates in the same manner as the apparatus of FIG. 10. Because of this identity of apparatus, the reference characters utilized in FIG. 10 are applied to the corresponding components in section 250 of FIG. 18.

From Equations 18–21 and 7–9 which are applicable to the apparatus of FIG. 10, it may be seen immediately that in FIG. 18:

$$\frac{E_s}{E_c} = \frac{\tan\theta_1 + \tan\theta_2}{1 - \tan\theta_1 \tan\theta_2} = \tan(\theta_1 + \theta_2) = \tan(m\alpha + n\beta) \qquad (39)$$

where $$\frac{R_f}{R_a} = \sin\theta_1 = \sin m\alpha \qquad (40)$$

$$\frac{R_f}{R_b} = \cos\theta_1 = \cos m\alpha \quad (41)$$

$$\frac{R_f}{R_c} = \tan\theta_2 = \tan n\beta \quad (42)$$

But assuming for the sake of discussion that an input number *def* is supplied via a decoder to change the resistances $R_a$, $R_b$, $R_c$ in the general manner exemplified by FIGS. 13A–B or FIG. 16, and assuming that the *d* and *e* digits constitute the numbers *m* and *n*, each of the resistances $R_a$, $R_b$ and $R_c$ may have ten possible values, and the ratio of the output signals for the section 250 may be written:

$$\frac{E_s}{E_c} = \tan\theta = \tan(\theta_1+\theta_2) = \tan(d\alpha+e\beta) \quad (43)$$

where $\alpha$ is 36° and $\beta$ is 3.6° and the resistors are chosen to make $$\frac{R_f}{R_a} = \sin d(36°) = \sin\theta_1 \quad (44)$$

$$\frac{R_f}{R_b} = \cos d(36°) = \cos\theta_1 \quad (45)$$

$$\frac{R_f}{R_c} = \tan e(3.6°) = \tan\theta_2 \quad (46)$$

In order to make the angle $\theta$ have one thousand possible values, the lowest order digit *f* in the changeable number *def* is utilized to control a second section 251 employing cross coupled algebraic combining devices here shown as operational amplifiers in an organization which is very similar to that for the first section 250. Thus, the same reference characters for the various components in section 250 are applied to the corresponding components in section 251, but in the latter case a distinguishing prime symbol is added. Section 251 differs from section 250 principally in that the first input signals (which normally act additively) for the operational amplifiers 122' and 123' are created by coupling the first stage output signals $E_s$ and $E_c$ through input resistors $R_f$ to the additive input terminals 122'a and 123'a. Further, the output signals $E_{oc}$ and $E_{os}$ of the second and first amplifiers 122' and 123' are coupled through identical changeable resistances $R_d$ to the additive and subtractive inputs 122'a and 123'b of the first and second amplifiers. With these connections in mind, then the equations for the final output signals $E_{os}$ and $E_{oc}$ produced by the first and second amplifiers 122' and 123' may be written:

$$E_{os} = E_s \frac{R_f}{R_f} + E_{oc}\frac{R_f}{R_d} \quad (47)$$

$$E_{oc} = E_c \frac{R_f}{R_f} - E_{os}\frac{R_f}{R_d} \quad (48)$$

These may be rewritten:

$$E_s = E_{os} - E_{oc}\frac{R_f}{R_d} \quad (47a)$$

$$E_c = E_{oc} + E_{os}\frac{R_f}{R_d} \quad (48a)$$

Dividing (47a) by (48a) and finding that the result is expressed in Equation 39 one may say that $$\frac{E_s}{E_c} = \frac{E_{os} - E_{oc}\frac{R_f}{R_d}}{E_{oc} + E_{os}\frac{R_f}{R_d}} = \tan(\theta_1+\theta_2) \quad (49)$$

Equation 49 may be rearranged and rewritten:

$$\tan(\theta_1+\theta_2) = \frac{\frac{E_{os}}{E_{oc}} - \frac{R_f}{R_d}}{1 + \frac{E_{os}}{E_{oc}}\cdot\frac{R_f}{R_d}} \quad (49a)$$

Let it be assumed that the changeable resistance $R_a$ may have ten possible values as the digit *f* in the number *def* takes on values of 0–9, and that a third angle $\theta_3$ varies in steps of .36° according to the value of the digit *f*. The individual values of the changeable resistance may be chosen such that $$\frac{R_f}{R_d} = \tan\theta_3 \quad (50)$$

where $$\theta_3 = f(.36°) \quad (51)$$

Thus:

$$R_d = \frac{R_f}{\tan\theta_3} = \frac{R_f}{\tan f(.36°)} \quad (52)$$

By substituting the $R_f/R_d$ from (50) into (49a), it may be seen that:

$$\tan(\theta_1+\theta_2) = \frac{\frac{E_{os}}{E_{oc}} - \tan\theta_3}{1 + \frac{E_{os}}{E_{oc}}\cdot\tan\theta_3} \quad (53)$$

Solving (53) for the ratio $E_{os}/E_{co}$, the following is obtained:

$$\frac{E_{os}}{E_{oc}} = \frac{\tan(\theta_1+\theta_2) + \tan\theta_3}{1 - \tan(\theta_1+\theta_2)\tan\theta_3} \quad (54)$$

But recalling that the trigonometric identity for the tangent of the sum of two angles is $$\tan(A+B) = \frac{\tan A + \tan B}{1 - \tan A \tan B} \quad (55)$$

and recognizing that $(\theta_1+\theta_2)$ and $\theta_3$ in Equation 54 respectively correspond to the angles A and B in (55), one may immediately write:

$$\frac{E_{os}}{E_{oc}} = \tan(\theta_1+\theta^2+\theta_3) \quad (56)$$

Thus, the two-section converter shown in FIG. 18 may produce final sine and cosine function output signals whose ratio will represent the analog of a position signaled by a changeable number *def*, such that $$\frac{E_{os}}{E_{oc}} = \tan(d\alpha + e\beta + f\gamma)$$

where in this example $\alpha$ is a predetermined angle of 36°, $\beta$ is a submultiple of $\alpha$ and specifically 3.6°, and $\gamma$ is a submultiple of $\beta$ and specifically .36°. The arrangement of FIG. 18 may include as many tandemly connected sections as may be desired. The implementation of the apparatus with individual resistors selectively rendered effective by turning on FET's, and with signal polarity control based on quadrants and the sign of the input number will be clear to those skilled in the art from the preceding detailed descriptions of FIGS. 13A–B and FIG. 16.

What is claimed is:

1. In a system having an element movable to any position along a predetermined path, the combination comprising, a reversible counter having a plurality of stages connected in tandem with each stage having output lines on which appear signals digitally representing the value of the number held in that stage, a digital-to-analog converter responsive to the digit signals from the last three lowest order stages of said counter and including means for producing two A.C. voltages proportional to $\sin\theta$ and $\cos\theta$, where $\theta$ is an angle proportional to the number *def* and the *d*, *e*, and *f* are the signaled values of the lowest order digits of the number held in said counter, a resolver type device having two relatively movable parts respectively stationary and mechanically coupled to said element, said device having input windings connected to receive said sine and cosine voltages and an output winding in which there is induced an A.C. discrepancy signal corresponding in amplitude and phase polarity to the extent and sense of the displacement of said element from the nearest one of a plurality of spaced-apart null positions represented by a number whose lowest order digits are *def*, and means responsive to said discrepancy signal being of one phase polarity or the other for causing said counter to count up or down until the number *def* therein agrees with the actual position of said element and the discrepancy signal is reduced substantially to zero amplitude.

2. The combination set forth in claim 1 further characterized in that said last-named means includes means for causing said counter to count at a rate which is generally proportional to the amplitude of said A.C. signal.

3. In a system having an element movable to any position along a predetermined path, the combination comprising a reversible counter having a plurality of decade stages *a . . . d, e, f* with each stage adapted to digitally signal the value of the decimal digit stored therein, said counter thereby signaling a decimal number *a . . . def* where the letters *def* represent the values of the digits in the three lowest order places of the decimal number, a digital-to-analog converter having a plurality of resistors selectively switchable into operative condition and including means responsive to the digital signals from the *d, e,* and *f* stages of said counter for switching different combinations of said resistors into operative conditions as the number *def* takes on different values to produce two A.C. voltages which in amplitude and phase polarity are proportional to sin *(def·β)* and cos *(def·β)*, where *β* is a predetermined small angle, a transducer of the resolver type having a stationary member and a movable member with the latter being mechanically coupled to said element, said members respectively having input windings coupled to receive said A.C. voltages and an output winding in which there is induced an A.C. discrepancy signal corresponding in amplitude and phase polarity to the extent and sense of the difference between the nearest null position represented by the number *def* and the actual position of said element, means responsive to said discrepancy signal for supplying input pulses to said counter until the discrepancy signal is reduced substantially to zero, and means responsive to the phase polarity of said discrepancy signal for causing said counter to count upwardly or downwardly in response to input pulses so that the number *def* is changed to shift one of the null positions represented thereby into agreement with the actual position of said element, whereby the number *a . . . def* digitally signaled by said counter is automatically and rapidly kept in agreement with the actual position of said element when the latter is moved in either direction to different positions.

4. The combination set forth in claim 3 further characterized by a manually adjustable differential resolver interposed between said converter and the input windings of said transducer so that adjustment thereof when the element is stationary at any position may change the number *def* signaled by the stages *d, e, f* to any desired value, and selector means for presetting the stages of said counter which are of higher order than the *d* stage to hold any desired values, whereby the reference point along the path, from which the position of the element is measured and numerically signaled by the counter, may be changed to any desired location.

5. The combination set forth in claim 3 further characterized in that said means for supplying input pulses to said counter includes means for making the frequency of such input pulses generally proportional to the amplitude of the discrepancy signal.

6. In a system for numerically signaling the position of an element movable to different positions along a predetermined path, the combination comprising a reversible counter having means for producing digital signals representing the number held therein, a digital-to-analog converter responsive to said digital signals for producing first analog signals representing a first position corresponding to the number held in said counter, an adjustable device responsive to said first analog signals and having means for producing second analog signals representing a second position offset from said first position to an extent determined by the adjustment imparted to such device, a transducer mechanically coupled to said element and having means responsive to said second analog signals for producing a discrepancy signal of magnitude and polarity corresponding to the extent and sense of the displacement between said second represented position and the actual position of said element, means responsive to said discrepancy signal for causing said counter to correctively count so as to restore the discrepancy signal to substantially zero magnitude as the element moves from position to position along its path, and means responsive to said digital signals for displaying in visually readable form the number held in said counter, whereby adjustment of said device may be made when the element is at any given position until the number displayed has a value corresponding to the desired numerical designation for such given position to establish any selected zero reference point along the path and thereafter as the element moves the position of the element relative to such reference point will be automatically signaled by said counter and will be visually readable from said displaying means.

7. In a system for numerically signaling the position of an element movable to different positions along a predetermined path, the combination comprising a reversible counter having tandemly connected stages, *a, b . . . d, e, f* for producing digital signals representing a changeable multidigit number *ab . . . def* held therein, means responsive to said digital signals for displaying in visually readable form at least the last few lower order digits *d, e, f* of the number held in said counter, a digital-to-analog converter mechanically coupled to said element and having means for producing first analog signals representing a first position *xx . . . def* along said path, an adjustable device responsive to said first analog signals for producing second analog signals representing a second position *xx . . . d'e'f'* which is offset from the first position in a sense and by an amount corresponding to the adjusted setting of such device, a transducer mechanically coupled to said element and having means responsive to said second analog signals for producing a discrepancy signal corresponding in effective polarity to the sense of any appreciable difference between the second position *xx . . . d'e'f'* and the actual position of the element, means responsive to said discrepancy signal for causing said counter to count correctively to keep said difference substantially zero, and means for presetting those stages of the counter higher in order than the *d* stage to signal desired digit values, whereby when the element is in any given position said device may be adjusted by observing said displaying means until the digit values *d, e, f* signaled by the counter agree with the digit values DEF of a number AB . . . DEF which is the desired designation for the given position, the said higher order stages of the counter may be preset to signal the high order digits of said number AB . . . DEF, so that the signaled counter number *ab . . . def* thereafter automatically represents the position of said element with reference to a selected zero reference point on said path.

8. In a system for numerically signaling the sign and magnitude of the position of an element movable along a predetermined path to different positions within positive or negative regions on opposite sides of a zero reference point, the combination comprising a reversible counter having means to digitally signal the number which is held therein, a bi-state device settable to first or second states to signal that the number held in the counter is of one sign or the other, a digital-to-analog converter responsive to digital signals from said counter for creating an analog representation of a position along said path which corresponds to the number held in said counter, a transducer mechanically coupled to said element and responsive to said analog representation for producing a discrepancy signal corresponding in polarity to the sense of any displacement between the represented position and the actual position of said element, means responsive to said discrepancy signal for causing said counter to count in a direction determined by the polarity of such signal and until such signal is reduced substantially to zero, means for producing a zero signal when the number held in said counter is zero, and means responsive to the concurrent existence of said zero signal and a discrepancy signal of one polarity or the other for driving said bi-state device to its first or second state, respectively, thereby to change signaled polarity of the number held in said counter as that number is reduced to and passes through zero.

9. The combination set forth in claim 8 further characterized in that said means for causing said counter to count includes means for causing said counter to count upwardly when the discrepancy signal and the sign signaled by said bi-state device are of like polarity, and means for causing said counter to count downwardly whenever the discrepancy signal and the sign signaled by said bi-state device are of unlike polarity, whereby the signed number signaled jointly by said counter and bi-state device represents the position of the element with respect to the zero reference point.

10. In a system for numerically signaling the sign and magnitude of the position of an element movable along a predetermined path in opposite directions to different positions lying in positive or negative regions on opposite sides of a zero reference point, the combination comprising a reversible counter having a plurality of tandemly connected decade stages $a \ldots def$ respectively having means to signal the values of descending order digits $a \ldots def$ of a multidigit decimal number, a bi-state device settable to first or second states to signal that the number held in said counter is positive or negative in sign, means for producing a zero signal when the multidigit number held in said counter is zero, a digital-to-analog converter responsive to the digit values $def$ signaled by said decade stages $d, e, f$ for producing AC. input voltages proportional in amplitude to sin $\theta$ and cos $\theta$ where $\theta$ is a changeable angle equal to the number $def$ times 0.36°, a transducer mechanically coupled to said element and having means excited by said input voltages for producing an A.C. discrepancy signal which in amplitude and phase polarity corresponds respectively to the extent and sense of the displacement between the actual position of said element and the nearest position represented by the digit values $def$ signaled by said stages $d, e, f$, a source of pulses, means responsive to the existence of said discrepancy signal for causing said counter to count pulses from said source and in a direction to restore such signal substantially to zero magnitude, means responsive to concurrent appearance of said zero signal and a positive phase polarity of said discrepancy signal for setting said bi-state device to its first state, and means responsive to the concurrent appearance of said zero signal and a negative phase polarity of said discrepancy signal for setting said bi-state device to its second state, whereby the sign and position of said element, relative to said zero reference point, is signaled by said bi-state device and said counter stages as the element is moved to different locations along said path, and to regions displaced from the zero reference point by more than the maximum distance representable by the values of the digits $def$.

11. The combination set forth in claim 10 further characterized in that said means for causing said counter to count includes (a) means for causing said counter to count pulses from said source in a number-increasing sense when the phase polarity of said discrepancy signal and the number sign signaled by said bi-state device are of like polarity, and (b) means for causing said counter to count pulses from said source in a number-decreasing sense when the phase polarity of said discrepancy signal and the number sign signaled by said bi-state device are of unlike polarity.

12. The combination set forth in claim 10 further characterized in that said pulse source and said means for causing said counter to count together include means for causing said counter to count at a rate which is progressively higher as the amplitude of said discrepancy signal becomes progressively greater.

13. The combination set forth in claim 10 further including an adjustable differential resolver for coupling said A.C. input voltages from said converter to said transducer so that when the element is fixed at any given position, adjustment of said resolver results in the counter counting pulses from said source until the values of the signaled digits $def$ correspond to a desired numerical designation for such given position, means for presetting each of the stages of said counter which are higher in order than said $d$ stage to signal any desired digit value, and means for presetting said bi-state device to its first or second state, thereby to establish any desired signaled numerical designation for the given position and thus to establish the location along the path of a desired zero reference point.

14. In a system for numerically signaling the position of an element movable to different positions along a predetermined path, the combination comprising a reversible counter having means to digitally signal changeable values of higher and lower order portions $m$ and $n$ of a number $mn$ held in the counter, first and second algebraic signal combining devices having output signals designatable as $E_s$ and $E_c$, respectively, means responsive to the signaling of the $m$ values for producing a first input signal which is in effect proportional to sin $m\alpha$ where $\alpha$ is an angle of predetermined size, means responsive to the signaling of the $m$ values for producing a second input signal which is in effect proportional to cos $m\alpha$, means for additively supplying said first and second input signals as input to said first and second devices, respectively, means responsive to the signaling of the $n$ values and the output signal $E_c$ for producing a third input signal which is in effect proportional to $E_c$ tan $n\beta$ where $\beta$ is a predetermined submultiple of the angle $\alpha$, means responsive to the signaling of the $n$ values and to the output signal $E_s$ for producing a fourth input signal which is in effect proportional to $E_s$ tan $n\beta$, means for supplying said third and fourth input signals as additive and subtractive inputs to said first and second devices, respectively, so that said output signals $E_s$ and $E_c$ are proportional to sin $(m\alpha+n\beta)$ and cos $(m\alpha+n\beta)$, a transducer mechanically coupled to said movable element and having means excited by said output signals $E_s$ and $E_c$ for producing a discrepancy signal corresponding in polarity to the sense of any displacement between the position represented in analog form by such output signals and the actual position of said element, and means responsive to said discrepancy signal for causing said counter to count in a direction determined by the polarity of such signal and until such signal is reduced substantially to zero.

15. In a system for numerically signaling the position of an element movable to different positions along a predetermined path, the combination comprising a reversible counter having means to digitally signal the changeable values of a number $mn$ held therein where $m$ and $n$ are higher and lower order portions of the number a resolver type device having a stationary member and having a movable member mechanically coupled to said element, said device having input windings on one of said members adapted to receive excitation A.C. sine and cosine function voltages which induce a discrepancy signal in an output winding on the other of said members, the discrepancy signal being of amplitude and phase polarity corresponding respectively to the difference between the position represented by the input voltages and the actual position of said element, first and second algebraic signal combining operational amplifiers having the same gain and negative feedback resistances $R_f$ for respectively producing output voltages $E_s$ and $E_c$, a source of reference voltage $E_r$, a changeable resistance $R_a$ connected between said source and an input of said first amplifier to additively supply to the latter a first input signal which in effect is proportional to $$E_r \frac{R_f}{R_a}$$

a changeable resistance $R_b$ connected between said source and an input of said second amplifier to additively supply to the latter a first input signal which in effect is proportional to $$E_r \frac{R_f}{R_b}$$

a first changeable resistance connected $R_c$ between the output of said second amplifier and an input of said first amplifier to additively supply to the latter a second input signal which in effect is proportional to $$E_c \frac{R_f}{R_c}$$

a second changeable resistance $R_c$ connected between the output of said first amplifier and an input of said second amplifier to subtractively supply to the latter a second input signal which in effect is proportional to $$E_s \frac{R_f}{R_c}$$

means responsive to the digital signals from said counter representing the number $m$ for changing the value of said resistance $R_a$ to make it equal to $R_f/\sin m\alpha$ (where $\alpha$ is a predetermined angle) as $m$ takes on different values, means responsive to the digital signals from said counter representing the number $m$ for changing the value of said resistance $R_b$ to make it equal to $R_f/\cos m\alpha$ as $m$ takes on different values, means responsive to the digital signals from said counter representing the number $n$ for changing the values of said two resistances $Rc$ to make their values equal to $R_f/\tan n\beta$ (where $\beta$ is a predetermined submultiple of the angle $\alpha$) as $n$ takes on different values, whereby said output voltages $E_s$ and $E_c$ are varied to be respectively proportional to sin $(m\alpha+n\beta)$ and cos $(m\alpha+n\beta)$, said means for supplying said voltages $E_s$ and $E_c$ as A.C. excitation voltages to said resolver type device so that the latter produces a discrepancy signal of amplitude and phase polarity corresponding respectively to any difference between the position represented numerically by the digital signals for the number $mn$ and the actual position of said element, a pulse producer, and means responsive to said discrepancy signal for supplying pulses from said pulse producer to said counter to make the latter count up or down depending upon the polarity of the discrepancy signal and until such signal is restored substantially to zero.

16. In a system for numerically signaling the position of an element movable to different positions along a predetermined path, the combination comprising a reversible counter having means to digitally signal the number which is held therein, a digital-to-analog converter responsive to digital signals from said counter for creating an analog signal representation of a position corresponding to the number held in said counter, a transducer mechanically coupled to said element and having means responsive to said analog signal representation for producing a discrepancy signal corresponding in polarity and magnitude to the sense and extent of any displacement between the represented position and the actual position of said element, and means responsive to said discrepancy signal for causing said counter to count in a direction determined by the polarity of such signal and at a rate substantially proportional to the magnitude of such signal and until such signal is reduced substantially to zero, whereby movement of said element from one position to another results in changing the number stored in said counter so that the number digitally signaled by the counter represents the actual position of the element.

17. The combination set forth in claim 16 wherein said last-named means responsive to said discrepancy signal comprises a source of recurring pulses, means for supplying said pulses to said reversible counter when and so long as said discrepancy signal is at least slightly greater than zero, and means for controlling said pulse source to make the frequency of the recurring pulses substantially proportional to the magnitude of said discrepancy signal.

18. The combination set forth in claim 16 wherein said last-named means includes means for producing a D.C. voltage proportional to the magnitude of said discrepancy signal, means for charging a capacitor from said voltage each time after the capacitor has been discharged, means responsive to the potential across said capacitor rising to a predetermined value for (a) producing an output pulse and (b) discharging said capacitor, and means for supplying said output pulses to said reversible counter to be counted therein.

19. The combination set forth in claim 16 further characterized in that said reversible counter is a multi-digit counter having successive stages tandenmly connected and digitally signaling the values of successively higher order digits $a_0, a_1, a_2 \ldots a_x$ of a plural digit number, and wherein said converter is responsive to signals from only a portion of the counter stages which are lower order stages $a_0, a_1, a_2 \ldots$ whereupon the higher order stages respond to counting in the lower order stages to make the counter digitally signal a position-representing number having digit places greater in number than the capacity of said converter.

20. The combination set forth in claim 16 further including means interposed between said converter and said transducer to modify said analog signal representation and thereby make said counter hold and signal a desired number whenever said movable element is in a given position.

21. In a system for numerically signaling the position of an element movable to different positions along a predetermined path, the combination comprising a reversible counter having means to digitally signal the number which is held therein, a digital-to-analog converter responsive to digital signals from said counter for creating an analog signal representation of a plurality of uniformly spaced apart positions each corresponding in location to the number held in said counter, a transducer mechanically coupled to said element and responsive to said analog representation for producing a discrepancy signal of magnitude and polarity corresponding respectively to the extent and sense of the difference between the nearest represented position and the actual position of said element, means responsive to said discrepancy signal for conditioning said counter to count up or down when the polarity of said signal is of one sign or the other, and means responsive to said discrepancy signal for supplying pulses to the input of said counter at a frequency which is directly related to the magnitude of such signal and until such signal is reduced substantially to zero, whereby the number digitally signaled by said counter is adjusted automatically as the element is moved to represent the actual position of the latter.

22. In a system for numerically signaling the position of an element movable to different positions along a predetermined path, the combination comprising a reversible counter having means to digitally signal the number which is held therein, a resolver type device having a stationary member and having a movable member mechanically coupled to said element, said device having input windings on one of said members adapted to receive AC sine and cosine function input voltages which induce a discrepancy signal in an output winding on the other of said members, the discrepancy signal being of amplitude and phase polarity corresponding respectively to the difference between the position represented by the input voltages and the actual position of said element, a digital-to-analog converter responsive to digital signals from said counter for creating AC excitation voltages respectively corresponding in amplitude and phase polarity to the magnitude and sign of the sine and cosine of an angle which is proportional to the number represented by the digital signals, means for supplying said excitation voltages as since and cosine inputs to said resolver type device, means for producing first or second control signals when the phase polarity of said discrepancy signal is respectively positive or negative and exceed a predetermined small amplitude, means responsive to the existence of either said first signal or said third signal for producing a third control signal, means responsive to existence of said third control singal for supplying input pulses to said counter, and means responsive to said first or second signals for causing said counter to respectively count up or count down in response to said input pulses so as to reduce the discrepancy signal toward zero amplitude, whereby as movement of the element occurs the number held in said counter is correspondingly changed and the counter digitally signals a number which represents the actual position of the element.

23. The combination comprising a reversible digital pulse counter having means to digitally signal the count stored therein, means responsive to the signals representing such count for producing an analog signal representation of the value of the count, a transducer coupled to respond to a variable condition and connected to receive said analog signal representation as its excitation input and having means for producing a discrepancy signal proportional to the error between the actual value of the variable condition and the value of the analog signal representation, and means responsive to said discrepancy signal for causing said counter to count in a direction and by an amount to reduce such signal substantially to zero, said last-named means including means for making said counter count at a rate which is substantially directly related to the magnitude of the discrepancy signal.

24. The combination set forth in claim 23 further including means interposed between said means for producing an analog signal representation and said transducer for providing an adjustable modification in said excitation input relative to said analog signal representation, and means responsive to said signals representing the counter count for visually displaying the numerical value represented thereby, whereby said means for producing an adjustable modification may be adjusted while said displaying means is observed to make said count have a desired value when said variable condition has any given value.

References Cited

UNITED STATES PATENTS

| | | | |
|---|---|---|---|
| 3,045,230 | 7/1962 | Tripp et al. | |
| 3,098,995 | 7/1963 | Mundt | 235—151.11X |
| 3,245,065 | 4/1966 | Person | 340—324X |
| 3,315,253 | 4/1967 | Geller | 340—347 |

DONALD J. YUSKO, Primary Examiner

U.S. Cl. X.R.

340—178, 347

PO-1050
(5/69)

UNITED STATES PATENT OFFICE
CERTIFICATE OF CORRECTION

Patent No. 3,553,647         Dated January 5, 1971

Inventor(s) Thomas B. Bullock         Page 1 of 3

It is certified that error appears in the above-identified patent and that said Letters Patent are hereby corrected as shown below:

Column 14, line 73, "alike" is changed to ---unlike---.

Column 16, line 31, before "103" ---switch--- is inserted.

Column 16, line 32, "it" is replaced by ---to---.

Column 16, line 71, "one" is changed to ---once---.

Column 18, line 35, "singnals" is changed to ---signals---.

Column 19, line 49, "imput" is changed to ---input---.

Column 31, line 5, "risestor" is changed to ---resistors---.

Column 31, line 29, "indivdual" is changed to ---individual---.

Column 31, line 43, "resistance" is changed to ---resistances---.

Column 34, line 11, "cosin" is changed to ---cosine---.

Column 34, line 11, "ot fhe" is changed to ---of the---.

Column 34, line 13, between "(+m$\beta$)" and "$E_r$" insert an equal symbol --- = ---.

Column 34, line 41, "hte" is changed to ---the---.

Column 34, line 57, "qudrants" is changed to ---quadrants---.

Column 34, line 63, "quadrant" is changed to ---quadrants---.

PO-1050
(5/69)

UNITED STATES PATENT OFFICE
CERTIFICATE OF CORRECTION

Patent No. 3,553,647            Dated January 5, 1971

Inventor(s) Thomas B. Bullock            Page 2 of 3

It is certified that error appears in the above-identified patent and that said Letters Patent are hereby corrected as shown below:

Column 35, line 29, "tarnsistors" is changed to ---transistors---.

Column 35, line 38, "minus" is changed to ---plus---.

Column 35, line 41, "$R_2$" is changed to --- $\theta_2$ ---.

Column 35, line 69, "vertified" is changed to ---verified---.

Column 37, line 38, "sigal" is changed to ---signal---.

Column 37, line 39, "RSF" is changed to ---REF---.

Column 41, line 29, "to" is changed to ---or---.

Column 42, line 4, before "$L_2$" insert ---line---.

Column 42, line 8, before "222" insert ---220,---.

Column 43, line 36, "$\overline{2xx}$" is changed to ---2xx---.

Column 43, line 43, "5xx" is changed to ---$\overline{5xx}$---.

Column 44, line 13, "15.8045" is changed to ---15.8945---.

Column 45, line 36, "$nf_0$" is changed to ---$rf_0$---.

Column 45, line 41, erase "$rf_3$".

Column 46, line 8, before "tan" insert an equal symbol --- = ---.

PO-1050
(5/69)

UNITED STATES PATENT OFFICE
CERTIFICATE OF CORRECTION

Patent No. 3,553,647　　　　　　　　　Dated　　January 5, 1971

Inventor(s)　　　Thomas B. Bullock　　　　　　Page 3 of 3

It is certified that error appears in the above-identified patent and that said Letters Patent are hereby corrected as shown below:

Column 47, line 48, "with" is changed to ---With---.

Column 52, line 65, a comma is inserted after the word "number".

Column 55, line 10, "since" is changed to ---sine---.

Signed and sealed this 28th day of March 1972.

(SEAL)
Attest:

EDWARD M. FLETCHER, JR.　　　　ROBERT GOTTSCHALK
Attesting Officer　　　　　　　　Commissioner of Patents